(12) United States Patent
Mathur

(10) Patent No.: US 11,447,641 B2
(45) Date of Patent: *Sep. 20, 2022

(54) FIBROUS STRUCTURED AMORPHOUS SILICA INCLUDING PRECIPITATED CALCIUM CARBONATE AND COMPOSITIONS OF MATTER MADE THEREWITH

(71) Applicant: PACIFIC NANO PRODUCTS, INC., Renton, WA (US)

(72) Inventor: Vijay K Mathur, Federal Way, WA (US)

(73) Assignee: PACIFIC NANO PRODUCTS, INC., Renton, WA (US)

( * ) Notice: Subject to any disclaimer, the term of this patent is extended or adjusted under 35 U.S.C. 154(b) by 860 days.

This patent is subject to a terminal disclaimer.

(21) Appl. No.: 16/133,475

(22) Filed: Sep. 17, 2018

(65) Prior Publication Data

US 2019/0048197 A1    Feb. 14, 2019

Related U.S. Application Data

(60) Continuation of application No. 15/470,840, filed on Mar. 27, 2017, now Pat. No. 10,077,363, which is a
(Continued)

(51) Int. Cl.
*C09C 1/00* (2006.01)
*D21H 19/12* (2006.01)
(Continued)

(52) U.S. Cl.
CPC ............ *C09C 1/0093* (2013.01); *D21H 19/12* (2013.01); *D21H 19/385* (2013.01); *D21H 19/40* (2013.01);
(Continued)

(58) Field of Classification Search
CPC .... C09C 1/0093; D21H 19/12; D21H 19/385; D21H 19/40; D21H 19/58; Y10T 428/252;
(Continued)

(56) References Cited

U.S. PATENT DOCUMENTS 3,660,021 A    5/1972 Olmsted et al.
4,167,423 A    9/1979 Williams
(Continued)

FOREIGN PATENT DOCUMENTS

CN    101970543 A    2/2011
CN    101970543 A    2/2011
(Continued)

OTHER PUBLICATIONS

Wang, et al., Preparation of Uniform Needle-Like Aragonite Particles by Homogeneous Precipitation. Journal of Colloid and Interface Science 218, 545-553 (1999) Abstract (9 pages).
(Continued)

*Primary Examiner* — Pegah Parvini
*Assistant Examiner* — Ross J Christie
(74) *Attorney, Agent, or Firm* — R. Reams Goodloe, Jr.

(57) ABSTRACT

A nano-composite structure. A synthetic nano-composite is described having a first component including a fibrous structured amorphous silica structure, and a second component including a precipitated calcium carbonate structure developed by pressure carbonation. The nano-composite may be useful for fillers in paints and coatings. Also, the nano-composite may be useful in coatings used in the manufacture of paper products.

45 Claims, 60 Drawing Sheets

SEM of Nano-Composite (SAS & FCA)

Related U.S. Application Data division of application No. 14/262,741, filed on Apr. 26, 2014, now Pat. No. 9,637,864.

(60) Provisional application No. 61/816,649, filed on Apr. 26, 2013.

(51) Int. Cl.
    *D21H 19/58* (2006.01)
    *D21H 19/40* (2006.01)
    *D21H 19/38* (2006.01)

(52) U.S. Cl.
    CPC ......... *D21H 19/58* (2013.01); *C01P 2002/72* (2013.01); *C01P 2002/74* (2013.01); *C01P 2002/77* (2013.01); *C01P 2004/03* (2013.01); *C01P 2004/10* (2013.01); *C01P 2004/45* (2013.01); *C01P 2004/54* (2013.01); *C01P 2004/61* (2013.01); *C01P 2004/80* (2013.01); *C01P 2006/10* (2013.01); *C01P 2006/12* (2013.01); *C01P 2006/19* (2013.01); *C01P 2006/22* (2013.01); *C01P 2006/62* (2013.01); *C01P 2006/63* (2013.01); *C01P 2006/65* (2013.01); *Y10T 428/252* (2015.01)

(58) Field of Classification Search
    CPC .............. C01P 2002/72; C01P 2002/74; C01P 2002/77; C01P 2004/03; C01P 2004/10; C01P 2004/45; C01P 2004/54; C01P 2004/61; C01P 2004/80; C01P 2006/10; C01P 2006/12; C01P 2006/19; C01P 2006/22; C01P 2006/62; C01P 2006/63; C01P 2006/65
    See application file for complete search history.

(56) References Cited

U.S. PATENT DOCUMENTS

| | | |
|---|---|---|
| 4,230,765 A | 10/1980 | Takahashi et al. |
| 4,277,457 A | 7/1981 | Taga et al. |
| 4,294,810 A | 10/1981 | Taga et al. |
| 4,643,801 A | 2/1987 | Johnson |
| 4,647,499 A | 3/1987 | Takahashi et al. |
| 5,219,660 A | 6/1993 | Wason et al. |
| 5,312,484 A | 5/1994 | Kaliski |
| 5,370,852 A | 12/1994 | Ikawa et al. |
| 5,623,013 A | 4/1997 | Tanaka et al. |
| 5,750,038 A | 5/1998 | Tsunematsu et al. |
| 6,010,619 A | 1/2000 | Wise et al. |
| 6,136,085 A | 10/2000 | Adams, Jr et al. |
| 6,251,356 B1 | 6/2001 | Mathur |
| 6,264,736 B1 | 7/2001 | Knopf et al. |
| 6,440,209 B1 | 8/2002 | Ravishankar et al. |
| 6,475,459 B1 | 11/2002 | Virtanen |
| 6,562,451 B2 | 5/2003 | Syoda et al. |
| 6,623,555 B1 | 9/2003 | Haverinen et al. |
| 6,726,807 B1 | 4/2004 | Mathur |
| 7,048,900 B2 | 5/2006 | Mathur et al. |
| 7,060,127 B2 | 6/2006 | Tanabe et al. |
| 7,485,367 B2 | 2/2009 | Chen et al. |
| 7,611,606 B2 | 11/2009 | Soga et al. |
| 7,722,850 B2 | 5/2010 | Geerlings et al. |
| 7,749,476 B2 | 7/2010 | Constantz et al. |
| 7,758,690 B2 | 7/2010 | Nutbeem et al. |
| 8,227,028 B2 | 7/2012 | Egami et al. |
| 8,252,413 B2 | 8/2012 | Shimono et al. |
| 8,354,169 B2 | 1/2013 | Feeney et al. |
| 8,415,022 B2 | 4/2013 | Haenen et al. |
| 8,415,267 B2 | 4/2013 | Lee |
| 9,580,867 B2 * | 2/2017 | Mathur ................. D21H 19/40 |
| 9,637,864 B2 | 5/2017 | Mathur |
| 9,708,770 B2 * | 7/2017 | Mathur ................. D21H 19/12 |
| 10,077,363 B2 * | 9/2018 | Mathur ................. C09C 1/0093 |
| 2003/0051841 A1 | 3/2003 | Mathur et al. |
| 2003/0161894 A1 | 8/2003 | Yaniv |
| 2004/0108082 A1 | 6/2004 | Hughes |
| 2005/0103459 A1 | 5/2005 | Mathur |
| 2005/0173088 A1 | 8/2005 | Grimsley |
| 2006/0144535 A1 | 7/2006 | Nguyen et al. |
| 2006/0272549 A1 | 12/2006 | Mathur et al. |
| 2007/0246179 A1 | 10/2007 | Silenius et al. |
| 2008/0008846 A1 | 1/2008 | Zhou et al. |
| 2008/0096008 A1 | 4/2008 | Yoshimura et al. |
| 2008/0163992 A1 | 7/2008 | Mohan et al. |
| 2008/0264302 A1 | 10/2008 | Azui et al. |
| 2010/0239761 A1 | 9/2010 | Haenen et al. |
| 2010/0282127 A1 | 11/2010 | Gerard et al. |
| 2010/0304057 A1 | 12/2010 | Zeng et al. |
| 2011/0003958 A1 | 1/2011 | Nakazawa |
| 2011/0011305 A1 | 1/2011 | Maijala et al. |
| 2011/0229580 A1 | 9/2011 | Srivastava et al. |
| 2012/0082602 A1 | 4/2012 | Munz et al. |
| 2012/0088602 A1 | 4/2012 | Morken |
| 2012/0312194 A1 | 12/2012 | Riman et al. |
| 2013/0000518 A1 | 1/2013 | Raper et al. |
| 2013/0195748 A1 | 8/2013 | Pohl et al. |
| 2014/0069302 A1 | 3/2014 | Saastamoinen et al. |
| 2014/0318418 A1 | 10/2014 | Mathur |
| 2015/0050487 A1 | 2/2015 | Mathur |
| 2017/0058458 A1 | 3/2017 | Mathur |
| 2017/0204270 A1 | 7/2017 | Mathur |

FOREIGN PATENT DOCUMENTS

| | | |
|---|---|---|
| CN | 105377575 B | 12/2017 |
| EP | 2546410 A1 | 1/2013 |
| WO | WO 95/03251 | 2/1995 |
| WO | WO 2001/092422 A1 | 12/2001 |
| WO | WO 03/020642 A3 | 3/2003 |
| WO | WO 2003/085199 A2 | 10/2003 |
| WO | WO 2009/142739 A1 | 11/2009 |
| WO | WO 2014/176579 A3 | 10/2014 |

OTHER PUBLICATIONS

Potapov, V.V., Gorbach, V.A., et al., Silica Powders Production From Hydrothermal Solutions, Proceedings, Thirty-Sixth Workshop on Geothermal Reservoir Engineering, Stanford University, Stanford, California, Jan. 31-Feb. 2, 2011 (7 pages).

PCT International Search Report (5 pages) and Written Opinion of the International Searching Authority—PCT/US2014/035587 (14 pages) (dated Nov. 28, 2014) ISA:—United States.

SIPO—Search Report—Chinese Patent Application No. 201480023240. 1—Language (2 pages)—dated Oct. 10, 2016.

SIPO—Search Report—Chinese Patent Application No. 201480023240. 1—English Language Translation (2 pages)—dated Oct. 10, 2016.

EPO—Supplementary European Search Report_EP14788390 (dated Nov. 18, 2016)—1 page.

* cited by examiner

SEM of Nano-Composite (SAS & FCA)

SEM of Crystalline Xonotlite (CSH)

SEM of Nano-Composite (SAS & FCA)

XRD of Nano-Composite (SAS & FCA)

SEM of Tobermorite

SEM of Xonotlite

Aragonite Calcium Carbonate

Scalenohedral Calcium Carbonate

Stacked Rhombohedral Calcium Carbonate

SEM of Crystalline Xonotlite (CSH)

SEM of Nano-Composite (SAS & FCA)

FIBROUS STRUCTURED AMORPHOUS SILICA INCLUDING PRECIPITATED CALCIUM CARBONATE AND COMPOSITIONS OF MATTER MADE THEREWITH

RELATED PATENT APPLICATIONS

This application is a continuation application and claims priority under 35 USC § 120 of prior and now pending U.S. patent application Ser. No. 15/470,840 filed Mar. 27, 2017, which application is a divisional and claimed priority under 35 USC § 121 of U.S. patent application Ser. No. 14/262,741 filed Apr. 26, 2014, (now U.S. Pat. No. 9,637,864 B2 issued May 2, 2017) which application claimed priority under 35 USC. § 119(e) from U.S. Provisional Patent Application Ser. No. 61/816,649, filed Apr. 26, 2013, entitled FIBROUS STRUCTURED AMORPHOUS SILICA INCLUDING PRECIPITATED CALCIUM CARBONATE, COMPOSITIONS OF MATTER MADE THEREWITH, AND METHODS OF USE THEREOF, the disclosures of each are incorporated herein in their entirety, including the specification, drawing, and claims, by this reference.

STATEMENT OF GOVERNMENT INTEREST

Not Applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to novel fillers and pigments, to compositions of matter including such compositions, and to methods of use of such compositions.

BACKGROUND

Fillers and pigments are key components in many industrial markets, such as paper, paints, plastics, concrete, and pharmaceuticals. Fillers and pigments are utilized to reduce cost, improve functionality, and to improve the end use performance, One widely used pigment is titanium dioxide ($TiO_2$), which is used to provide brightness and light scattering properties. Another widely used pigment is fumed silica, which may be added to some compositions to provide thixotropic attributes, for example, in paint products. A different product, but with a similar sounding name, is silica fume, which will also be further discussed below.

In paper products, commodity filler or pigment products such as synthetic precipitated calcium carbonate (PCC), or ground calcium carbonate (GCC) are often used. Various forms of PCC used include calcite crystalline structures, aragonite crystalline structures, and rhombohedral crystalline structures. Such crystalline structures are generally characterized by low aspect ratios, moderate brightness, and moderate light scattering power. Some of such materials provide improved optical properties. And, some of such materials enhance desired finished product attributes such as paper strength, when used in paper furnish, or print qualities, when used in paper coatings. However, there remains a significant need in various paper products for fillers and/or pigments which might improve light scattering power. Similarly, in certain paint products, and uses thereof, there remains a need for improved light scattering power in fillers and/or pigments.

Titanium dioxide is one of the most widely used pigments in many industries, such as paints, paper, coatings, and in some composites. Such use may often be to improve brightness, and/or to improve opacity. The property of improved opacity means that light scattering properties are improved, which provides a product that is harder to see-through. For example, thin papers may be made more opaque (i.e., made with see-through properties that make it look as if it were actually thicker) by the use of fillers with opacifying properties. The provision of such properties in products using titanium dioxide is primarily due to a combination of characteristics of titanium dioxide, such as a high refractive index (in the range of from about 2.49 to about 2.61), a small particle size (often in the 0.2 micron to 0.4 micron size), and in the manner in which adjacent particles of titanium dioxide pack together when used in various products. However, despite having a unique shape, size, and crystal structure, titanium dioxide has certain limitations. First, it has a very high density of about 4.2 grams per cubic centimeter. Further, in order to keep small titanium dioxide particles from agglomerating in various compositions, dispersants must often be used. Such dispersants usually have deleterious effects on strength properties, especially in the case of coated paper. Also, titanium dioxide particles are highly abrasive. Finally, due to the complexity of some widely used titanium dioxide manufacturing processes, which may include complex separation and purification processes, titanium dioxide is one of the most expensive fillers and/or coating pigments currently available.

Another filler and/or pigment that may be utilized in some applications is fumed silica. Fumed silica (also called pyrogenic silica) is generally manufactured from flame pyrolysis of silicon tetrachloride, or by the vaporization of quartz in a 3000° C. arc furnace. The primary particle surface area of most fumed silica is broadly in the range of from about 50 to about 600 square meters per gram. Furthermore, amorphous fumed silica particles may be fused into chainlike secondary particles which, in turn, agglomerate into tertiary 3-dimensional particles. One limitation of fumed silica material is that it is non-porous. Also, fumed silica is generally highly thixotropic, and consequently may cause high viscosity compositions, for example when added to paints and coatings. Also, the environmental impacts of the manufacturing processes for fumed silica, and the usually high cost of fumed silica, limit its use.

Silica fume (also called micro-silica, and not to be confused with the just discussed fumed silica) is an amorphous (i.e., non-crystalline) material. Silica fume is often collected as an ultra-fine powder as a by-product of silicon or ferrosilicon alloy production. Silica fume is generally in the form of spherical particles with an average particle size of about 150 nanometers. Silica fume has a surface area in the range of from about 15 to about 30 square meters per gram. Also, silica fume is a highly pozzolinic material, and thus may be used in cement and concrete to enhance compressive strength, bond strength, and abrasion resistance. However, at this time, silica fume, being a byproduct of production of other materials, is in relatively short supply.

With respect to the manufacture of amorphous silica compounds, U.S. Pat. No. 4,230,765, issued Oct. 28, 1980 to Takahashi et al., for NOVEL AMORPHOUS SILICA, and PRODUCTS THEREOF, describes methods for manufacture of various types of amorphous silica compounds from calcium silicate hydrates. However, he did not develop products of size and of certain characteristics to provide suitable performance for use in high performance paper coatings of that are described herein. Further, he did not recognize that by carefully controlling the reaction conditions, fixation of calcium carbonate phases to an amorphous silica substrate could be selectively determined, and in so doing, enhance properties provided by such products, especially for high performance paper coating compositions.

In summary, the just discussed fillers and/or pigments are generally of limited purpose. In many applications, each may have a single or limited number of product enhancing properties. Thus, there remains an as yet unmet need for a multi-functional filler and/or pigment that may, in many applications, replace expensive fillers and pigments such as titanium dioxide, fumed silica, or silica fume. It would be advantageous if such a new filler and/or pigment provided a combination of at least some ideal properties, such as (1) high surface ratio, (2) high aspect ratio, (3) high brightness, and (4) high light scattering coefficient. And, it would be even more advantageous if such a multi-functional filler and/or pigment were environmentally safe, and available at prices competitive with expensive fillers such as titanium dioxide, fumed silica, or silica fume. Consequently, it is believed that provision of a unique multi-functional filler and/or pigment would be an interesting and significant contribution to the art and science of fillers and pigments.

BRIEF DESCRIPTION OF THE DRAWING

Various aspects of the developments described herein will be described by way of exemplary embodiments, illustrated in the accompanying drawing figures in which like reference numerals denote like elements, and in which.

Figure 1:
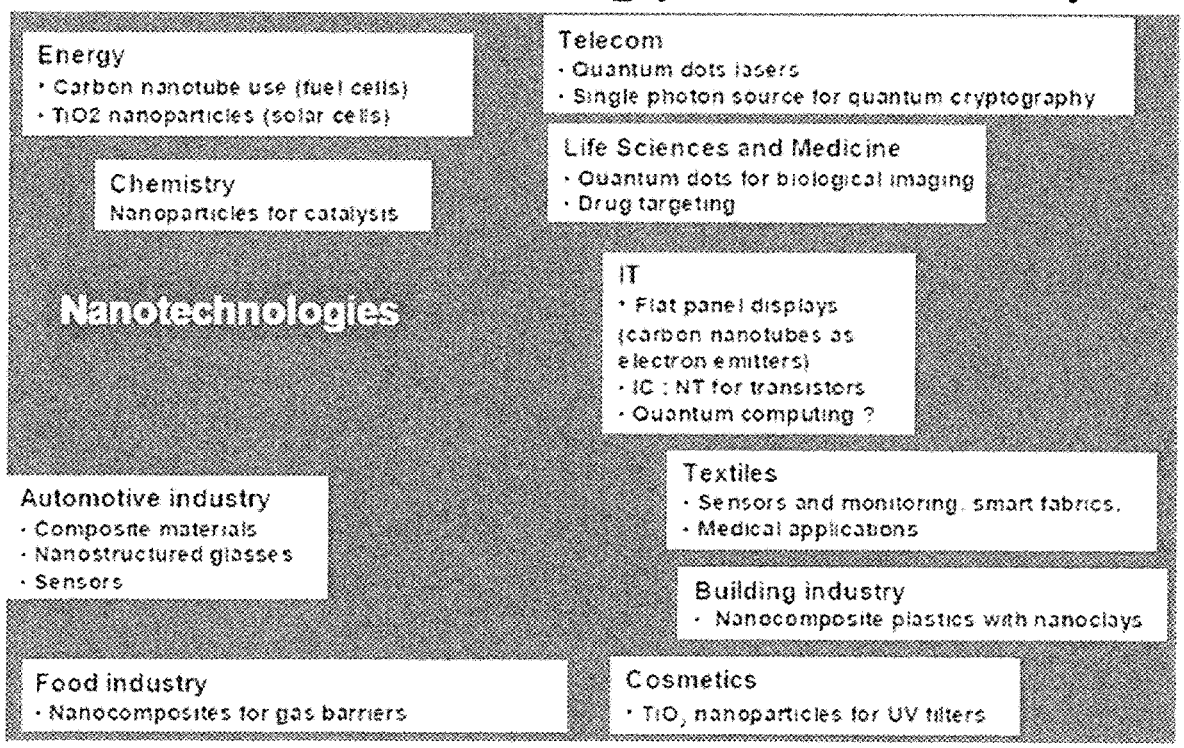
FIG. 1 is a diagram released by PIRA International in November 2005 titled The Nanotechnology Marketplace; the diagram indicates various industries that may benefit from nanotechnology, and lists some of the key areas in which research is being conducted as regards nanomaterials.

In the various figures of the drawing, like features may be illustrated with the same reference numerals, without further mention thereof. Further, the foregoing figures are merely exemplary, and may contain various elements that might be present or omitted from actual implementations of various embodiments depending upon the circumstances. An attempt has been made to provide the figures in a way that illustrates at least those elements that are significant for an understanding of the various embodiments and aspects of the developments described herein. However, various other elements for a multi-functional filler and/or pigment, especially as applied for various compositions using the same, may be utilized in order to provide useful, reliable, and highly functional fillers and/or pigments.

SUMMARY

I have now developed a novel, multi-functional, nano-composite filler. The filler includes a synthetic fibrous structured amorphous silica ("SAS") component and a nano-fibrous crystalline aragonite precipitated calcium carbonate ("FCA") component, which together may be abbreviated as a "SAS & FCA" nano-composite. In an embodiment, such a nano-composite filler maybe characterized as having high surface area (from about 40 to about 200 meters squared per gram). In an embodiment, when mixed with water, such a nano-composite filler and water mixture results in a pH in a relatively neutral range of from about 6.5 to about 7.5. In an embodiment, such unique nano-composites (SAS & FCA) may have a high water absorption rate, for example in the range of from about 100% to about 300%. In an embodiment, such unique nano-composites (SAS & FCA) may have a high oil absorption rate, for example in the range of from about 150% to about 300%.

Figure 2:
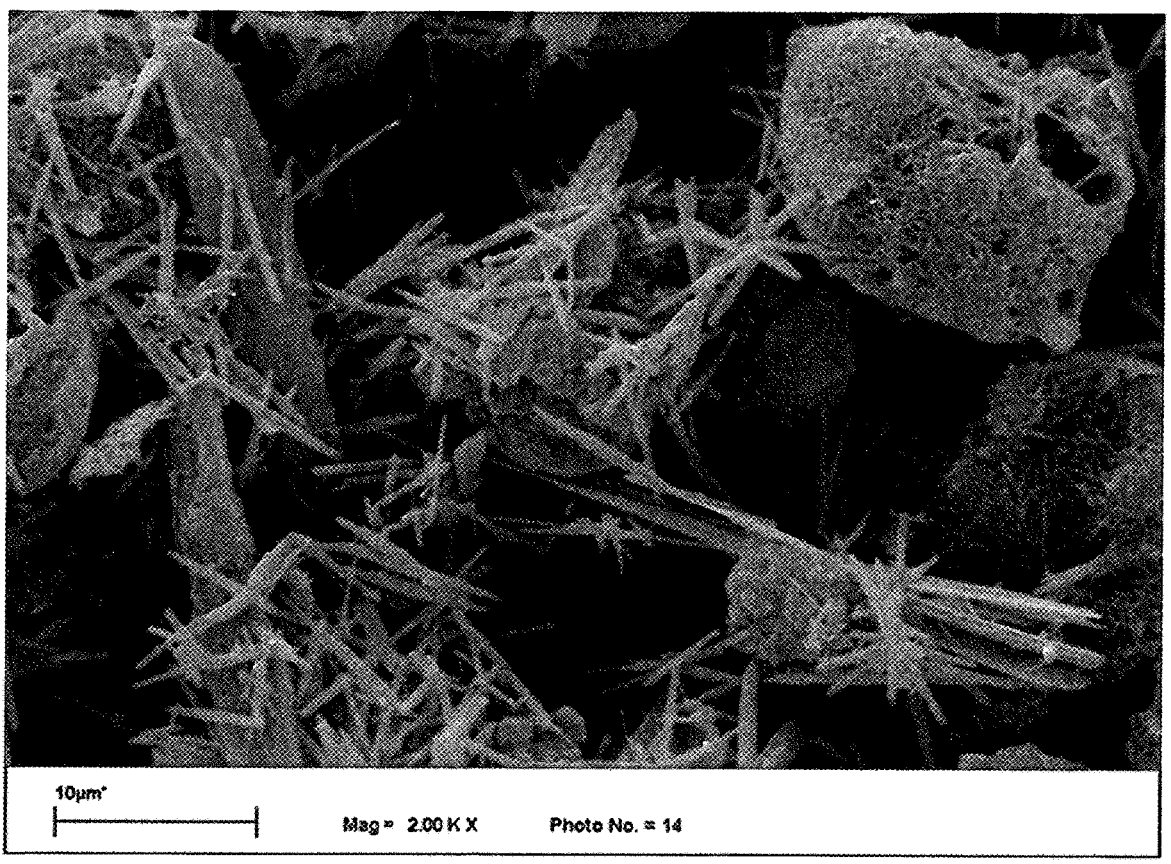
FIG. 2 is a photograph, as seen through a scanning electron microscope at a 2000 times magnification, of a novel nano-composite material including a fibrous pillow in haystack structure having interstitial spaces between at least some of the adjacent fibers of nano-structured amorphous silica, and having a nano-fibrous crystalline aragonite phase of precipitated calcium carbonate therein or thereon, or protruding therefrom (together the nano-composite material may be described using the abbreviation "SAS & FCA"), made as described herein, showing elongated "needle" shaped crystals at the center and bottom of the picture which are fibrous crystalline aragonite, while the shapes in the upper right corner and along the right side of the picture include primarily a structured amorphous silica product in a haystack configuration that presents a fibrous appearance having interstitial spaces between adjacent fibrous elements.

In an embodiment, as shown in FIG. 2, a nano-composite SAS & FCA material may include at least two distinct components. As shown in FIG. 2, a first component having a globular, haystack, or pillow shaped structure may be provided. The globular, haystack, or pillow shaped structure may be provided in a configuration that presents a fibrous interstitial appearance, having inner layers and outer layers with irregular interlacing fibers or filaments which are fixed and disposed in relation to each other wherein the interlacing fibers or filaments of at least some of said inner layers are visible to a greater or less degree through the interstices of said outer layers, when said fibrous structure is viewed via microscope. In an embodiment, such globular or haystack or pillow shaped structure may be sized from about ten (10) microns to about forty (40) microns in size. In an embodiment, such globular "hay stack" type structure may be composed of "hair" like nano-fibers of amorphous silica, each having a selected diameter and a selected length. In an embodiment, the diameter of such amorphous silica fibers of may be in the ten (10) nanometer (nm) range. In an embodiment, the amorphous silica fibers may be in the range of from about three (3) to about four (4) microns in length. In an embodiment, the aspect ratio of such amorphous silica nano-fibers may be approximately 100:1.

In an embodiment, a second component may be provided in a nano-composite (SAS & FCA) material. In an embodiment, a second component may be provided as an aragonite crystal. In an embodiment, such an aragonite crystal may have a "needle" shaped fiber structure. In an embodiment, or in various embodiments, such aragonite crystals may have an estimated diameter of from about 100 nm to about 200 nm. In an embodiment, or in various embodiments, such aragonite crystals may have a length of from about 3 microns to about 10 microns.

Figure 60:
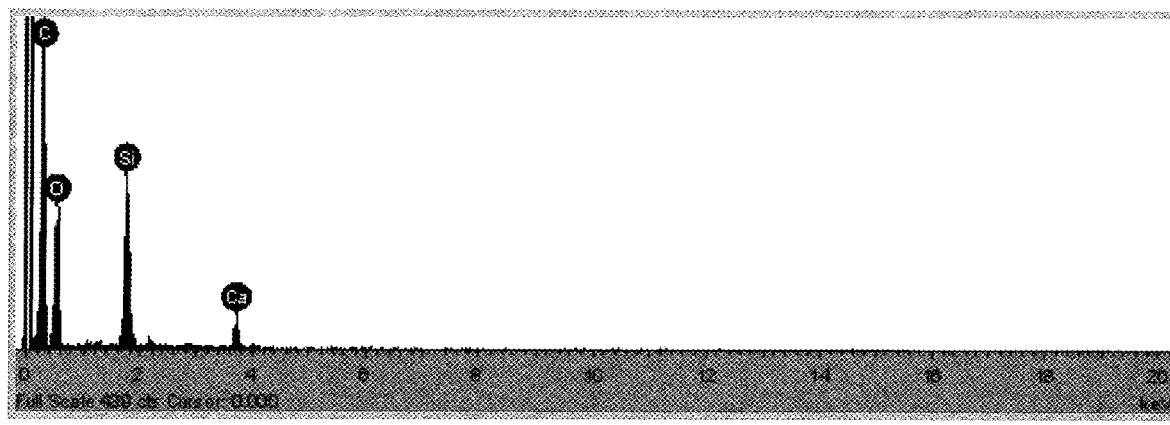
FIG. 60 is a graph of the energy dispersive spectroscopy ("EDS") analysis provided by EDAX Corporation of the unique nano-composite material (SAS & FCA) containing structured amorphous silica ("SAS") and a fibrous calcium carbonate in a selected phase, namely aragonite ("FCA").

In summary, a novel nano-composite material is described herein. Such nano-composite material includes a synthetic fibrous structured amorphous silica component (the "SAS" component), and a nano-fibrous crystalline precipitated calcium carbonate in the aragonite phase component (the "FCA" component). As set forth in the drawing figures, an X-ray diffraction pattern (XRD) analysis of the unique nano-composite material identified only a single crystalline constituent, which matched the X-ray diffraction (XRD) pattern of an aragonite precipitated calcium carbonate (see FIG. 3), with major peaks at 3.276, 3.398, and 1.977 D-spacing (angstroms). Thus the first structure is amorphous silica, rather than a crystalline calcium silicate hydrate. Further, as noted in FIG. 60, an EDAX analysis confirmed the first component to be silica. Thus, the unique nano-composite material described herein includes first component of amorphous silica, and a second component of crystalline aragonite.

Further, the nano-composite (SAS & FCA) is believed useful as filler, for example, in paints and coatings. And, initial tests have indicated that the nano-composite (SAS & FCA) material is useful as a component of coating compounds, especially in the manufacture of paper and paper products. A myriad of uses may be developed, based on the unique properties of such synthetic nano-composite (SAS & FCA) materials, as indicated in evaluations thus far conducted.

The foregoing briefly describes a novel, unique nano-composite that includes a first component of amorphous silica, and a second component of aragonite crystals. As described herein, such aragonite crystals may advantageously be synthesized by way of pressure carbonation technique. However, the various objectives, features and advantages of the novel nano-composite materials described herein will be more readily understood upon consideration of the following detailed description, taken in conjunction with careful examination of the accompanying figures of the drawing.

DETAILED DESCRIPTION

Figure 3:
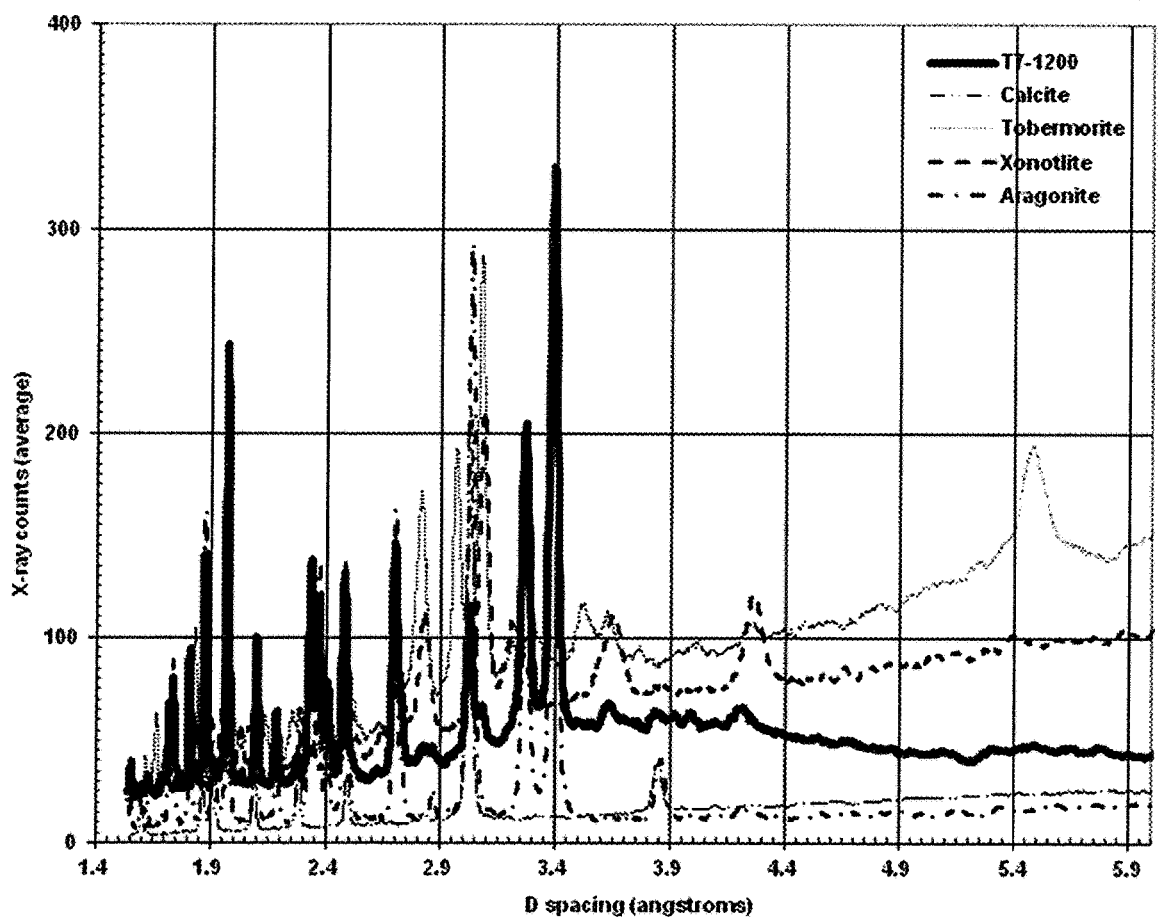
FIG. 3 is a graph of an X-ray diffraction (XRD) scan of the sample just shown in FIG. 2 above, along with scans of control compounds including calcite, tobermorite, xonotlite, and aragonite; the data indicates that the sample includes XRD peaks at the same locations as the aragonite crystalline sample, with a minor amount of tobermorite crystals.

A unique nano-composite material has been developed which includes both (a) nano-fibrous structured amorphous silica (SAS) and (b) nano-fibrous crystalline aragonite precipitated calcium carbonate (FCA). Thus, this novel nano-composite material may be referred to herein by the abbreviation "SAS & FCA". In one aspect, the SAS & FCA nano-composite material may be characterized by having high surface area (approximately 40 to 200 $m^2$/gram). The pH of the SAS & FCA nano-composite material, when mixed with water, is generally in the neutral range of from about 6.5 to about 7.5. In an embodiment, an SAS & FCA nano-composite material may have very high water absorption, and very high oil absorption ability, in the range of from about 100% to about 300% for water absorption, and from about 150% to about 300% for oil absorption. As seen in FIG. 2, a scanning electron microscope (SEM) picture clearly shows two distinct components for a SAS & FCA nano-composite material. The first components (an example is seen prominently at the upper right) are globular or haystack or pillow shaped structures, which may in an embodiment be from approximately 10 microns to approximately 40 microns in size. Such first components includes "hair like" nano-fibers, which in an embodiment may be approximately 10 nanometers (nm) in diameter. In an embodiment, those hair like nano-fibers may be from about 3 microns to about 4 microns in length. An energy dispersive x-ray spectroscopy ("EDAX") analysis confirmed the presence of $SiO_2$ in such hair like nano-fibers. As also seen in FIG. 2, the second components are "needle" shaped fiber like structures with an estimated diameter (but not limited thereto) of from about 100 nm to about 200 nm and with a length generally ranging in size (but not limited thereto) from about 3 microns to about 10 microns. As shown in FIG. 3, it is significant to note that the X-Ray Diffraction pattern (XRD) analysis identified only a single crystalline component, which matched the XRD pattern of a precipitated calcium carbonate in the aragonite phase (see FIG. 3) with major peaks at 3.276, 3.398, and 1.977 D-spacing (in angstroms). Such analysis confirms that in an embodiment, the nano-composite material described herein may include structured amorphous silica ($SiO_2$) and fibrous crystalline aragonite carbonate. Consequently, it can be appreciated that the substances comprising the structures provided by selected precursor crystalline calcium silicate hydrates ("CSH")—such as xonotlite—react and are converted substantially in place into amorphous silica. Thus, precursor crystalline calcium silicate hydrates may, under conditions described herein, be replaced by amorphous silica. Thus, the amorphous silica structures, and the associated fibrous crystalline calcium carbonate structures which is in an aragonite phase, are produced as a nano-composite material. In further detail, the structure of the nano-composite SAS & FCA material includes an amorphous silica portion having a haystack or pillow shaped configuration that presents a fibrous interstitial appearance, having inner layers and superimposed outer layers with irregular interlacing fibers or filaments which are fixed and disposed in relation to each other wherein the interlacing fibers or filaments of at least some of the inner layers of the structured amorphous silica are visible to a greater or less degree through the interstices of outer layers of the structured amorphous silica, when the nano-composite material is viewed via scanning electron microscope. Further, the crystalline calcium carbonate portion includes crystalline aragonite structures built within, or on, or within and on, or at least in part extending from, the amorphous silica portion of the nano-composite material. Thus, in an embodiment, the just described "nano-composite" material simultaneously provides certain characteristics that enable filler and/or pigment performance both of amorphous silica and of a crystalline calcium carbonate in an aragonite phase, as will be further understood below in relation to examples provided.

Method for Manufacture—Materials and the Process

In an embodiment, one unique aspect of the developments described herein may involve the use of various phases of synthetic calcium silicate hydrates (CSH) and the use of carbon dioxide ($CO_2$) under pressure, to manufacture a nano-composite material including both (a) amorphous silica and (b) fibrous crystalline calcium carbonate (which in an embodiment is provided in the aragonite phase).

Figure 4:
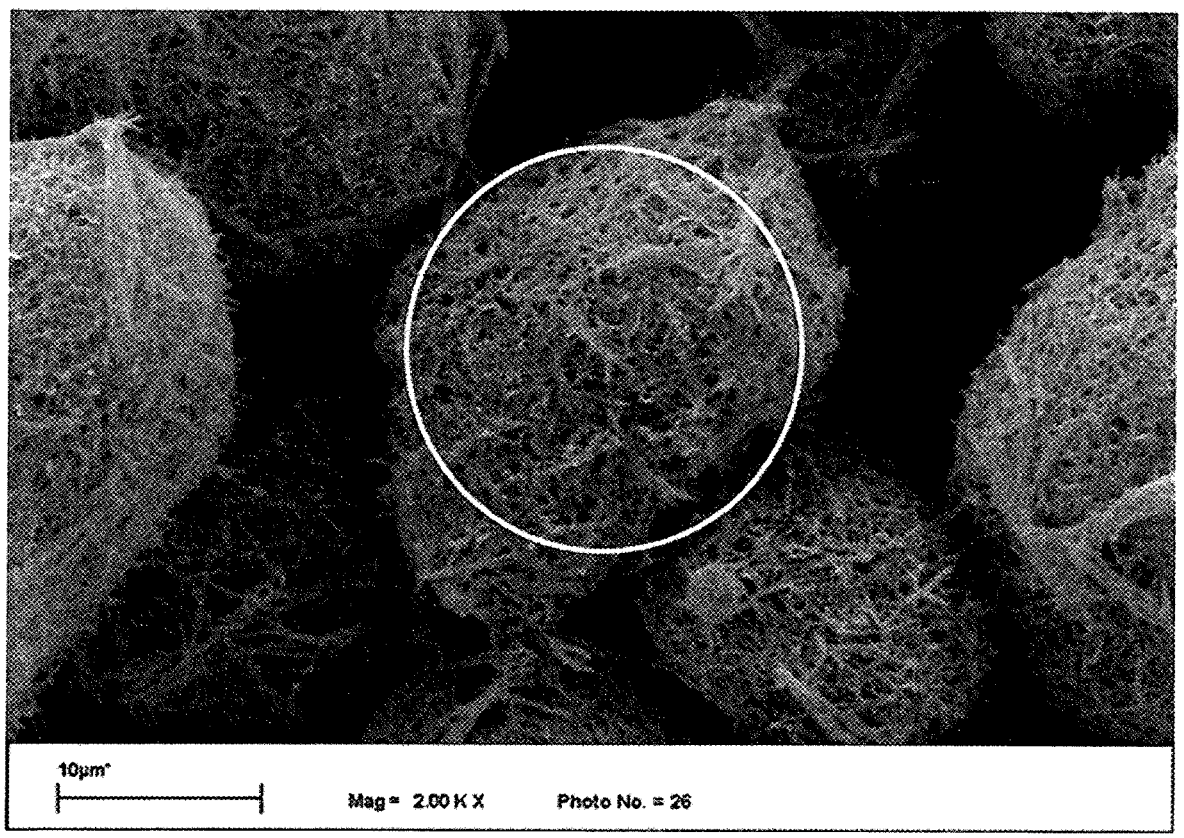
FIG. 4 is a photograph taken by a scanning electron microscope (SEM) at 2000 times magnification of an embodiment for a synthetic nano fibrous calcium silicate hydrate (CSH) in the form of a synthetic xonotlite. The xonotlite was produced to serve as a replaceable substrate in the production of a novel nano-composite (SAS & FCA) material as described herein. The circled area shows a secondary porous macro structure of the material that in this embodiment is about 20 microns by 40 microns in size, and which is provided in a haystack configuration that presents a fibrous appearance having interstitial spaces between adjacent fibrous elements.

FIG. 4 provides an SEM photograph crystalline xonotlite, of one of the calcium silicate hydrate (CSH) starting materials that may be utilized for producing a nano-composite SAS & FCA as described herein. The SEM photograph shows secondary particles ranging from about 10 microns to about 40 microns. In an embodiment, the secondary particles may be made up of nano-fibers of approximately 10 nm in diameter. In an embodiment, the secondary particles may be made up of nano-fibers of from about 3 microns to about 4 microns in length. In an embodiment, the secondary particles may be made up of nano-fibers having an aspect ratio of about 100:1. Such starting material may be further identified by the graph of the XRD analysis shown in FIG. 5. There, the materials is seen to have a major XRD peak at 3.22 angstroms and minor peaks at 2.04 and 8.50 angstroms, which conforms to the characteristics of a xonotlite crystal. While other types of calcium silicate hydrates may be used to manufacture a nano-composite material as described herein (e.g., riversidite, or tobermorite, or foshagite), at the present time, it is believed that the conversion efficiency may be higher when using a xonotlite phase calcium silicate hydrate.

A novel development described herein is a process to convert a crystalline silicate hydrate such as xonotlite into amorphous silica. In an embodiment, such conversion may be achieved while concurrently producing a synthetic crystalline calcium carbonate in the aragonite phase. Such a process may involve the reaction of xonotlite with carbon dioxide ($CO_2$) under pressure, and thus may generally be referred to as a process for pressure carbonation of nano-fibrous calcium silicate hydrates. The SEM photograph and XRD patterns of the carbonated product resulting from reaction with xonotlite calcium silicate hydrate as a starting material are given in FIGS. 6 and 7 respectively. Here again, the SEM photograph shows two distinct components in the nano-composite material, namely amorphous silica (within the solid circle) and fibrous crystalline aragonite calcium carbonate (within the dashed oval). In spite of the appearance of the structures, the XRD of the nano-composite material identifies only a single crystalline phase, namely aragonite phase calcium carbonate.

In one aspect, the process described herein includes the use of seed materials for enhancement of reactions, as such materials may promote conversion efficiency. The efficiency of a pressure carbonation process may be enhanced by using seed materials and/or promoters or catalysts, such as preformed amorphous silica, which may be provided with, or without the use of an aragonite crystal. In an embodiment, reaction promoters and/or catalysts may include calcium hydroxide, and/or magnesium hydroxide.

Another aspect of the developments described herein is mineral fixation of carbon dioxide by the manufacture of synthetic calcium carbonate compositions as a component of a nano-composite SAS & FCA material. Thus, a novel process for producing precipitated calcium carbonate is described herein, which enables the efficient use of "free" carbon dioxide found in flue gas, and more particularly, which may use carbon dioxide from flue gas containing relatively low concentrations of carbon dioxide. Prior work, involving simply the production of precipitated calcium carbonate under pressurized conditions, was described in prior U.S. Pat. No. 6,125,356, entitled "High Speed Manufacturing Process for Precipitated Calcium Carbonate employing Pressure Carbonation" was issued Jun. 26, 2001, the disclosure of which is incorporated herein in its entirety by this reference. That process was capable of providing a variety of precipitated calcium carbonate (PCC) morphologies. Various precipitated calcium carbonates that can be manufactured by that process include distinct crystal morphologies, such as calcite scalenohedral as well as calcite rhombohedral of various aspect ratios, and aragonite. SEM photographs of such crystals may be seen in FIGS. 21, 22, 23, and 24. A PCC product manufactured under a pressure carbonation system may be referred to herein as a Super Precipitated Calcium Carbonate ("S-PCC").

The basic chemistry for producing precipitated calcium carbonates includes the steps of calcination, slaking, and carbonation. The following chemical reactions describe such steps:

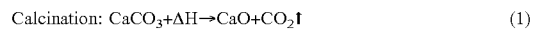

Calcination: $CaCO_3 + \Delta H \rightarrow CaO + CO_2\uparrow$ (1)

Slaking: $CaO + H_2O \rightarrow Ca(OH)_2 + \Delta H\uparrow \sim pH\ 12.4$ (2)

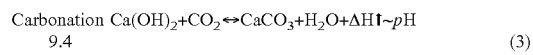

Carbonation $Ca(OH)_2 + CO_2 \leftrightarrow CaCO_3 + H_2O + \Delta H\uparrow \sim pH\ 9.4$ (3)

In order to produce the nano-composite product(s) described herein, an additional step is required, as follows:

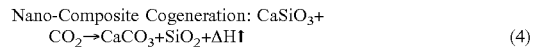

Nano-Composite Cogeneration: $CaSiO_3 + CO_2 \rightarrow CaCO_3 + SiO_2 + \Delta H\uparrow$ (4)

The carbonation reaction (equation (3) above) is an equilibrium reaction. Therefore, as the soluble calcium ion is converted to calcium carbonate ($CaCO_3$) precipitate, more dissolution of the calcium hydroxide ($Ca(OH)_2$) takes place from the slurry to increase the concentration of the calcium ion up to the solvent solubility limits (inverse temperature dependent phenomenon), until all of the available calcium hydroxide is dissolved, and all available calcium ions have been converted into calcium carbonate. When the process is further conducted to form nano-composite SAS & FCA material, as set forth in equation (4), it is of interest that carbon dioxide fixation using synthetic silicates under pressure is a novel method of carbon capture, i.e., fixation by mineralization.

Another aspect the developments described herein is the application of such dual component nano-composites in paper (as in substitution for conventional pigments and fillers), and in paperboard coatings, and in other industrial applications such as fillers or pigments for paints and/or coatings. As further described herein, the novel nano-structured materials described herein have some unique properties. In an embodiment, such properties may make it useful as filler in papermaking operations. In various embodiments, such use may provide some unusual and beneficial paper properties, or in unusual and beneficial paper coating properties, resulting in superior paper products when made with the nano-structured materials described herein.

In various embodiments, the nano-structured composite materials described herein may be used at various degrees of substitution for currently used high performance coating pigments such as titanium dioxide ($TiO_2$). In various embodiments, the nano-structured composite materials described herein may be used at various degrees of substitution for calcined and other naturally occurring clays. The unique nano-composites described herein may also be used to enhance the performance of various paper properties, such as to improve surface strength of coatings (pick strength), smoothness, appearance, shade, matte finish (lower sheet gloss), print quality, wet pick, and the like. In short, the nano-composite material described herein, including nano structured amorphous silica and nano-fibrous crystalline aragonite calcium carbonate, fits nearly all of the applicable criteria of an ideal pigment.

In an embodiment, a unique nano-composite including synthetic fibrous structured amorphous silica (SAS) and a nano fibrous crystalline aragonite precipitated calcium carbonate (FCA) is provided. In an embodiment, such nano-composite may be characterized by having high surface area (approximately 40 to 200 meters squared per gram). In water suspension, an embodiment of such unique nano-composite material may have a pH in the neutral pH range of 6.5 to 7.5. In an embodiment, such nano-composite may have a very high water absorption, say in the range of from about 100% to about 300%. In an embodiment, such nano-composite may have a high oil absorption, say in the range of from about 150% to about 300%. The scanning electron microscope (SEM) photograph set forth in FIG. 2 clearly shows two distinct components. The first component shown in the photograph is a globular, haystack, or pillow shaped structure of approximately 10 microns to 40 microns in size. The first structure includes "hair like" nano-fibers which in an embodiment may be approximately 10 nm in diameter. In an embodiment, such fibers may be about 3 microns to about 4 microns in length. Thus, in an embodiment, the aspect ratio of nano-fiber SAS & FCA may be approximately 100:1. The second and prominent components in the SEM photograph provided in FIG. 2 are the "needle" shaped fiber structures. In an embodiment, those prominent components have an estimated diameter of from about 100 nm to about 200 nm, and length ranging from about 3 microns to about 10 microns. Note that the X-Ray Diffraction (XRD) pattern analysis shown in FIG. 3 identified only a single crystalline component, which component matches the XRD pattern of calcium carbonate in the form of aragonite, with major peaks at 3.276, 3.398, and 1.977 D-spacing (in angstroms). Thus, the other structure was amorphous, rather than crystalline. An energy dispersive x-ray spectroscopy ("EDAX") analysis (see FIG. 60) confirmed that the amorphous structure was silica. Thus, nano-composite SAS & FCA which has been developed is a composite of structured amorphous silica (SAS) and fibrous crystalline aragonite (FCA).

Figure 12:
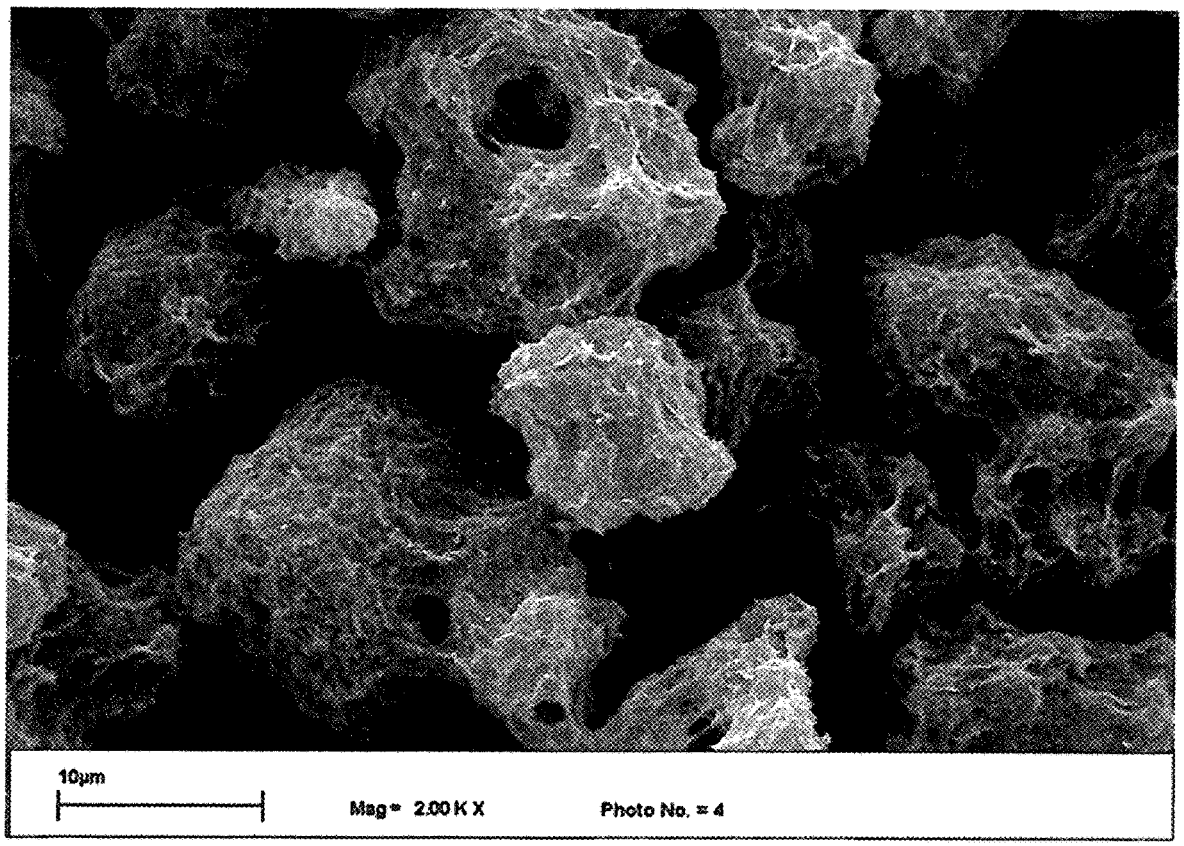
FIG. 12 is a photograph taken using a scanning electron microscope (SEM) at 2000 times magnification, of a calcium silicate hydrate, namely riversidite.
Figure 13:
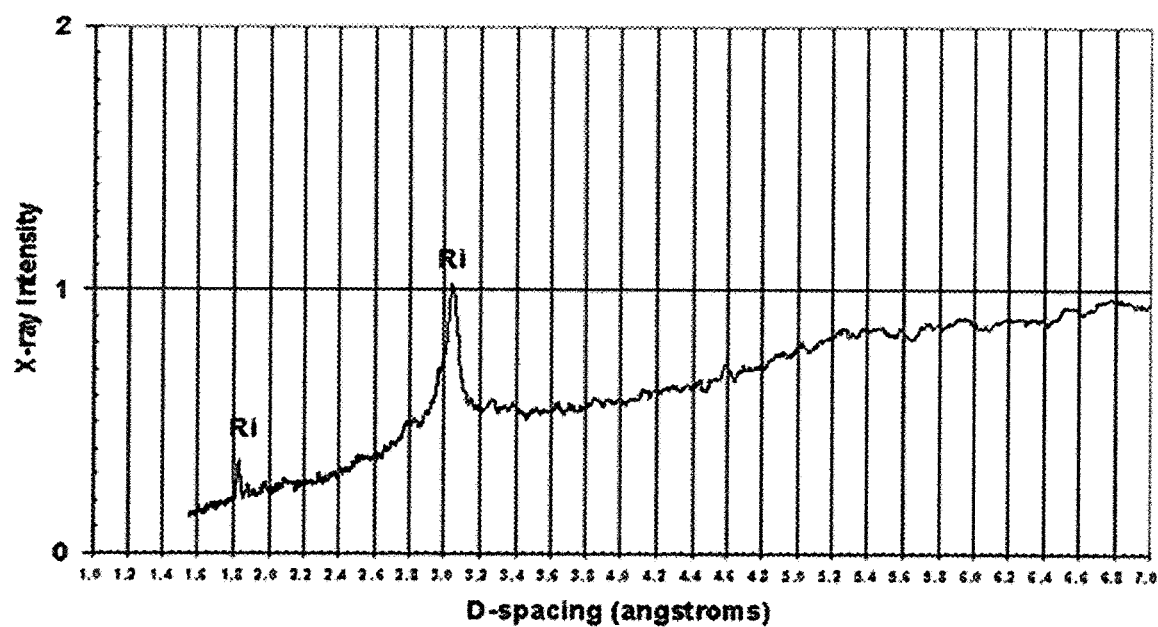
FIG. 13 is a graph of an X-ray diffraction (XRD) scan of a sample of the riversidite material just illustrated in FIG. 12; the two major XRD peaks for the riversidite material are labeled for easy reference.
Figure 14:
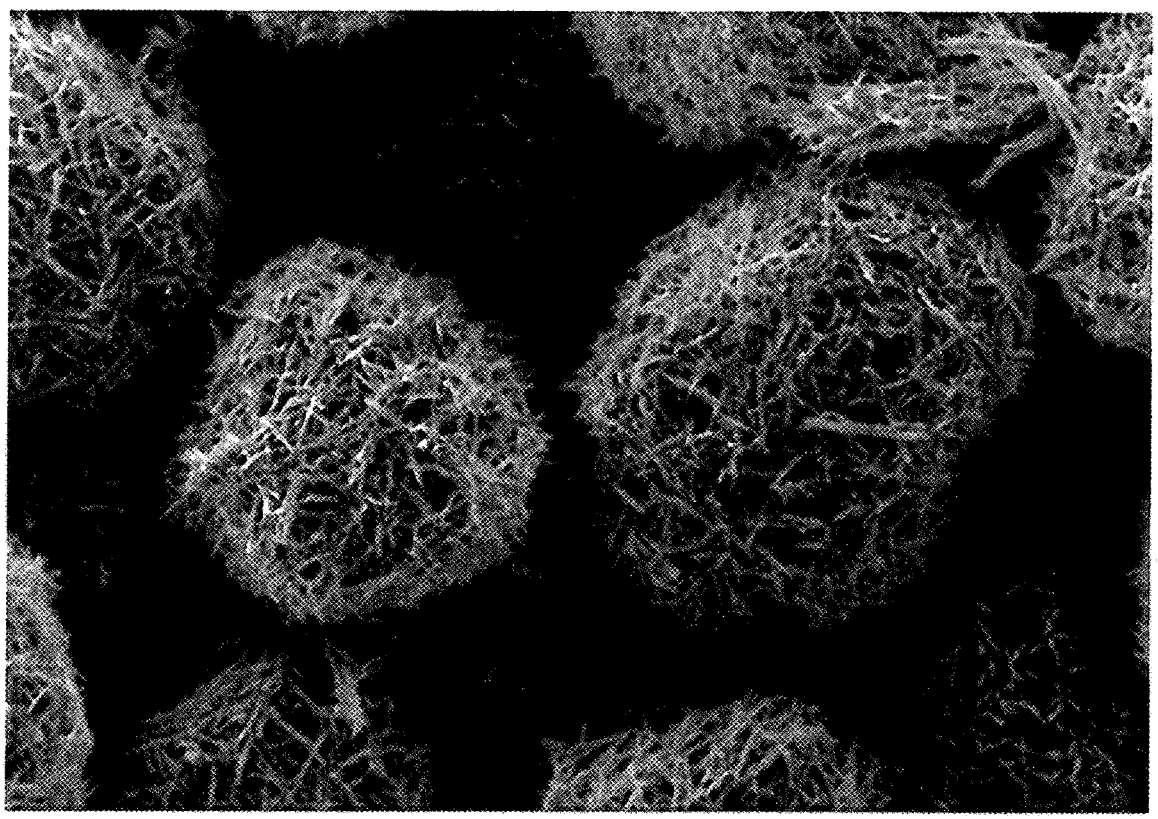
FIG. 14 is a photograph taken using a scanning electron microscope (SEM) at 2000 times magnification of another calcium silicate hydrate, namely foshagite.
Figure 15:
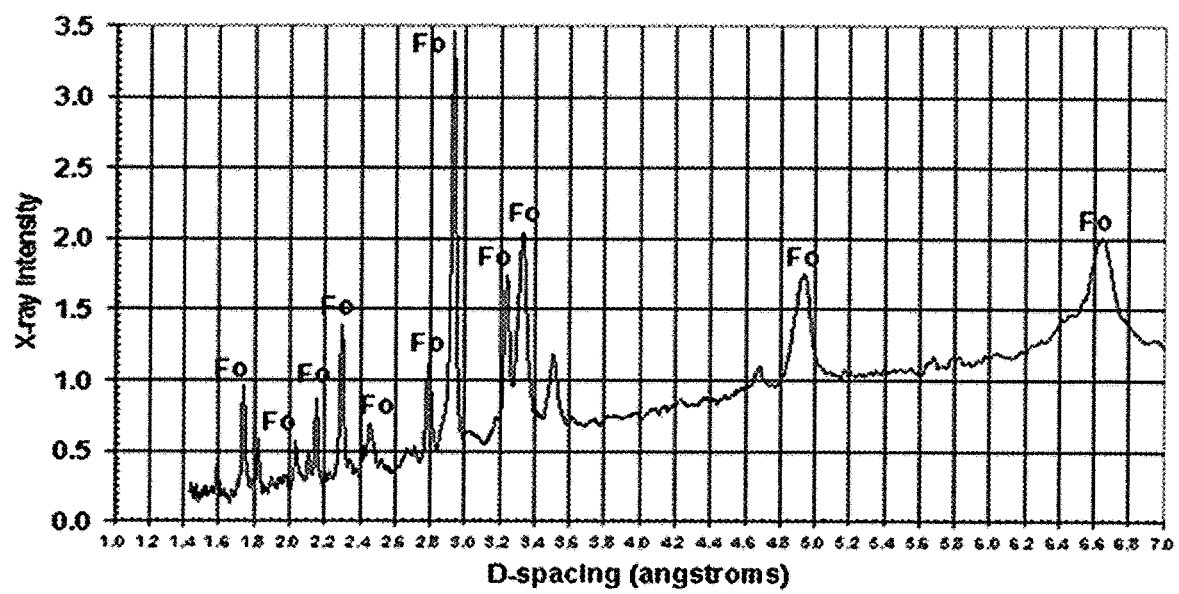
FIG. 15 is a graph of the X-ray diffraction (XRD) scan of a sample of the material just shown in FIG. 14; the major XRD peaks for this foshagite material are labeled for easy reference.
Figure 17:
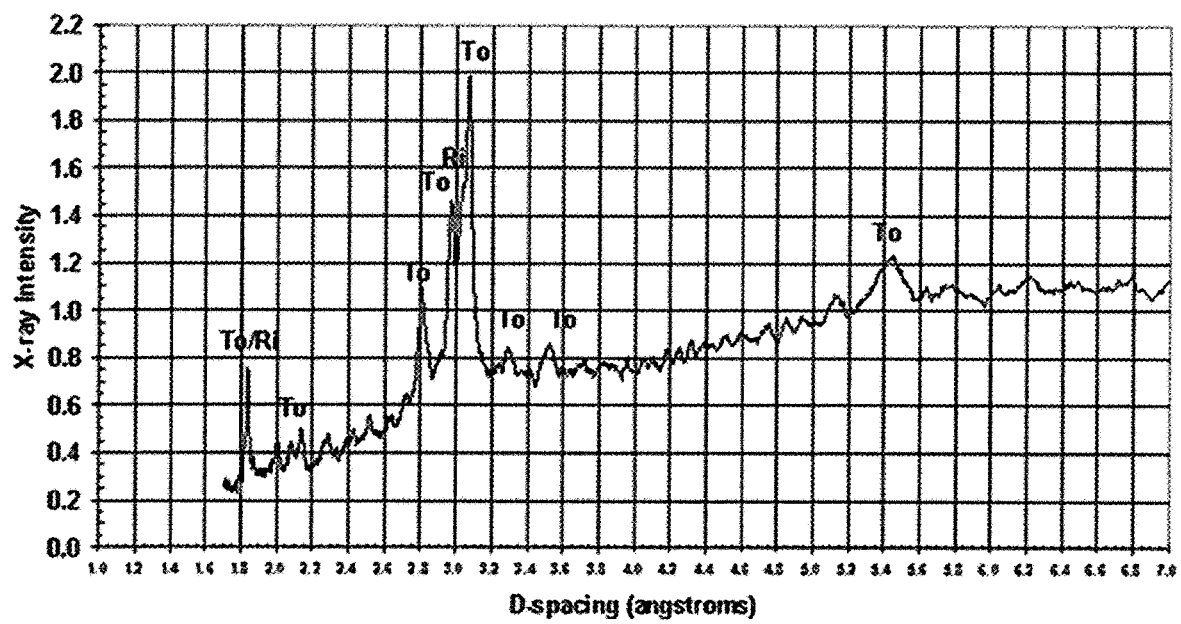
FIG. 17 is a graph of the X-ray diffraction (XRD) scan of a sample of the tobermorite material shown in FIG. 16, in which the major XRD peaks for tobermorite are labeled for easy reference; note that the major XRD peaks for riversidite also appeared in this XRD scan, and thus the major XRD peaks for riversidite are also included and labeled accordingly.
Figure 18:
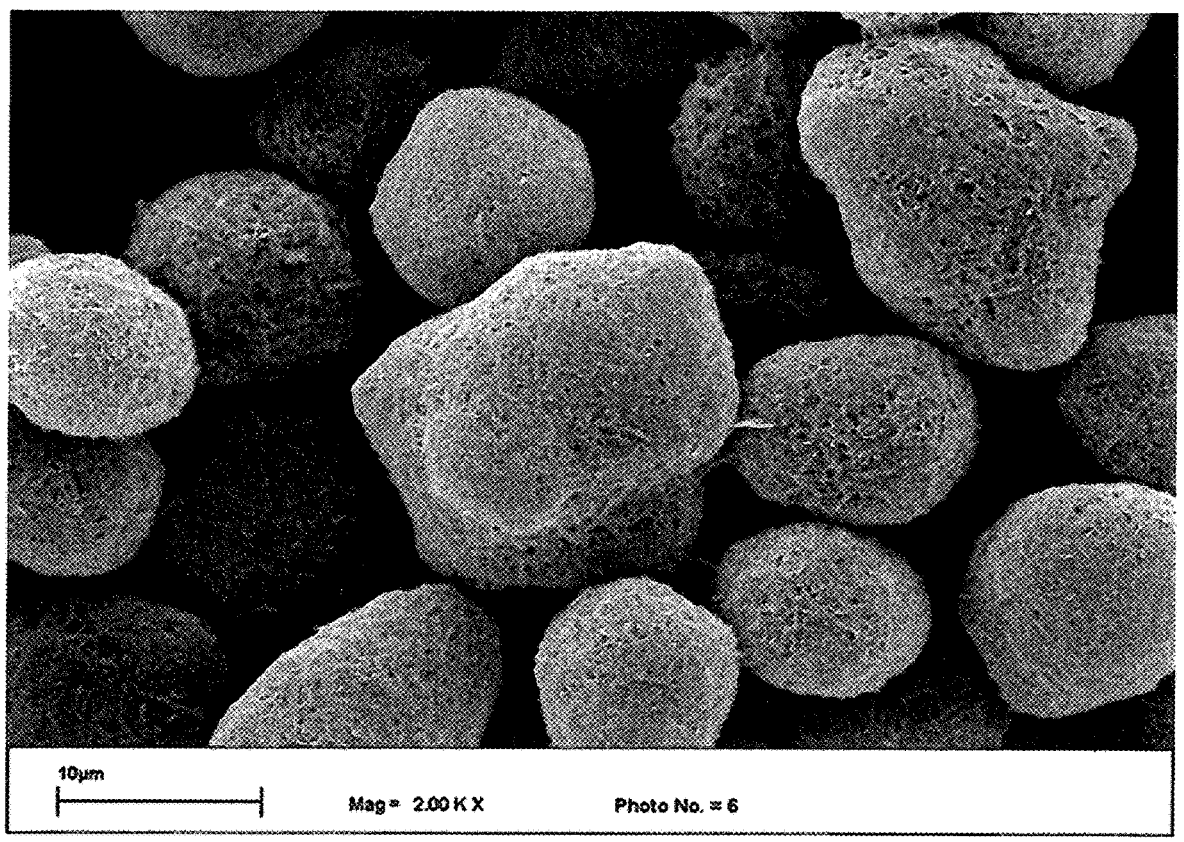
FIG. 18 is a photograph taken using a scanning electron microscope (SEM) at 2000 times magnification, illustrating another fibrous calcium silicate hydrate, namely xonotlite.
Figure 19:
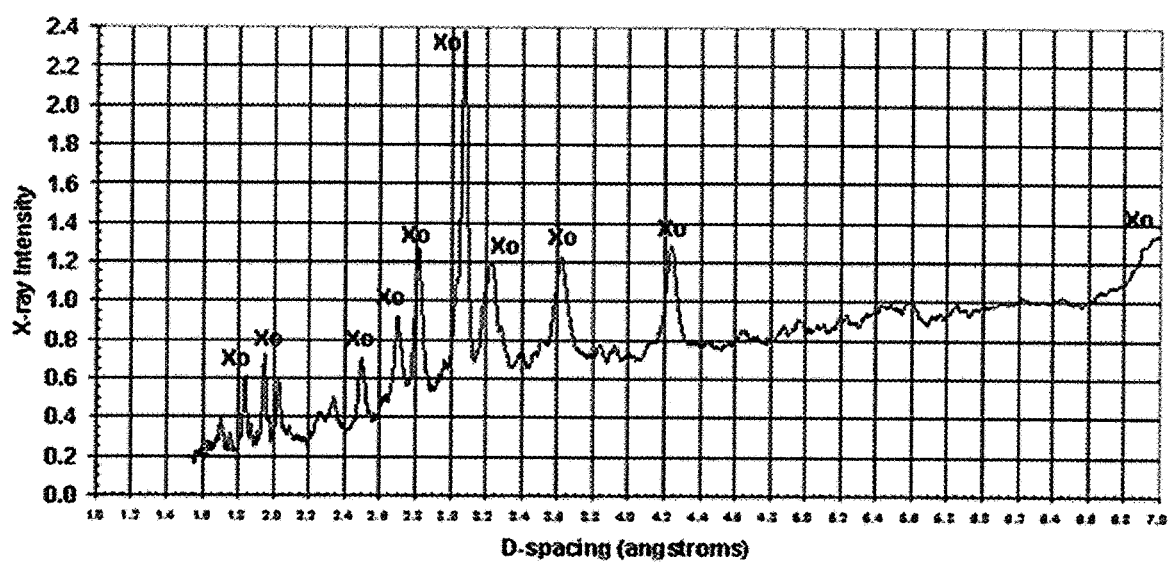
FIG. 19 is a graph of the X-ray diffraction (XRD) scan of a sample of the material shown in FIG. 18; the major XRD peaks for xonotlite are labeled for easy reference.

In an embodiment unique nano-composite materials may be produced by the pressure carbonation of one or more of selected synthetic crystalline calcium silicate hydrates (CSH). Suitable synthetic crystalline calcium silicate hydrates may include riversidite (see FIGS. 12 and 13), or foshagite (see FIGS. 14 and 15), or tobermorite (see FIGS. 16 and 17), or xonotlite (see FIGS. 18, 19, and 20).

Figure 25:
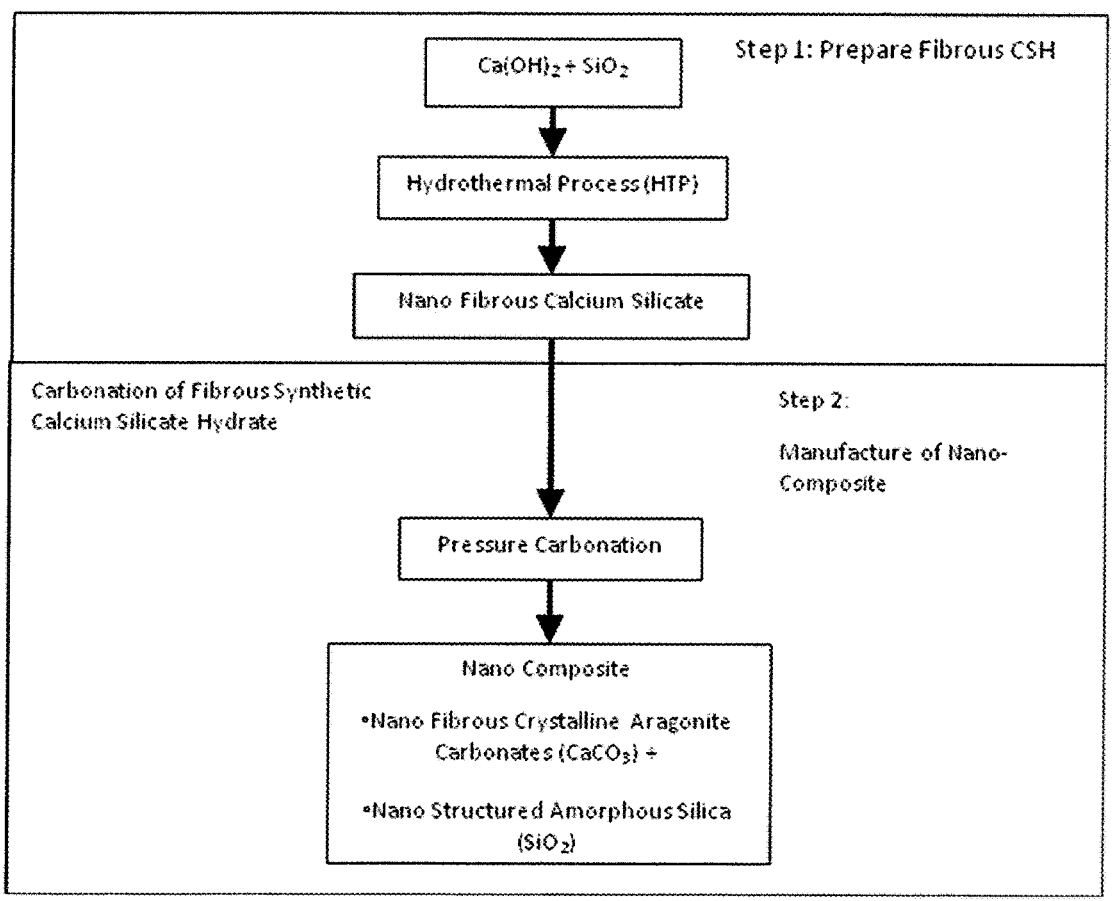
FIG. 25 provides a basic process flow diagram describing the sequence of primary reactions which may be useful for the manufacture of a nano-composite material that includes both nano-fibrous crystalline aragonite and nano-structured amorphous silica.

Several process steps may be utilized in the preparation of the unique nano-composite materials described herein. In a very basic view, there are two steps, as noted in the two blocks set forth in FIG. 25. In a first step, one or more selected synthetic silicate hydrates are prepared by using hydrothermal reaction of calcareous materials, such as lime, with siliceous materials, such as quartz or diatomaceous earth ("DE"). In a second step, the just prepared one or more selected calcium silicate hydrates are subjected to carbonation, under pressurized conditions, to produce a nano-composite structure that includes amorphous silica, generally shaped in the form of the prior crystalline calcium silicate hydrate, and additionally, crystalline calcium carbonate, which in an embodiment, appears in the aragonite phase. In an embodiment, the process(es) may be carried out in pressurized reactors.

The manufacturing process of suitable nano-composite materials involves reacting carbon dioxide reaction with synthetic calcium silicate hydrate under pressure. In an embodiment the reaction of carbon dioxide under pressurized conditions provides carbonic acid in liquid solution for reaction with the one or more selected calcium silicate hydrates. In an embodiment, such the second step of formation of nano-composites, i.e., pressurized carbonation may be carried out in the presence of one or more seed materials, such as a selected amount of a previously prepared nano-composite (e.g., a selected amount of aragonite). Further in an embodiment, reaction rates may be enhanced by utilization of a combination of selected amounts of calcium hydroxide and magnesium hydroxide. In an embodiment, the process of pressurized carbonation, may be carried out by controlling the starting pH to the range of from about 10 to about 11.

The chemical reaction that occurs when synthetic calcium silicate hydrates are exposed to $CO_2$ is given in equation (4) above. In an experimental nano-composite manufacturing process, the carbonation of selected synthetic calcium silicate hydrates was carried out in a pressurized reactor, using a pressure carbonation process. The experimental process variables included (a) initial reactor pressure, (b) initial reactor temperature, and (c) carbon dioxide flow rate to the reactor. In an embodiment, some process parameters and their ranges may be considered as follows:

(1) Fibrous calcium silicate hydrate slurry solids (at about 36 grams per liter to about 120 grams per liter);
(2) Carbon dioxide flow rates;
(3) Time to reach reaction completion (in the range of from about 15 to 45 minutes);
(4) Temperature profile $\Delta T$ (8° C.-20° C.);
(5) Initial temperature—approximately 60° C.; and
(6) Final temperature—approximately 70° C.

Production of Synthetic Calcium Silicate Hydrates

Set out below is a written description of a process for the production of synthetic calcium silicate hydrates (CSH), used as precursor materials for the production of novel nano-composite materials including the SAS & FCA composite described herein, and the manner and process of making and using such calcium silicate hydrates, in full, clear, concise, and exact terms as to enable any person skilled in the art to make and use the same, including the best mode presently contemplated by the inventor for carrying out such process. However, for additional reference, various additional embodiments for manufacturing and preparation of various phases of synthetic calcium silicate hydrates are taught in U.S. Pat. No. 6,726,807 B1, issued on Apr. 27, 2004, and entitled "Multi-Phase Calcium Silicate Hydrates, Methods for Their Preparation, and Improved Paper and Pigment Products Produced Therewith", and in U.S. Pat. No. 7,048,900 B2, issued on May 23, 2006, and entitled "Method and Apparatus for Production of Precipitated Calcium Carbonate and Silicate Compounds in Common Process Equipment". The reader is referred thereto for additional information, and the disclosures of each of the just mentioned patents, including their specification, claims, and drawing figures, are incorporated herein in their entirety by this reference in those states (countries) where such incorporation by reference is permitted under applicable treaty, statute, or regulation.

Lime Slurry Preparation

Lime slurry is prepared according to generally accepted slaking processes. However, for purposes of further preparation of novel nano-composite SAS & FCA materials, an exception to commonly used methods may be advantageously utilized. For preparation of nano-composite SAS & FCA compositions as described herein, the lime slurry need not be cooled. Instead, hot lime slurry (usually at approximately 93° C.) may be screened and transferred directly to a pressurizable reactor vessel. It should be noted that the solubility of calcium hydroxide is very low in water and is inversely proportional to the temperature of that water. For example, the concentration of lime, as calcium oxide (CaO), in pure water at 0° C. is reported to be 0.14%. When the temperature of the water rises to the atmospheric boiling point, 100° C., the solubility of the lime, as calcium oxide (CaO), falls to 0.05%.

Siliceous Slurry Preparation

Various siliceous materials such as quartz, water glass, clay, pure silica, natural silica (sand), natural diatomaceous earth, fluxed calcined diatomaceous earth, or combinations thereof, may be used as source(s) of siliceous material. In an experimental preparation of calcium silicate hydrates, an ultra-fine grade of fluxed calcined diatomaceous earth ("FCDE") was utilized, and was made into a water slurry at approximately 146.2 grams FCDE per liter of slurry. More generally, an aqueous slurry of siliceous material at a concentration of from about 120 grams to about 180 grams of silica per liter of slurry can be used. It should be noted that the solubility of silica/quartz, (unlike that of calcium hydroxide ($Ca(OH)_2$)), is directly proportional to temperature. For example, quartz is only slightly soluble up to about 100° C. From about 100° C. to about 130° C., quartz starts solubilizing, and around 270° C., a maximum solubility is reached at about 0.07%. The dissolution of silica may be represented as per the reaction described in equation (5):

$$(SiO_2)n + 2nH_2O \rightarrow nSi(OH)_4 \quad (5)$$

The solubility of silica in water may be increased by raising pH, such as by using various additives (e.g., sodium hydroxide). The solubilization of silica is also at least to some extent a function of particle size, thus in an embodiment, a smaller particle size, such as may be provided by use of ultra-fine fluxed calcined diatomaceous earth (FCDE) may be advantageous.

Hydro-Thermally Reacting the Lime Slurry and the Siliceous Slurry

First, the amount of CaO in a lime slurry and the amount of $SiO_2$ in a diatomaceous earth slurry may be adjusted to give a selected $CaO/SiO_2$ mole ratio. Second, the concentration of the two slurries (CaO and $SiO_2$) and the final concentration of the mixture may be adjusted by using water so as to provide a selected final concentration, e.g., in an autoclave in experimental apparatus, of between about 24 and about 120 grams/liter.

In an embodiment, a reaction was carried out in a pressurized reactor vessel, with three major steps:

(1) Heating the slurry to a selected temperature (e.g., in the range of from about 180° C. to about 250° C.).

(2) Reacting at the selected temperature for a specified time (e.g., in the range of from about 120 minutes to about 240 minutes).

(3) Stopping the reaction and cooling down the resultant mixture of water, calcium silicate hydrates, and residual reactants, during a suitable period of time (e.g., from about 25 minutes to about 30 minutes, or perhaps longer), which time may vary according to the cooling/quenching apparatus available or selected in a particular process configuration.

In an experimental embodiment, a pressurized reactor vessel was cooled down by passing quenching water through an internal cooling coil and external jacketed cooling system. The cool down process took from about 30 minutes to about 60 minutes, in order to reduce the temperature from 230° C. to 80° C. Generally, the inverse solubility of lime in water with respect to temperature has been recognized, and thus utilized in an effort to produce the desired composition and phases of calcium silicate hydrate material.

Without limiting the developments described herein to any particular mechanism or theory, in some respects, it is presently believed that certain reactions occur during the hydrothermal reaction between calcious material and siliceous material. More particularly, solid calcium hydroxide $Ca(OH)_2$ particles may react with $SiO_2$ in a gel phase to yield a calcium silicate hydroxide whose crystallochemical structure can be written as $Ca_6Si_6O_{17}(OH)_2$ (xonotlite). As the temperature is further raised from about 180° C. to about 250° C., calcium silicate hydrate condenses with the remaining $Ca(OH)_2$ particles to give yet another calcium silicate hydrate, this time with a distinct X-ray diffraction pattern and a crystallochemical formula of $Ca_4(SiO_3)_3(OH)_2$ (foshagite). Thus, the process(es) described herein may produce not only single phase calcium silicate hydrates, but may also produce calcium silicate hydrates having multiple phases therein. Different calcium silicate hydrates may be made by changing the lime/silica ratio, slurry concentration, reaction temperature and reaction time. The use of different additives like sodium hydroxide, sugar, and chelating compounds may also be utilized and manipulated to create diverse products. More generally, a variety of calcium silicate hydrates—including xonotlite, tobermorite, riversidite, and foshagite—may be prepared by manipulating the following process parameters:

(1) Lime/Silica ratio;
(2) Reaction Temperature;
(3) Slurry Concentration;
(4) Reaction Time;
(5) Heating and Cooling Sequence.

Various phases of calcium silicate hydrates were produced by changing the calcium to silica molar ratio (e.g., from 0.75 to 1.35), by changing the reactant concentrations (e.g., from 48 to 120 grams per liter, and by changing the reaction temperature (e.g., from 180° C. to 260° C.), and by changing the reaction time (e.g., in the range of from about 2 hours to about 4 hours). Generally, for further production of nano-composite SAS & FCA products, the CSH products from a selected set of reaction conditions may be cooled from a maximum of 260° C. to a minimum of between about 180° C. and 70° C.

High Pressure Reactor & Equipment for Manufacturing Multiple Calcium Silicate Hydrates, Lab Scale In an embodiment, the process described herein utilizes a hydrothermal reaction that may be carried out under super-atmospheric conditions, using pressurized reactor equipment. As an example, a reactor used in the lab was a specialized, high pressure, high temperature, two liter reactor vessel. It was fitted with an outside jacketed heater and internal cooling coil system. The reactor was also fitted with an impeller to provide mixing in the reactor (e.g., Rustin 200 impeller). In a laboratory reactor embodiment, the agitator/impeller was connected to a variable speed magnetic drive motor. Additionally, the reactor was fitted with a sample/dip tube, and with a vent system, which was used to maintain pressure at a desired level. The completely assembled reactor was capable of pressures of up to 68.95 bar. All heating and cooling processes of the reactor were controlled via an external controller.

In an embodiment, the process included reacting lime at approximately 240 grams/liter with a silica source (e.g., diatomaceous earth and/or quartz) at about 180 grams/liter. The reactions were made in a pressurized reactor over temperature range of 180° C. to 250° C. and the corresponding steam pressure, ranging from 13.8 bar to 41.37 bar. The total reaction time was approximately 4 to 6 hours. The resulting slurry concentration ranged from 36 grams per liter to 120 grams per liter.

The process conditions for the hydrothermal reaction such as calcium to silica ratio, slurry solids percentage, and temperature of reaction, were varied as shown in Table 1 below to prepare different crystal phases of calcium silicate hydrates, such as riversidite, tobermorite, xonotlite, and foshagite. For further specific examples, see U.S. Pat. No. 6,726,807 B1, issued on Apr. 27, 2004 for "Multi-phase Calcium Silicate Hydrates, Methods for Their Preparation, and Improved Paper and Pigment Products Produced Therewith", as noted herein above.

TABLE 1

Synthetic Calcium Silicate Hydrate
Preparation - Process Conditions

| Reaction Conditions | | | Products | |
|---|---|---|---|---|
| Calcium/ Silica Ratio | Slurry Solids (grams/liter) | Temperature (° C.) | Crystal Phase | Crysto-Chemical Formula |
| 0.76 | 120 | 188 | Riversideite | $Ca_5Si_6O_{17}(OH)_2$ |
| 0.90 | 72 | 200 | Tobermorite | $Ca_5Si_6O_{16}(OH)_2$ |
| 1.05 | 54 | 230 | Xonotlite | $Ca_6Si_6O_{17}(OH)_2$ |
| 1.30 | 48 | 250-300 | Foshagite | $Ca_5Si_6O_{17}(OH)_2$ |

Figure 8:
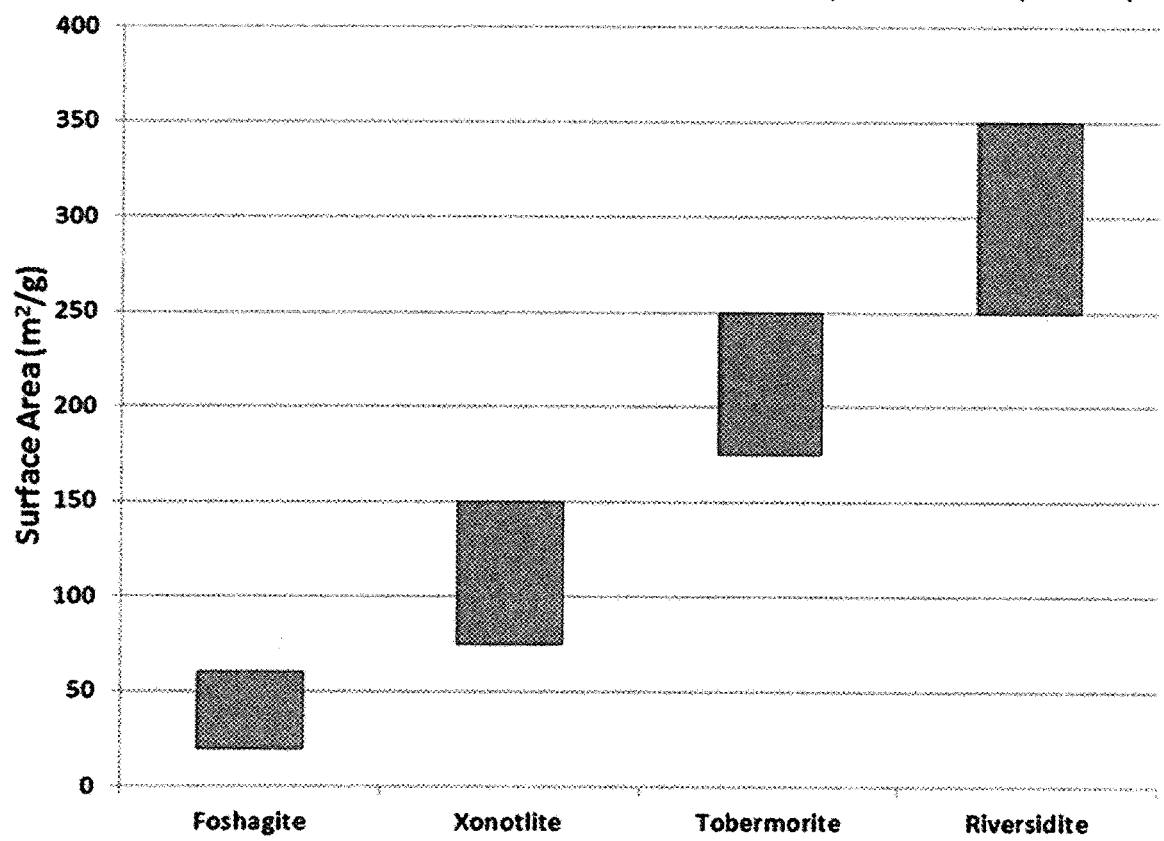
FIG. 8 is a graph showing the surface areas of different phases (i.e., the different forms, namely foshagite, xonotlite, tobermorite, and riversidite) of calcium silicate hydrates; the surface area measurements shown (expressed as $m^2/gm$) were obtained using the BET (Brunauer-Emmet-Teller) method (see S. Brunauer, P. H. Emmett and E. Teller, J. Am. Chem. Soc., 1938, 60, 309).
Figure 9:
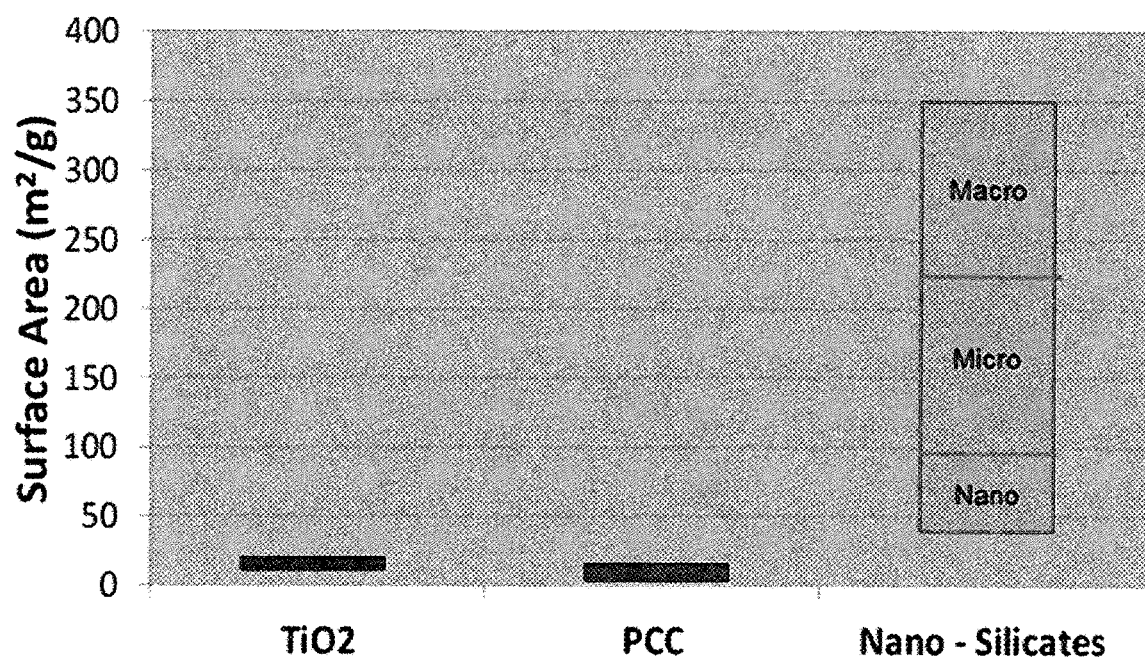
FIG. 9 is a graph which shows the surface areas (BET measurements) of nano fibrous calcium silicate hydrates (CSH) against two common macro-sized mineral pigments, namely precipitated calcium carbonate (PCC) and titanium dioxide ($TiO_2$); macro represents riversidite, micro represents xonotlite, and nano represents foshagite.
Figure 10:
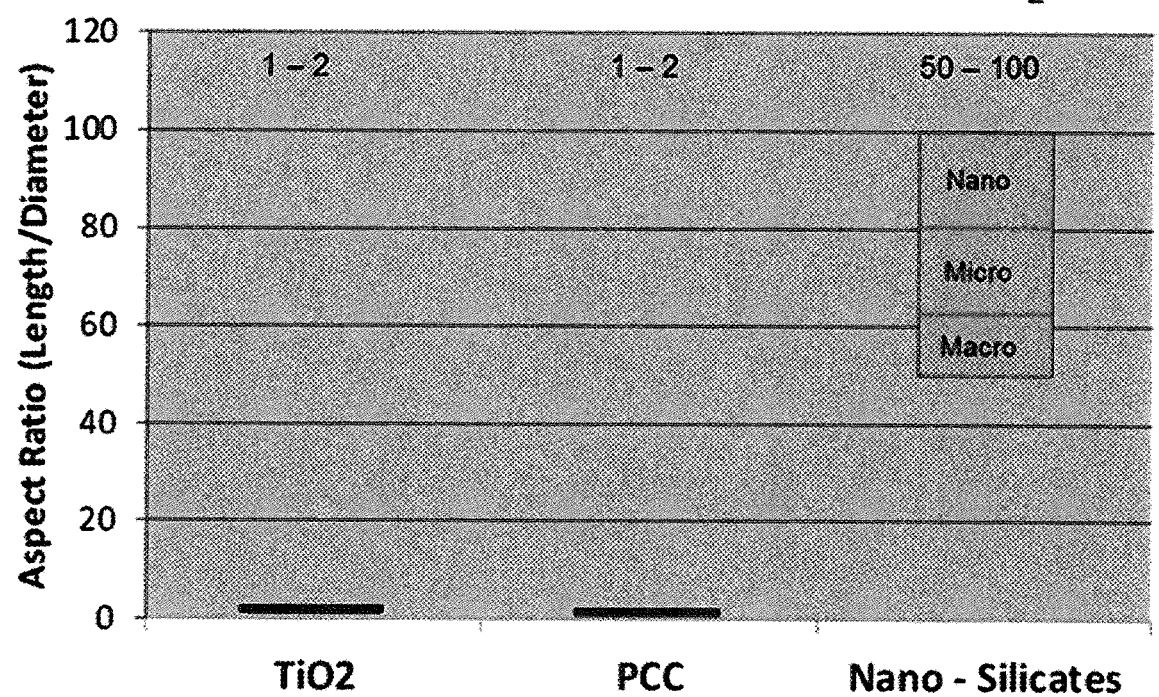
FIG. 10 is a graph which shows the relative aspect ratio of nano fibrous calcium silicate hydrates (CSH) against two common macro-sized mineral pigments, namely precipitated calcium carbonate (PCC) and titanium dioxide ($TiO_2$); macro represents riversidite, micro represents xonotlite, and nano represents foshagite.
Figure 11:
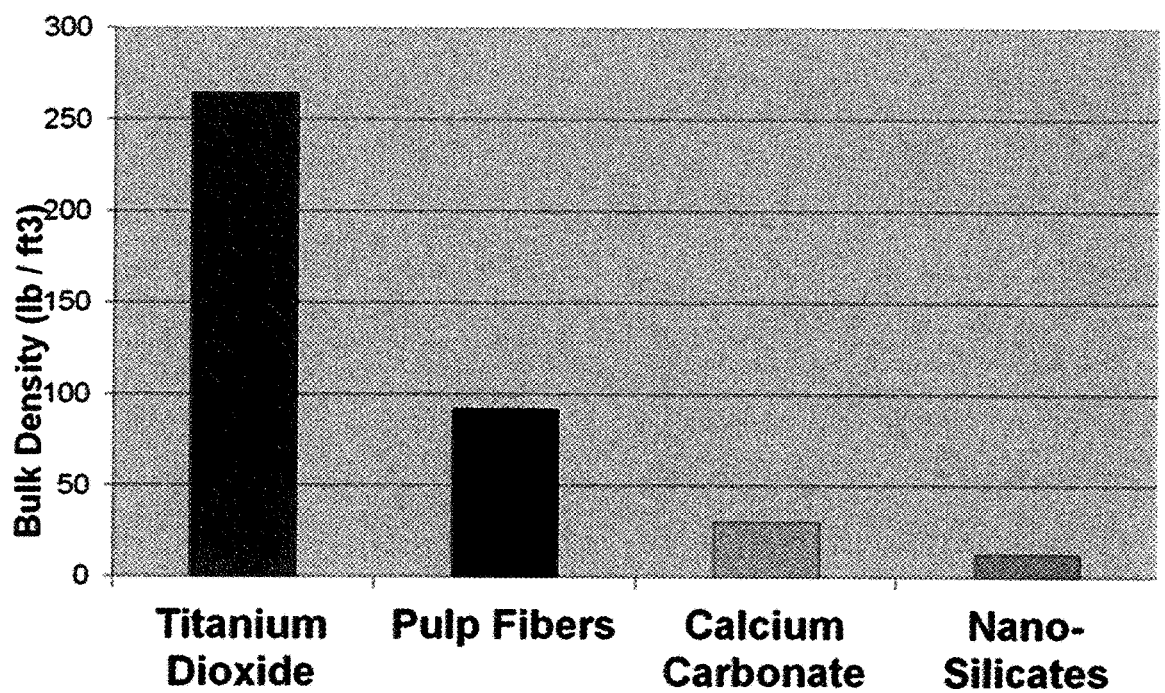
FIG. 11 is a graph showing the relative bulk densities (in pounds per cubic foot) of nano fibrous calcium silicate hydrates (CSH) against various papermaking materials, namely pulp fibers, precipitated calcium carbonate (PCC), and titanium dioxide ($TiO_2$).

Some of the characteristics of the above noted phases of crystalline calcium silicate hydrates (CSH) are provided in Table 2. Such crystal phases may be characterized, at least in part, by their: (1) X-Ray diffraction pattern, (2) surface area, (3) water absorption, (4) aspect ratio, and (5) bulk density. A graphical representation of typical surface areas of the noted phases of calcium silicate hydrates is provided in FIG. 8. A graphical comparison of the surface area of calcium silicate hydrates (CSH) with titanium dioxide ($TiO_2$) and with precipitated calcium carbonate (PCC) is shown in FIG. 9. A graphical comparison of the aspect ratio of calcium silicate hydrates (SCH) with titanium dioxide ($TiO_2$) and with precipitated calcium carbonate (PCC) is shown in FIG. 10. A graphical comparison of the bulk density of calcium silicate hydrates (CSH) and titanium dioxide ($TiO_2$), pulp fibers, and calcium carbonate is shown in FIG. 11.

TABLE 2

Characteristics of Various Calcium Silicate Hydrate Phases

| Crystal Phase | Riversideite | Tobermorite | Xonotlite | Foshagite |
|---|---|---|---|---|
| I. X-ray Diffraction Peaks (Å) | | | | |
| 1. Major Peak | 3.055 | 11.0 | 3.02 | 2.93 |
| 2. Minor Peeks | 3.58, 2.80 | 3.71, 3.00 | 2.04, 8.50 | 2.16, 4.96 |
| II. Surface Area ($m^2/g$) | 275-325 | 175-250 | 80-150 | 20-50 |
| III. Water Absorption (%) | 200-350 | 400-550 | 600-750 | 800-1000 |
| IV. Aspect Ratio (L:D) | ~5:1 | ~7.5:1 | ~30:1 | ~200:1 |
| V. Brightness (ISO) | 90-94 | 92-94 | 94-96 | 94-96 |
| VI. Bulk Density (g/cc) | 0.2 | 0.2 | 0.2 | 0.2 |

Figure 20:
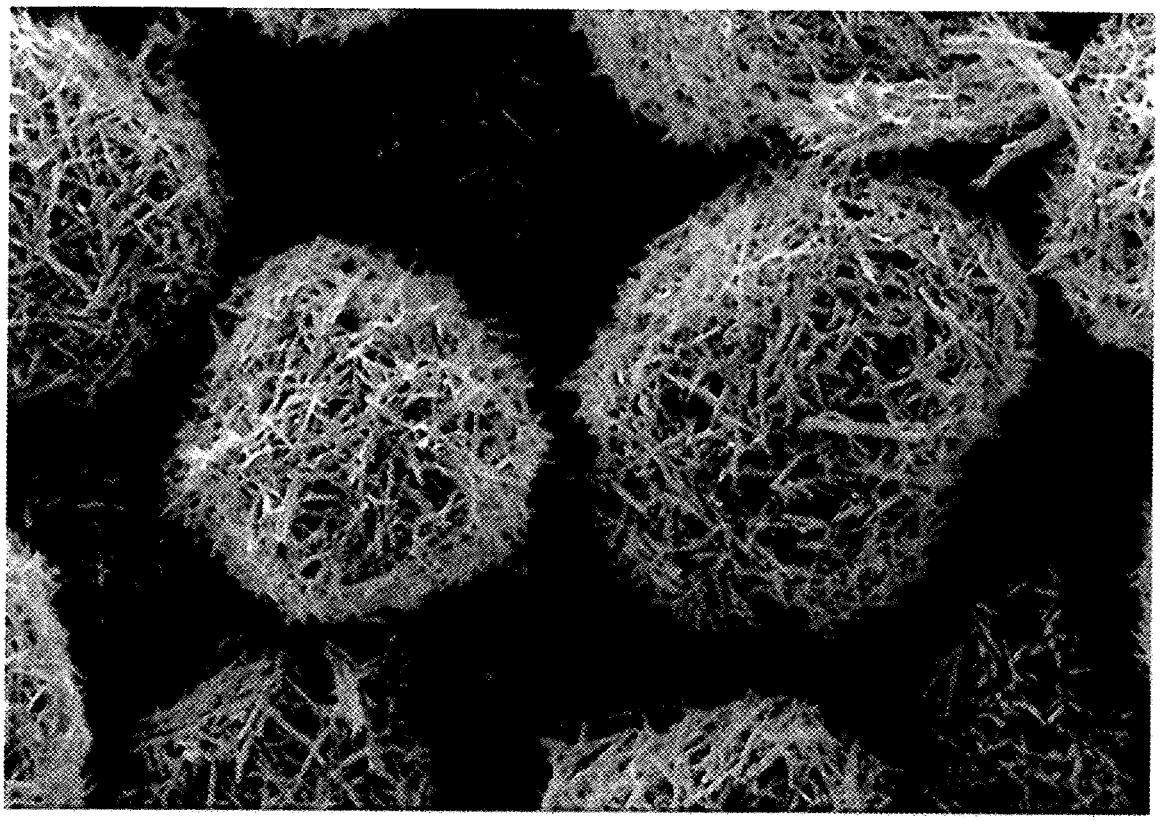
FIG. 20 is a photograph taken using a scanning electron microscope (SEM) at 2000 times magnification of foshagite crystals; note that the primary structure shows nano-fibers while a secondary structure provides nano-fibers agglomerated into a "hollow" or porous macro-spherical structure having interstitial spaces between adjacent fibers.
Figure 21:
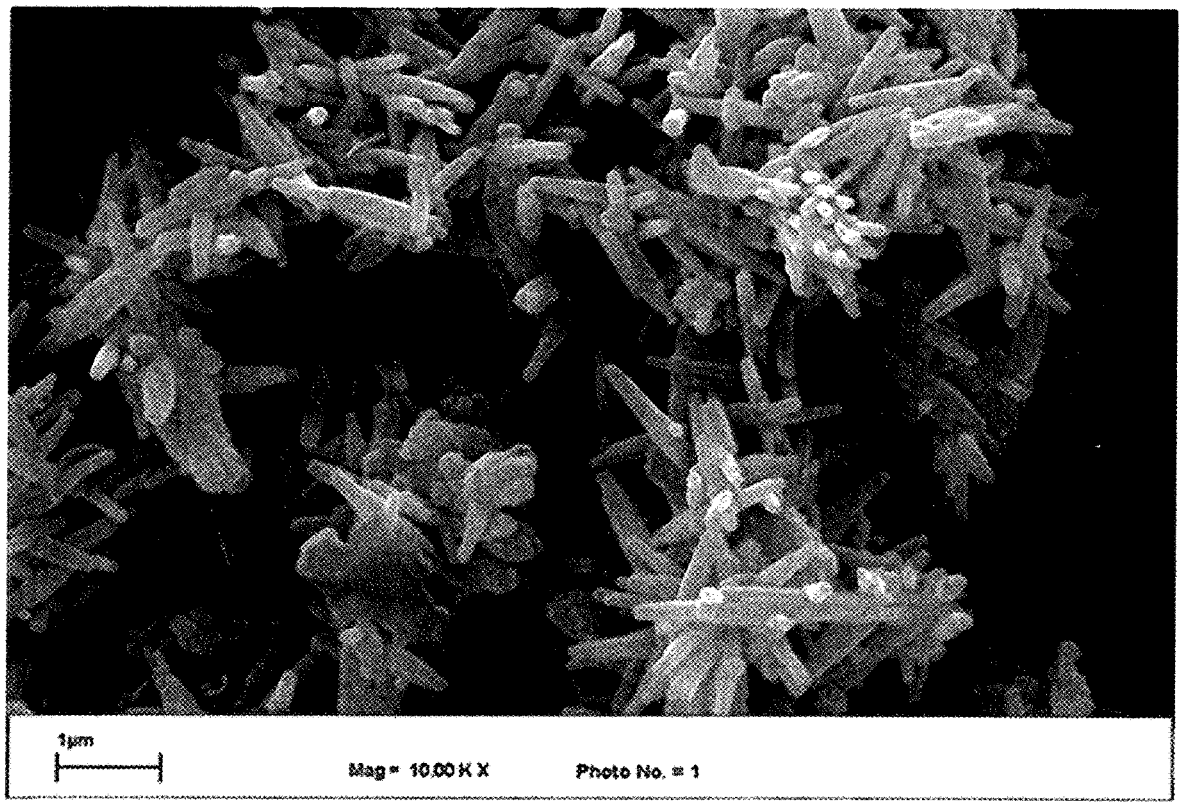
FIG. 21 shows a photograph taken using a scanning electron microscope (SEM) at 10000 times magnification of precipitated aragonite phase calcium carbonate crystals made by a pressure carbonation technique as more fully described herein below.
Figure 22:
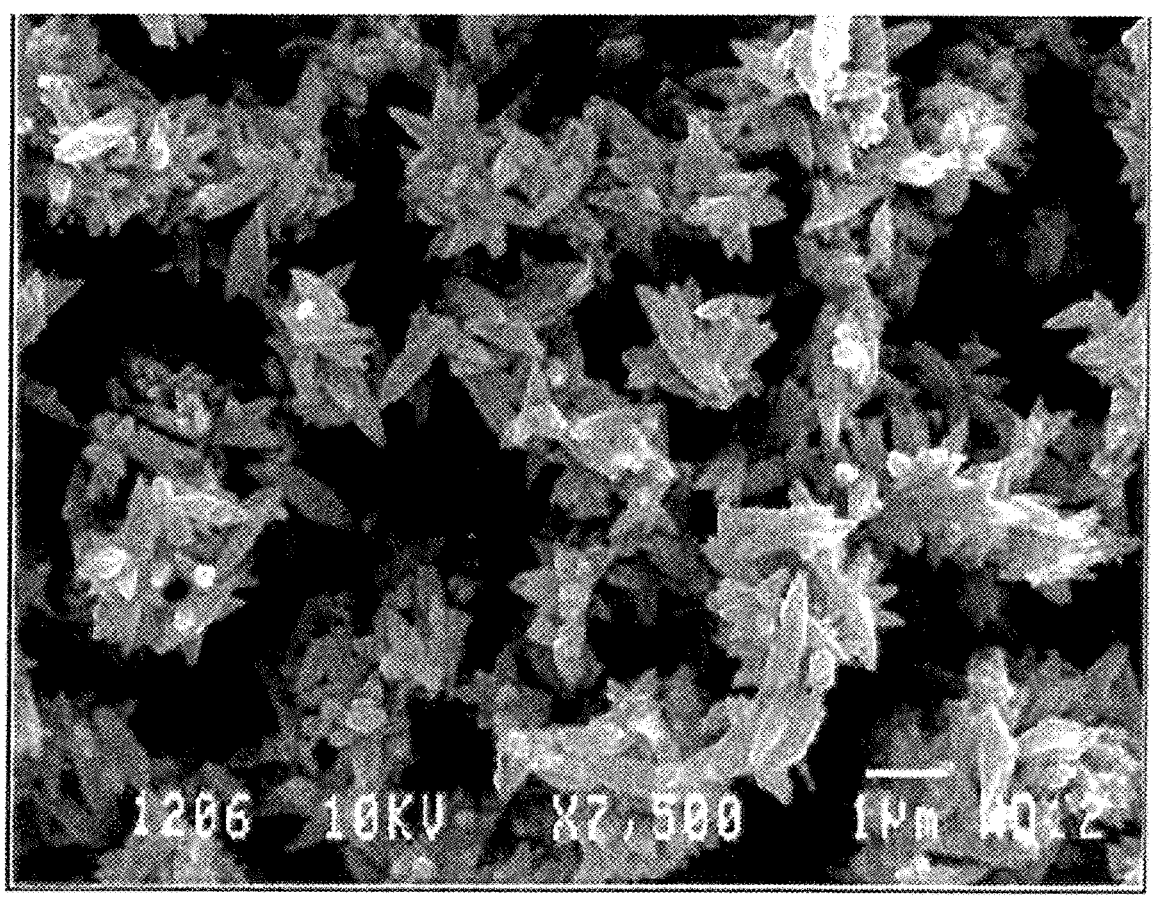
FIG. 22 shows a photograph taken using a scanning electron microscope (SEM) at 10000 times magnification of precipitated scalenohedral phase calcium carbonate crystals made by a pressure carbonation technique as more fully described herein below.
Figure 23:
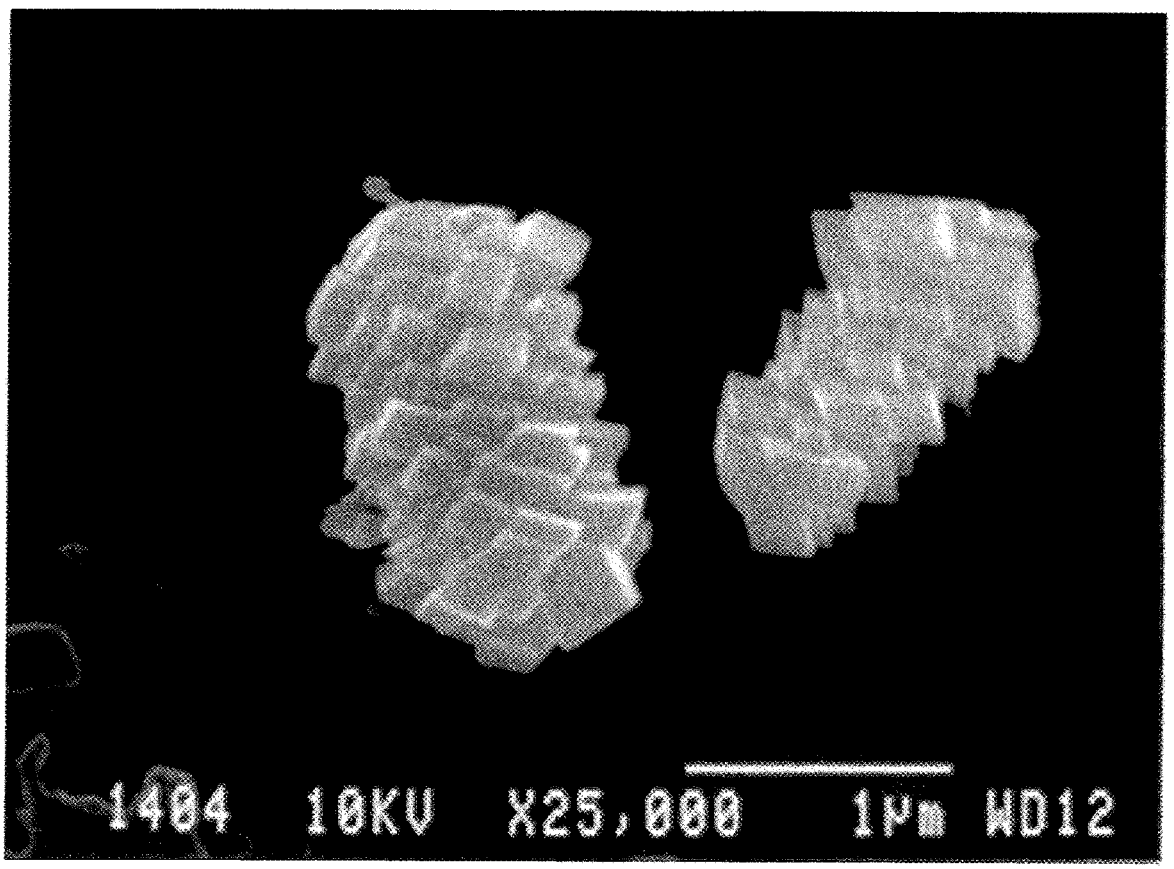
FIG. 23 shows a photograph taken using a scanning electron microscope (SEM) at 10000 times magnification of unique rhombohedral phase calcium carbonate crystals made by a pressure carbonation technique as more fully described herein below.
Figure 24:
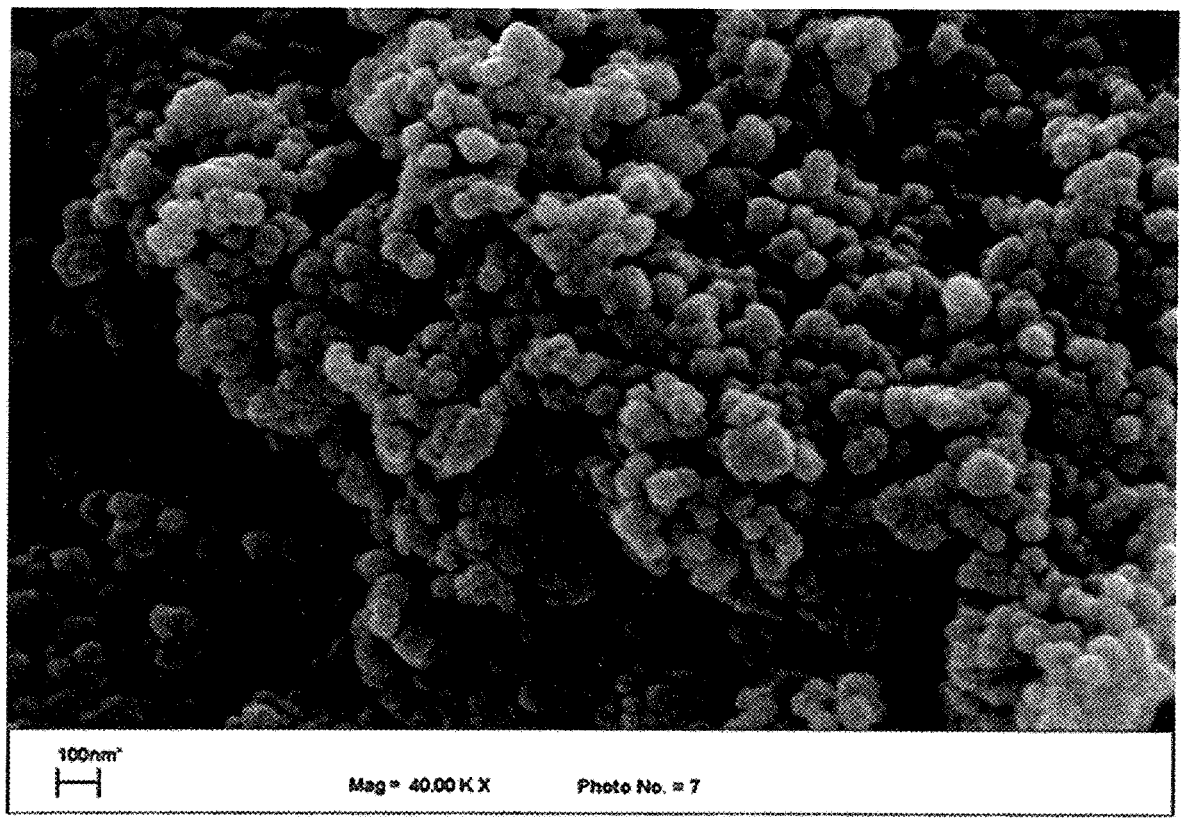
FIG. 24 shows a photograph taken using a scanning electron microscope (SEM) at 40000 times magnification of unique nano-rhombohedral phase calcium carbonate crystals made by a pressure carbonation technique as more fully described herein below; note that the primary particles agglomerate into secondary structures of from about 1 micron to about 2 microns in size.

The scanning electron microscope ("SEM") photographic images and corresponding x-ray diffraction ("XRD") patterns of the above noted four different phases of calcium silicate hydrate (CSH) products are shown in FIGS. 12 through 19. The reaction conditions clearly influence the crystal structure and habit, as well as the chemical composition and some physical properties, including surface area, water absorption, aspect ratio, brightness and bulk density. Depending on reaction conditions, such calcium silicate hydrates (CSH) may be produced as macro particles, or as nano-fibers, or as macro fibers with a broad range of surface area, particle sizes, shapes and aspect ratios, as can be seen in the above referenced drawing figures, and as indicated in the above Tables 1 and 2. Additional SEM photographs provided in FIG. 20 illustrates an embodiment that provides an example of a structure—in the form of a haystack or pillow, fur ball, or similar structure—that is suitable as a calcium silicate hydrate (CSH) that may be useful as a starting material, i.e. a precursor for replacement of material therein with amorphous silica, in the manufacture of a nano-composite (SAS & FCA) containing structured amorphous silica and fibrous calcium carbonate crystals in the form of aragonite.

A specific example of the experimental preparation of a selected synthetic nano fibrous calcium silicate hydrate, namely xonotlite, is now provided. The reaction was carried out at selected conditions, in order to produce xonotlite. The reaction was carried out in a high pressure reactor having a volume of 7.5 liters, available from Parr Instrument Company. The hydrothermal process conditions are given in Table 3 below. The resulting xonotlite properties are summarized in Table 4.

TABLE 3

Process Conditions for manufacture of Synthetic Xonotlite

| Ca/Si Ratio | 1.05 |
|---|---|
| Solids (g/L) | 54 |
| Temperature (° C.) | 230 |
| Reaction Time (hrs) | 2 |
| Reaction Volume (L) | 4.8 |
| Total Mass (g) | 260 |

TABLE 4

Properties of Synthetic Xonotlite

| pH | 11.6 |
|---|---|
| Surface Area ($m^2/g$) | 137 |
| Water Absorption (%) | 315 |
| Oil Absorption (%) | 379 |
| X-Ray Diffraction | Xonotlite (See FIG. 5) |
| Scanning Electron Microscope | See FIG. 4 |
| Total Mass (g) | 260 |

Figure 5:
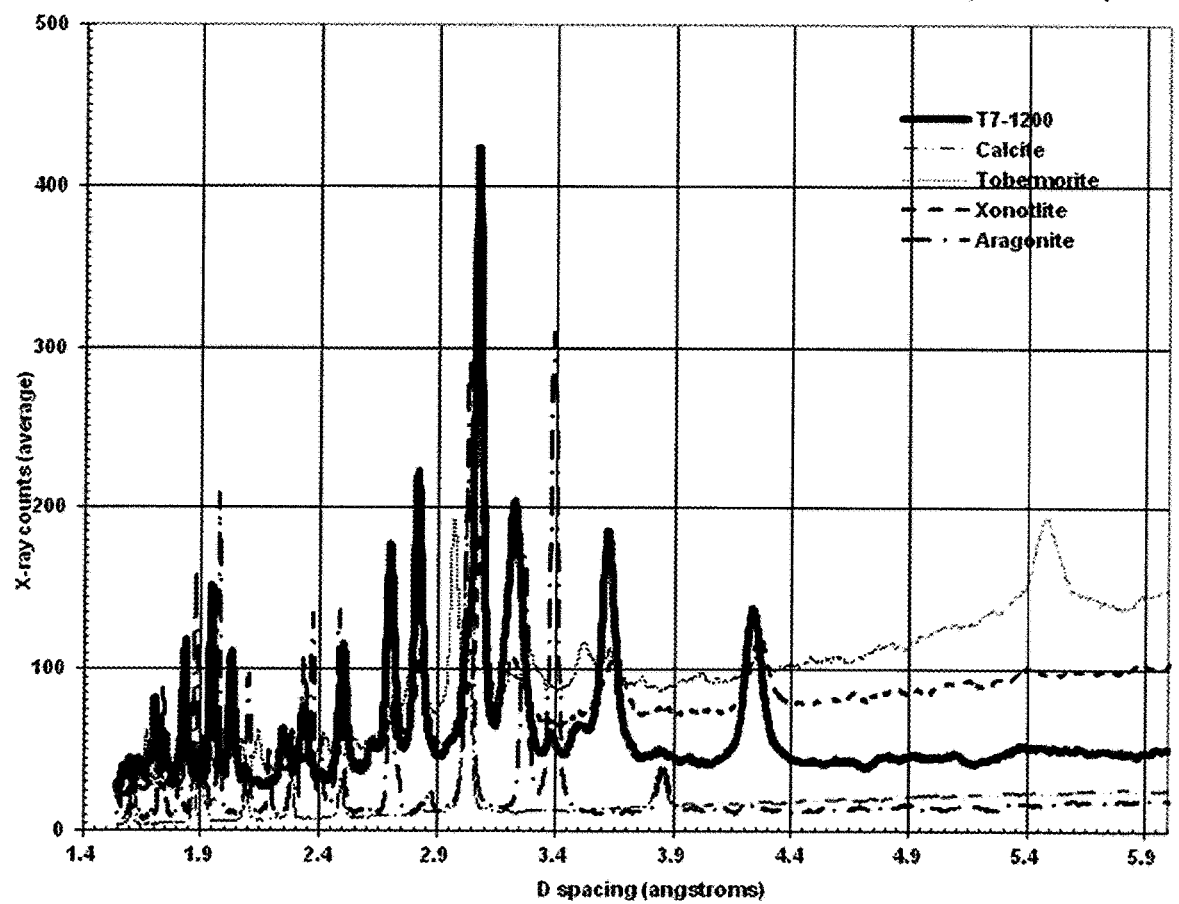
FIG. 5 is the graph of the results from an X-ray diffraction (XRD) scan of a sample of the xonotlite material shown in FIG. 4, together with scans of control materials including calcite crystals, tobermorite crystals, xonotlite crystals and aragonite crystals. The scan indicates that the sample material includes XRD peaks at the same locations as xonotlite crystals.

The xonotlite slurry had a pH of 11.6. The surface area (BET measurement) for the dry xonotlite was 137 square meters per gram. The water and oil absorption of the dry xonotlite were 315% and 379% respectively. The scanning electron microscope (SEM) photograph and X-ray diffraction (XRD) pattern of the manufactured xonotlite are shown in FIGS. 4 and 5 respectively. The X-ray diffraction pattern set forth in FIG. 5 shows the predominate presence xonotlite. In FIG. 4, the SEM photograph shows, in the circled area, a secondary structure, having a haystack or pillow configuration, that provides a fibrous hollow microsphere structure made up primarily of nano-fibers with layers having interstitial spaces and wherein inner fibers are seen through outer layers of fibers.

Formation of Nano-Structured Composite.

Cogeneration of a nano-composite including structured amorphous silica (SAS) and fibrous crystalline aragonite carbonate (FCA) by pressure carbonation may be accomplished, once one or more selected calcium silicate hydrates are available as a raw material, and a supply of carbon dioxide is to available. The manufacture of a nano-composite (SAS & FCA) material involves pressure carbonation. In an embodiment, the manufacture of a nano-composite (SAS & FCA) material may be done in a cogeneration fashion, that is, the reaction with the xonotlite substrate to replace the same with amorphous silica is carried out at the same time and under the same reaction conditions while fibrous crystalline aragonite is manufactured on, in, or protruding from the substrate CSH starting material, here the xonotlite substrate.

Seeding.

It has been found that efficiency of the carbonation of fibrous calcium silicate hydrate may be significantly improved by adding certain seed materials, and/or reaction promoter materials, and/or catalysts, and/or pH modifiers, as further described below. In an embodiment, a suitable seed material may include previously generated nano-composite (SAS & FCA) material. In an embodiment, a suitable seed material may include one or more additional calcium silicate hydrate precursors. Additional seed materials may include commercially produced calcium carbonates ($CaCO_3$) in the aragonite phase. The total quantity of seed materials to be added may range from about 2% to about 20% of the total weight of reactants.

Catalysts/Promoters

Catalysts may include a mixture of calcium hydroxide ($Ca(OH)_2$) and magnesium hydroxide ($Mg(OH)_2$). The total quantity of catalytic material may range from about 2.0% to about 10.0% of the total weight of reactants. The ratio of calcium hydroxide to magnesium hydroxide may range from about 1:1 to about 2:1. Such catalysts also serve as pH buffers and promoters, and may also help to remove certain impurities from process water. In an embodiment, before the start of pressure carbonation, the described seed materials, and catalysis/promoters were added to a xonotlite slurry produced as described above.

Pressure Carbonation of Synthetic Calcium Silicate Hydrates (CSH)

In an experimental embodiment, as seed material was added to a hot silicate slurry (<70° C.), the slurry was cooled to a final temperature ranging from 50° C. to 75° C. The reactor vessel was then pressurized using a non-reactive gas to a pressure ranging from 2.0 to 6.9 bar. After that, a gas flow containing carbon dioxide ($CO_2$) was injected under pressure into the reactor vessel. The carbon dioxide composition of the gas stream varied between about 5% and to about 100% $CO_2$ by weight. The total gas flow was between 1.3 liters per minute to 7.2 liters per minute, and provided a theoretical reaction rate of between about 1.5 grams per liter per minute to about 8 grams per liter per minute. In laboratory experimental reactor apparatus, throughout the carbonation reaction the reactants were agitated with a built-in agitator. The paraxial tip speed of the agitator was 223.5 meters per minute (at a rotational speed of 700 RPM). In the laboratory, the reaction was carried out in a 5.7 liter volume pressurized stirred reactor manufactured by Parr Instrument Company, Moline, Ill., USA (see http://www-.parrinst.com). Rotational speed (RPM) was measured by a tachometer attached to the motor of the agitator. The reaction temperature was measured by using a thermocouple temperature probe. Carbon dioxide flow rate was measured using a carbon dioxide specific flow meter with a totalizer to calculate the total carbon dioxide consumed. The pressure was recorded by a pressure probe and shown on a pressure gauge. The carbonation reaction between the silicate slurry and carbon dioxide is an exothermic reaction. Thus, as the reaction proceeded, the temperature of the slurry increased. The end of the carbonation reaction was indicated by the reactor temperature reaching a peak and then stabilizing to a plateau. Usually the increase in temperature ($\Delta T$) was in the range of 5° C. to 15° C., depending on the reactivity of the silicate, and the composition of the starting calcium silicate hydrate. The end of the carbonation reaction was also indicated by plotting the temperature profile.

During reaction, the incoming carbon dioxide ($CO_2$) was continuously consumed by the calcium constituents of the calcium silicate hydrate (CSH). Thus, while the $CO_2$ was initially introduced at a pressure of approximately 70 psig, and, while the temperature increased due to the exothermic nature of the carbonation reaction, the pressure in the reactor remained fairly close to the initial pressure. However, at the end of the reaction, the calcium ions ($Ca^{+2}$) and carbonate ions ($CO_3^{-2}$) were fully consumed. In the experimental apparatus, the excess carbon dioxide at the end of the reaction started to increase the pressure of the reactor. Thus, while the end of the reaction was indicated by a plot of temperature versus time; another indicator was an increase in the rate of change in the pressure in the reaction vessel versus time.

Thus the completion of the carbonation of calcium silicate hydrates was indicated by the temperature reaching a plateau and by the pressure increasing significantly. The progress of the pressure carbonation reaction was also monitored by following the pH and conductivity of the slurry. The pH, as per equation 2 above decreased from an initial pH of approximately 11 to a final pH between about 6.5 and about 7.5. The conductivity also fell as the free calcium ($Ca^{+2}$) ions were used up to produce non-ionic $CaCO_3$. The just noted pH was measured after the temperature reached a maximum and the rate of change of pressure started to increase.

One test utilized to establish the nature of products actually manufactured was the Mohr's Salt test. That test involved applying a solution of ammonium iron(II) sulfate (Mohr's Salt, namely $(NH_4)_2Fe(SO_4)_2 \cdot 6H_2O$)) to a sample of the nano-composite slurry. The development of a green color indicated the presence of aragonite crystal phase. This test was further confirmed by an X-ray diffraction (XRD) analysis. Another test conducted was the surface area of the final product, using the BET method. In an embodiment, a range of surface areas was found, from about 50 square meters per gram to about 150 square meters per gram.

An example of cogeneration of a nano-composite (SAS & FCA), namely structured amorphous silica and fibrous crystalline aragonite carbonate, is now provided in further detail. A reaction was carried out according to the conditions necessary to produce a nano-composite of structured amorphous silica and fibrous crystalline aragonite carbonate. The reaction was carried out in a high pressure 7.5 L reactor manufactured by Parr Instrument Company. The pressure carbonation process conditions are given in Table 5 below. The resulting nano-composite (SAS & FCA) material properties are summarized in Table 6. Previous work has shown that different sources of silica (Flux calcined diatomaceous earth, ground quartz, and regular diatomaceous earth) will result in different silicate properties. The xonotlite formation reaction example above was conducted using a flux calcined Diatomaceous Earth product as a silica source. The X-Ray Diffraction pattern and SEM photograph of a resulting nano-composite (SAS & FCA) material are provided in FIGS. 6 and 7, respectively.

TABLE 5

Summary of Process Conditions -Carbonation of Xonotlite

| | |
|---|---|
| Initial Temp (° C.) | 60 |
| Final Temp (° C.) | 70 |
| ΔT (° C.) | 10 |
| Volume (L) | 4.8 |
| Solids (g/L) | 54 |
| Total Mass (g) | 260 |
| $CO_2$ Flow (L/min) | 3.6 |
| Start Pressure (bar) | 4.8 |

Product Testing Parameters

Some product parameters tested were:
(1) Surface Area® BET Method ($m^2$/gram);
(2) pH;
(3) Chemical Test for crystal structure (Aragonite or Calcite) (e.g. Mohr's Salt test);
(4) Water Absorption;
(5) Oil Absorption;
(6) X-Ray Diffraction Pattern (XRD; see FIG. 7); and
(7) Scanning Electron Micrograph (SEM; see FIG. 6).

Some calculated parameters were:
(1) $CO_2$ Efficiency (%); and
(2) Reaction Rate (grams per liter per minute),

TABLE 6

Summary of Properties of Nano-Composite including Nano Fibrous Structured Amorphous Silica (SAS) & Nano Fibrous Crystalline Aragonite Calcium Carbonate (FCA)

Figure 6:
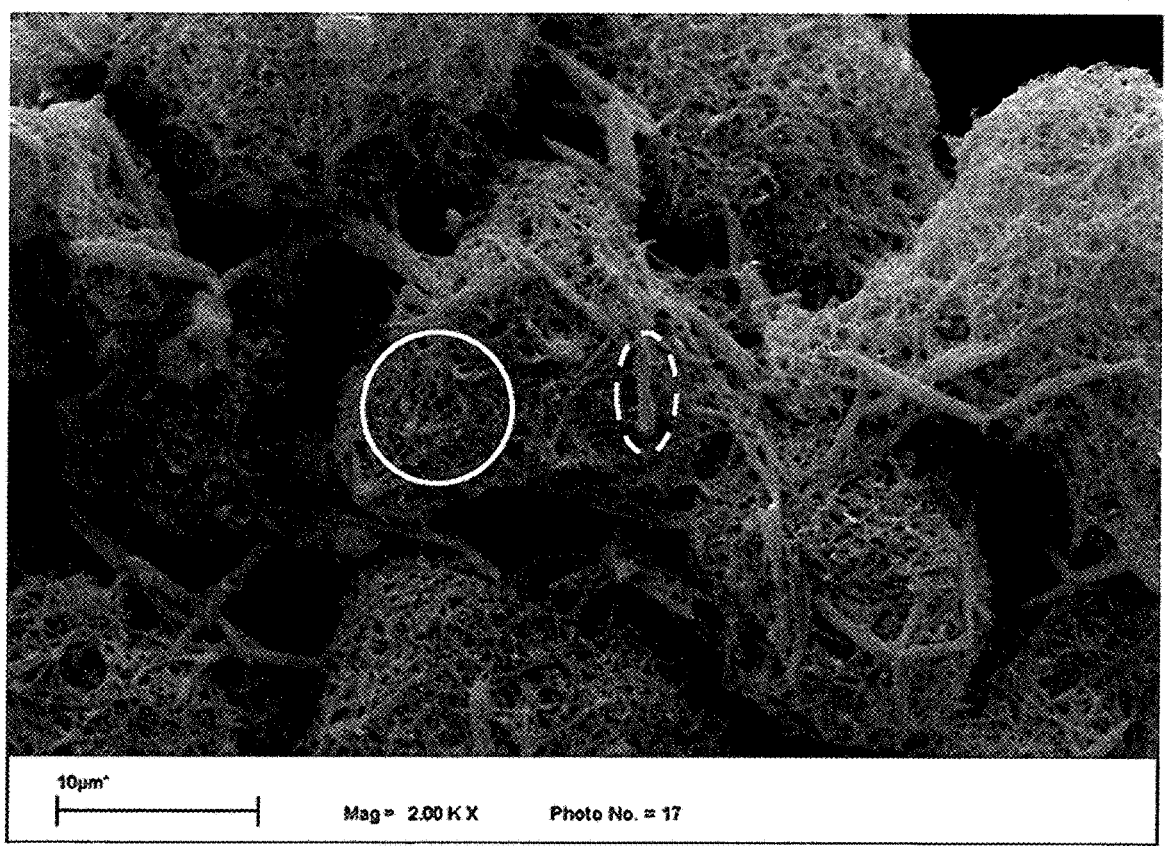
FIG. 6 is a photograph taken in a scanning electron microscope (SEM) at 2000 times magnification of a sample of a composite nano structured composite (SAS & FCA) including both amorphous silica and nano fibrous crystalline aragonite, and made by a process described herein; the material in the small oval is a fibrous crystalline aragonite, while the material in the large circle includes a structured amorphous silica that has been built utilizing the replaceable substrate xonotlite as depicted in FIG. 4 above.

| | |
|---|---|
| pH | 6.7 |
| Surface Area ($m^2$/g) | 119 |
| Water Absorption (%) | 277 |
| Oil Absorption (%) | 230 |
| X-Ray Diffraction | Aragonite (See FIG. 7) |
| Scanning Electron Microscope | See FIG. 6 |
| Solids (g/L) | 75.5 |
| Reaction Volume (L) | 4.8 |
| Total Mass (g) | 354 |
| $CO_2$ Used (L) | 65 |
| $CO_2$ Efficiency (%) | 76% |

Figure 7:
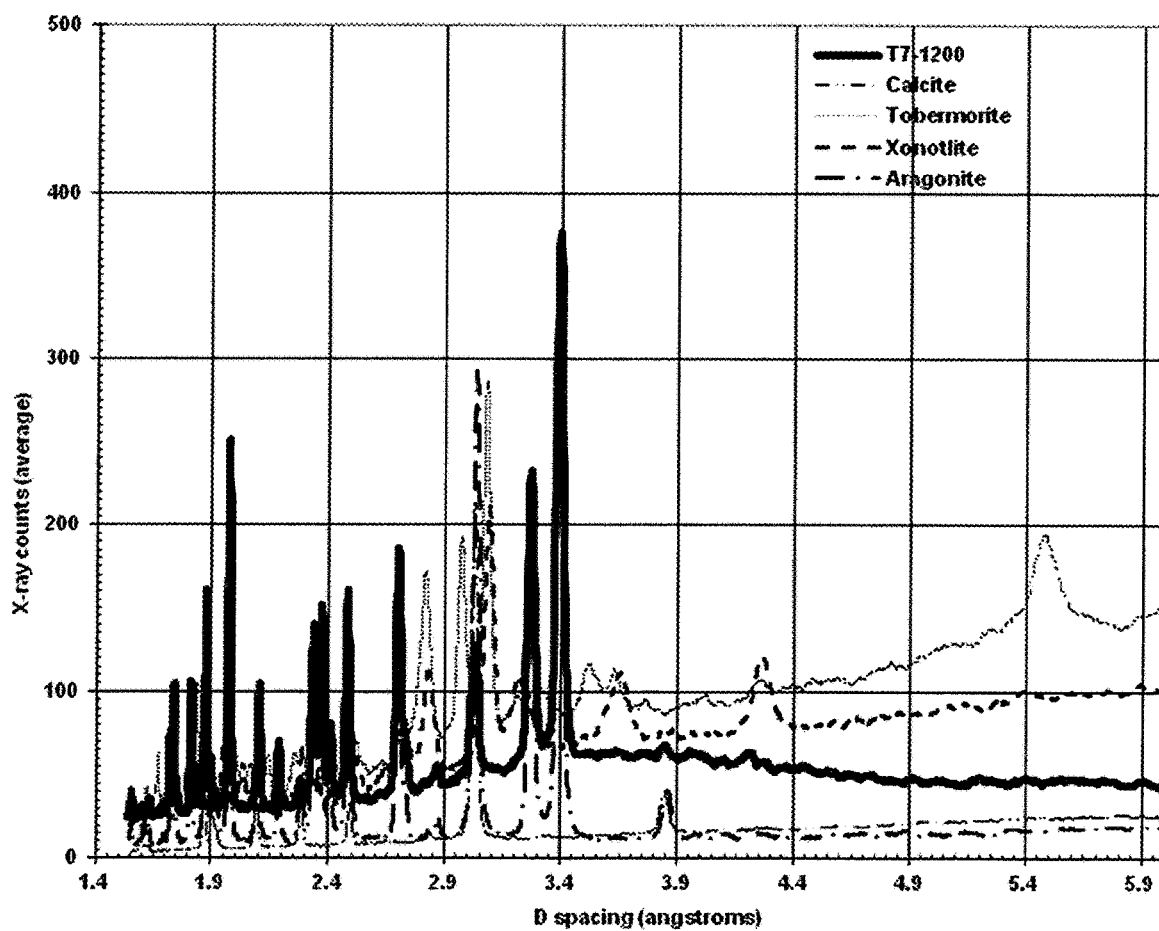
FIG. 7 is a graph of the X-ray diffraction (XRD) scan of a sample of a unique nano-composite material (SAS & FCA) shown in FIG. 6, along with scan of some controls including calcite, tobermorite, xonotlite, and aragonite; this XRD data indicates that the sample material includes peaks at the same locations as aragonite crystals.

As shown in FIG. 7, the XRD pattern for nano-composite (SAS & FCA) material showed that aragonite was predominantly present, as well as a trace of tobermorite. Thus, the nano-composite (SAS & FCA) includes both fibrous amorphous silica and fibrous crystalline aragonite. In FIG. 6, the photographs taken with a scanning electron microscope show two distinct structures in the nano-composite SAS & FCA. A first structure resembles the shape of one of the raw materials, namely the xonotlite calcium silicate hydrate. The second structure resembles crystalline aragonite precipitated calcium carbonate. However, since crystalline silica was virtually absent in the X-Ray diffraction pattern, it may be inferred that the silica component was, after the carbonation reaction, essentially in a non-crystalline, i.e. amorphous form. The SEM photograph of the raw materials, namely synthetic xonotlite and its corresponding XRD are given in FIGS. 4 and 5. The SEM photograph of the resulting nano-composite material (SAS & FCA) compound, after the pressure carbonation process, as well as its corresponding XRD, are shown in FIGS. 6 and 7, respectively.

A comparison of a selected raw material, and of a sample of the finished product, namely a nano-composite (SAS & FCA) may be instructive. An SEM photograph of a selected raw material, namely xonotlite crystals, is shown in FIG. 4. The XRD for those xonotlite crystals is provided in FIG. 5. As illustrated in FIG. 5, after carbonation of the xonotlite raw materials, the SEM of the carbonated xonotlite showed two distinct structures, namely aragonite (dashed oval) and $SiO_2$ (solid circle). However, as shown in FIG. 7, the X-Ray diffraction pattern of the novel nano-composite materials (SAS & FCA) showed the presence of a single predominant crystalline component, namely aragonite calcium carbonate. Thus, it can be inferred that the remaining $SiO_2$ was in an amorphous form. Thus, it has been determined that the carbonation of synthetic calcium silicate hydrates is technically feasible, and the work described herein has resulted in a novel, unique nano-composite (SAS & FCA) product.

In one aspect, the pressure carbonation of synthetic calcium silicate hydrates resulted in the unexpected formation of a nano-fibrous crystalline aragonite calcium carbonate (FCA). Such crystal structure was also confirmed by the chemical chromatic test using Mohr's Salt (green color). And, since the xonotlite, i.e., the silica portion of the XRD shown in FIG. 5 was not detected in the XRD pattern of the nano-composite illustrated in the XRD shown in FIG. 7, it is postulated that the final, carbonated nano-composite (SAS & FCA) material was mostly nano-fibrous structured amorphous silica (SAS), which was produced from the crystalline calcium silicate hydrate xonotlite.

Example 1—Novel Nano-Composite (SAS & FCA) Production

Step 1: Preparation of Synthetic Calcium Silicate Hydrate—Xonotlite

Initially, 117.4 grams of ½" rotary pebble lime (from Graymont Lime Co.) was accurately weighed and slaked in 350 milliliters of high purity water prepared by reverse osmosis treatment. The slaking reaction is exothermic and caused the slurry temperature to rise to near boiling. When the slurry temperature was very near boiling, and before much of the water had evaporated, an additional 90 milliliters of water was added to both dilute and cool the slurry. The slurry was then agitated for 30 minutes to insure slaking completion. Then, the slurry was screened through a 100 mesh screen. The slurry was then transferred to a 5 liter autoclave, and tested for lime availability in accordance with ASTM method C25, entitled "Standard Test Methods for Chemical Analysis of Limestone, Quicklime, and Hydrated Lime." Approximately 137.2 grams of fine fluxed calcined diatomaceous earth (FCDE), from Eagle Picher Minerals, Reno, Nev. (namely Celatom brand product designation MW-27) was weighed and added to 750 ml of hot water (concentration of approximately 182 grams/liter). The silica slurry was added to the screened and tested lime slurry. The exact amount of silica slurry added to lime slurry was determined by the lime availability such that a $CaO/SiO_2$ mol ratio of approximately 1.05 would be maintained. The total slurry volume was also adjusted by adding water to a final concentration of 54 grams per liter. The autoclave was continuously agitated at a constant speed of 250 rpm. The starting temperature of the slurry was approximately 25° C. The reactor was heated for approximately 100 minutes in order to reach the target temperature of 230° C. The temperature was maintained at 230° C. for 2 hours, after which, "quenching" water was flushed through the cooling coil built inside the reactor. The cooling process was maintained until the temperature in the reactor reached approximately 80° C. (roughly 30 minutes), at which point the reactor was depressurized and opened. Then, the reaction products were transferred to a holding vessel for storage. One portion of the resultant slurry was tested for pH. Another portion of the resultant slurry was dried in an oven at 105° C. for 12 hours. During the drying process, the slurry formed hard lumps, which had to be broken up through the use of a mortar and pestle. The powdered, dry product was brushed through a 100 mesh screen to insure product uniformity during testing. The pigment in this example was designated sample batch # MW-2.

Tests carried out on the dry powder were as follows:
(1) Surface Area (BET Method);
(2) pH;
(3) Percent Water Absorption;
(4) Percent Oil Absorption;
(5) X-ray diffraction analysis; and
(6) Scanning Electron Micrograph (SEM).

The process conditions for xonotlite formation are given in Table 7 below. The pigment properties of xonotlite are given in Table 8 below.

TABLE 7

Process Conditions of Xonotlite Formation (MW-2)

| Batch # | Raw Material | Molar Ratio ($CaO/SiO_2$) | Concentration (g/L) | Temperature (° C.) | Reaction Time (hours) |
|---|---|---|---|---|---|
| MW-2 | FCDE | 1.05 | 54 | 230 | 2 |

TABLE 8

Properties of Xonotlite (MW-2)

| Batch # | BET ($m^2/g$) | pH | Water Absorption (%) | Oil Absorption (%) |
|---|---|---|---|---|
| MW-2 | 137 | 11.6 | 315 | 379 |

The x-ray diffraction pattern of this synthetic multiphase calcium silicate hydrate, namely xonotlite, is given in FIG. 5. This product gave a unique x-ray pattern. The pattern indicated that the powder had one major phase. The summary of the characteristic "peaks" is shown in Table 9. The major peaks for phase I were found to indicate the presence of calcium silicate hydrate—xonotlite—$Ca_6Si_6O_{17}(OH)_2$) with major peaks at $d(Å)=3.107$, $d(Å)=1.75$ and a minor peak at $d(Å)=3.66$.

TABLE 9

X-ray diffraction peak analysis and summary for product labeled batch # MW-2 in Table 8 above.

| Common Name | Crystallchemical Formula | d-spacing (Major) | d-spacing (median) | d-spacing (Minor) |
|---|---|---|---|---|
| Xonotlite | $Ca_6Si_6O_{17}(OH)_2$ | d = 3.107 Å | d = 1.75 Å | d = 3.66 Å |

Some SEM pictures at 1500 times magnification are shown in FIG. 4. The SEM clearly shows the "fibrous" structure of xonotlite. The diameter of the "nano-fibers" ranges from about 10 nm to about 20 nm while the length ranges from about 1 microns to about 5 microns. Such dimensions result in a material having an aspect ratio of about 100:1. The SEM also depicts the three dimensional structure of the secondary particles of calcium silicate hydrates. Such secondary structure has a "pillow" or "haystack" or "globular" type appearance. The structure appears to have been formed by an interlocking of the primary "fibrous" crystals and some inter-fiber bonding due to hydro gel of silica formed during the initial stages of hydrothermal reaction. Because of these two main reasons, the secondary particles are fairly stable and do not significantly lose their 3-d structure when subjected to process shear. In addition, these particles also seem to withstand the pressure encountered during the calendaring or finishing operations integral to papermaking and coating. The median size of the secondary particles, as seen, ranges from about 10 microns to about 40 microns.

Step 2: Cogeneration of Nano-Composite (SAS & FCA) Having a Structured Amorphous Silica Component and a Fibrous Crystalline Calcium Carbonate (Aragonite) Component, by Pressure Carbonation.

The xonotlite slurry produced in step 1 was placed into a reactor at a slurry concentration of 0.45 pounds per liter. The starting carbonation temperature was 60° C. The reaction was carried out under a starting pressure of 70 psig. Carbon dioxide gas was bubbled through the reactor. The flow of carbon dioxide was at the rate of 3.6 liters per minute. As the reaction proceeded, the reaction temperature increased, with the temperature starting at 60° C. and ending at approximately 70° C. The end of the reaction was indicated when the temperature reached a maximum and then declined. The point of inflection in the temperature curve was taken as the completion point of the carbonation reaction. The pressure in the vessel spiked due to the incoming but unreacted $CO_2$. The reactor was first depressurized. Then, the reactor was opened and the reaction products were transferred to a holding vessel for storage. A portion of the resultant slurry was dried in an oven at 105° C. for 12 hours. During the drying process, the slurry formed hard lumps, which had to be broken up through the use of a mortar and pestle. The now powdered, dry product was brushed through a 100 mesh screen to insure product uniformity when testing. The pigment in this example was designated batch # MW-2-ARA.

Test were carried out on the dry powder were as follows:
(1) Surface Area (BET Method);
(2) pH;
(3) Percent Water Absorption;
(4) Percent Oil Absorption (ASTM D281-12);
(5) Mohr Salt Test;
(6) X-ray diffraction analysis; and
(7) Scanning Electron Micrograph (SEM).

The process conditions for cogeneration of nano-composites designated as batch # MW-2-ARA are given in Table 10. The product properties for the nano-composites designated as batch # MW-2-ARA are given in Table 11.

TABLE 10

Process conditions of MW-2-ARA

| Batch # | Start Temperature (° C.) | Final Temperature (° C.) | Δ T (° C.) | Start Pressure (bar) | $CO_2$ Flow Rate (L/min) |
|---|---|---|---|---|---|
| MW-2-ARA | 60 | 70 | 10 | 4.8 | 3.6 |

TABLE 11

Properties of Nano-Composite (MW-2-ARA)

| Batch # | BET (m²/g) | pH | Water Absorption (%) | Oil Absorption (%) | Mohr Salt Test |
|---|---|---|---|---|---|
| MW-2-ARA | 119 | 6.7 | 277 | 230 | Green |

The XRD pattern given in FIG. 7 for an embodiment of the nano-composite SAS & FCA material clearly identifies the presence of crystalline aragonite as a predominant component of the material. However, no XRD peak for a crystalline silica composition ($SiO_2$) was observed.

As also seen in FIG. 7, the XRD pattern for a nano-composite (SAS & FCA) material showed a peak for precipitated calcium carbonate, namely aragonite (fibrous crystalline aragonite), and a peak for a trace of synthetic calcium silicate hydrate (namely tobermorite). As seen in FIG. 6, however, the SEM photographs for the nano-composite (SAS & FCA) shows two distinct structural features, namely $SiO_2$ (in the solid circle) and aragonite (in the dashed oval). The first structural feature, $SiO_2$, resembles the original starting material, namely a haystack, pillow, or globular structure similar to the structure seen in the xonotlite (see the large circle illustrated in FIG. 4 above). The second structural feature resembles a crystalline aragonite calcium carbonate (see FIG. 21). The presence of a silica product was confirmed by an EDAX analysis (see FIG. 60). Since the silica product was virtually absent in the X-Ray diffraction (XRD) pattern of the nano-composite (SAS & FCA) as shown in FIG. 7, it may be inferred that the silica component was essentially non-crystalline, or amorphous.

Thus, as generally described above, it can be appreciated that a novel composition of matter has been created, in the nature of a nano-composite (SAS & FCA) including a fibrous amorphous silica component and a crystalline calcium carbonate component. In an embodiment, the fibrous amorphous silica component may be provided in three-dimensional haystack (which may alternately be said to be a pillow shaped or globular shape three-dimensional structure). In an embodiment, the fibrous amorphous silica component presents a fibrous structure having interstitial spaces between the amorphous silica fibers, with inner layers and outer layers of amorphous silica fibers, and having irregular interlacing amorphous silica fibers or filaments which are fixed in relation to each other. The crystalline calcium carbonate component includes aragonite needle structures, which may be grown from, that is, attached to and arising outward from, a portion of the fibrous amorphous silica component. In various embodiments, the nano-composite (SAS & FCA) structure has a major axis of length L (e.g, L would be the diameter D if the structure were truly spherical, or L would be the major axis of an ovoid, i.e. an elliptically shaped solid, rather similar to irregular solids shown SEM photographs in the various drawing figures) in the range of from about 10 microns to about 40 microns. In various embodiments, such novel nano-composites may have a surface area of from about 40 meters squared per gram to about 200 meters squared per gram. In various embodiments, such novel nano-composites may have a surface area in the range of from about 50 meters squared per gram to about 150 meters squared per gram. In various embodiments, the amorphous silica fibers may have a length of from about 3 microns to about 4 microns. In various embodiments the amorphous silica fibers may have a diameter of about 10 nm. In various embodiments, the amorphous silica fibers may have an aspect ratio of from about 50:1 to about 100:1. In various embodiments, the aragonite needle structures comprise aragonite crystals which may have a length of from about 1 micron to about 10 microns. In various embodiments, the aragonite crystals may have a length of from about 3 microns to about 5 microns. In various embodiments, the aragonite needle structure may comprise aragonite crystals having a diameter of from about 100 nm to about 200 nm. In various embodiments, the aragonite crystals may have an aspect ratio of from about 50:1 to about 100:1. In various embodiments, the novel nano-composite composition of matter as set forth herein may be further characterized in that in an X-ray diffraction of the nano-composite composition, a major peak for aragonite appears at approximately 3.22 angstroms. In various embodiments, the novel nano-composite composition of matter described herein may be further characterized in that when mixed with water, the pH is in the range of from about 6.5 to about 7.5.

In various embodiments, nano-composites (SAS & FCA) materials as described herein may have a composition such that their water absorption characteristic is in the range of from about 100% to about 300%. In various embodiments, nano-composites (SAS & FCA) materials as described herein may have a composition such that their water absorption characteristic is at least 100%. In various embodiments, nano-composites (SAS & FCA) materials as described herein may have a composition such that their oil absorption characteristic id in the range of from about 150% to about 300%. In various embodiments, nano-composites (SAS & FCA) materials as described herein may have a composition such that their oil absorption characteristic is in the range of from about 200% to about 250%.

Example 2—Novel Nano-Composite (SAS & FCA) Production

Step 1: Preparation of Synthetic Calcium Silicate Hydrate—Xonotlite

A multiphase calcium silicate hydrate of was formed by way of the hydrothermal reaction of lime and silica as described in Example 1. The difference from Example 1 was that the silica source used in this Example 2 was a non-calcined or natural diatomaceous earth. The sample was labeled as batch # MN-2. The process conditions for preparation of sample identified as batch # MN-2 are given in Table 12. The pigment properties for the sample identified as batch # MN-2 are given in Table 13.

TABLE 12

Process conditions of Xonotlite Formation (MN-2)

| Batch # | Raw Material | Molar Ratio (CaO/SiO₂) | Concentration (g/L) | Temperature (° C.) | Reaction Time (hours) |
|---|---|---|---|---|---|
| MN-2 | Natural DE | 1.05 | 54 | 230 | 2 |

TABLE 13

Properties of Xonotlite (MN-2)

| Batch # | BET (m²/g) | pH | Water Absorption (%) | Oil Absorption (%) |
|---|---|---|---|---|
| MN-2 | 75 | 12.2 | 432 | 290 |

Figure 26:
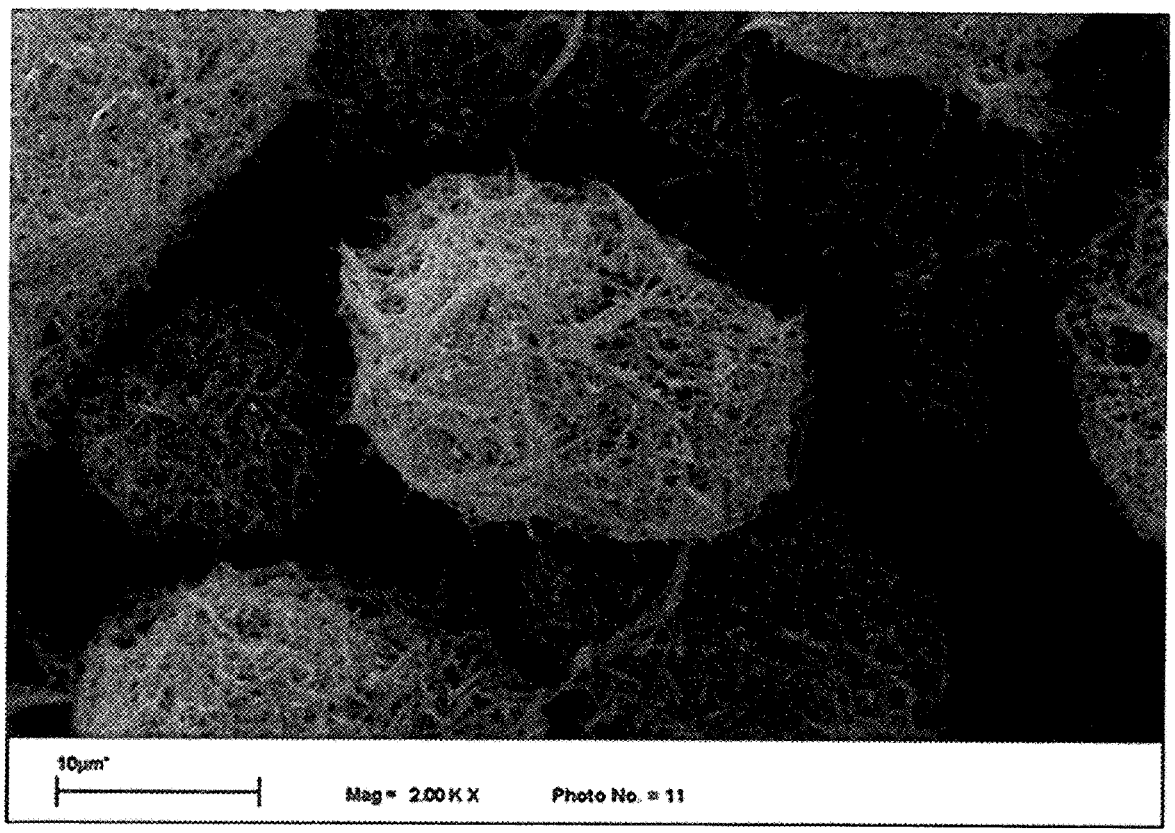
FIG. 26 shows a photograph taken using a scanning electron microscope (SEM) at 2000 times magnification of a synthetic calcium silicate hydrate in the xonotlite phase, showing macro structured fibrous particles having interstitial spaces between adjacent fibers, and which may be selected as an exemplary raw material to serve as replaceable substrate in the manufacture of a novel nano-composite material that includes both nano-structured amorphous silica ("SAS") and nano-fibrous crystalline aragonite ("FCA"), which novel nano-composite material may be identified herein as "SAS & FCA".
Figure 27:
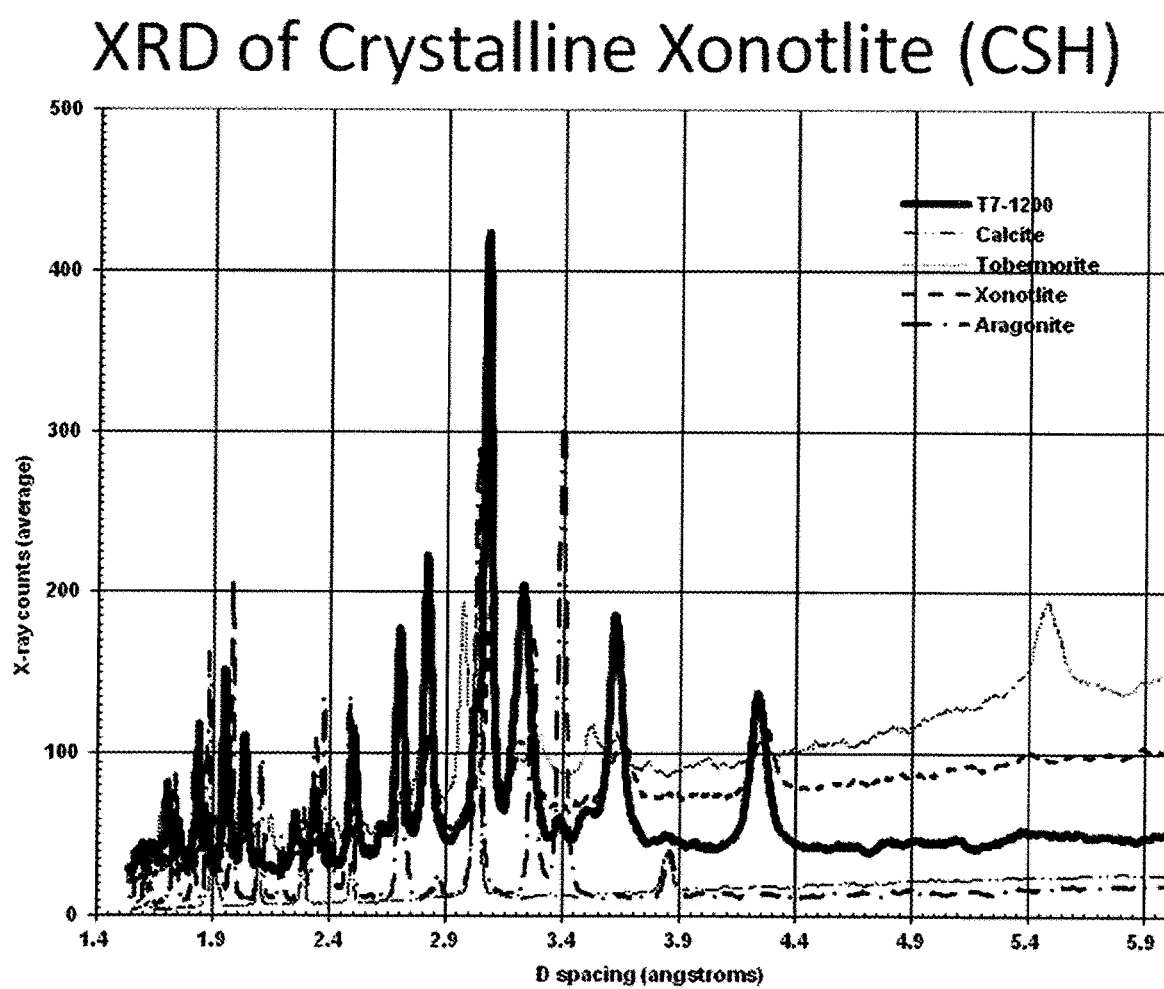
FIG. 27 shows a graph of an X-ray diffraction (XRD) scan of a sample of the unique material just shown in FIG. 26 (designated as sample material T7-1200), along with some standard control materials including calcite, aragonite, tobermorite, and xonotlite; note that the data indicates that the sample material includes peaks at the location of major XRD peaks of xonotlite, with a minor amount of tobermorite.
Figure 28:
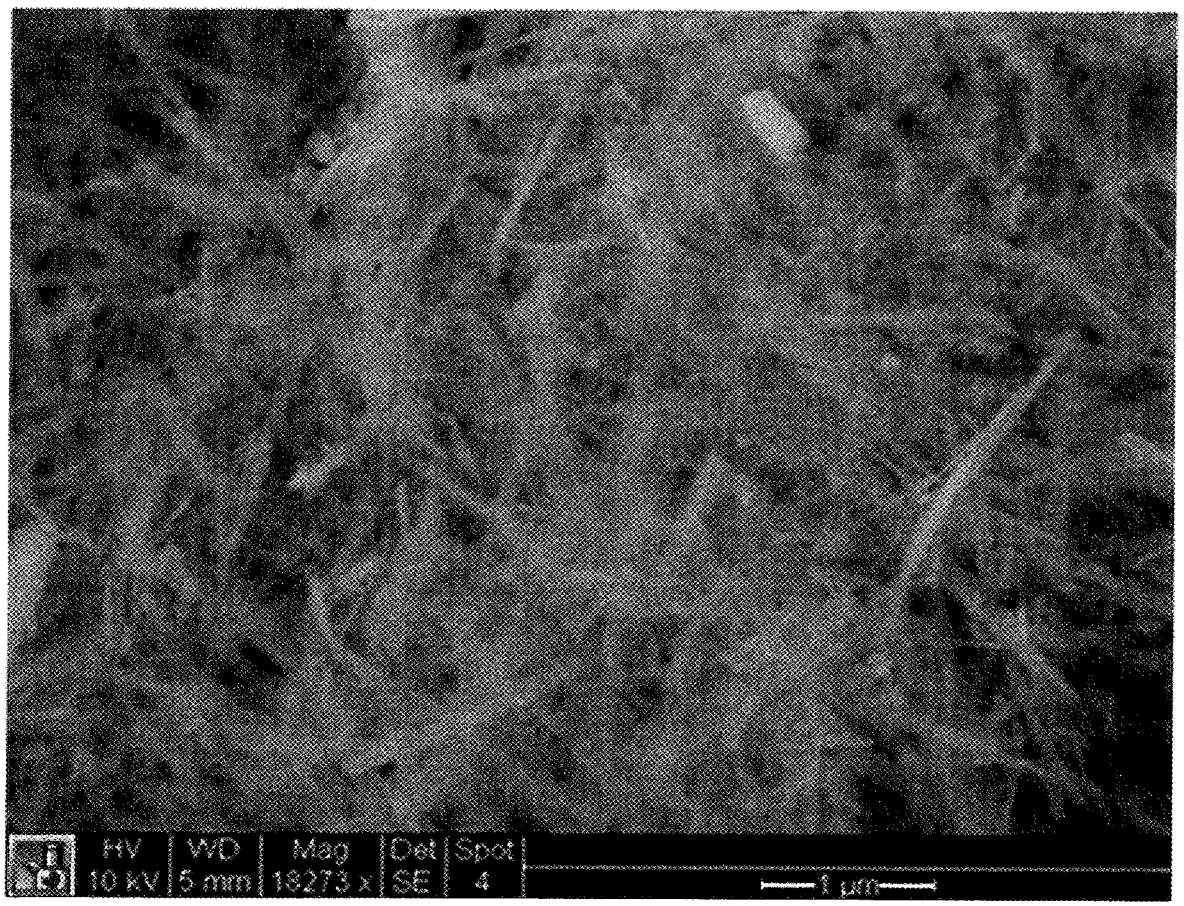
FIG. 28 shows a photograph taken using a scanning electron microscope (SEM) at 18273 times magnification of a synthetic nano-fibrous calcium silicate hydrate in the xonotlite phase, which may be selected as a useful raw material in the manufacture of a nano-composite containing a structured amorphous silica and a fibrous calcium carbonate crystal in a selected phase such as aragonite.
Figure 29:
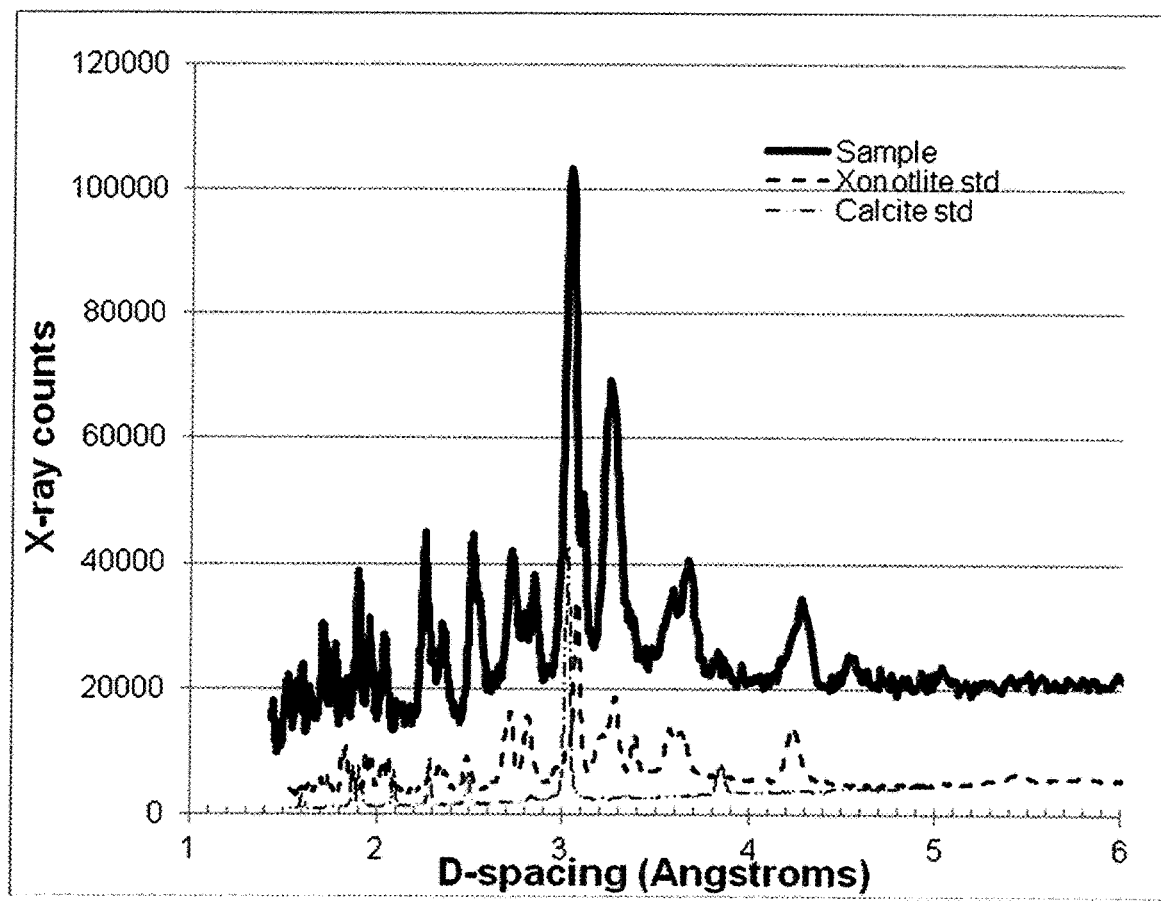
FIG. 29 shows a graph of an X-ray diffraction (XRD) scan of a sample of the calcium silicate hydrate material just illustrated in FIG. 28, along with two other standard control materials, namely xonotlite and calcite; note that the sample material includes peaks at the location of major XRD peaks of xonotlite.

The graph of the XRD pattern of this sample of crystalline xonotlite is given in FIG. 27. The SEM photograph of this sample of crystalline xonotlite is given in FIG. 26.

Step 2: Cogeneration of Nano-Composite (SAS & FCA) Having a Structured Amorphous Silica Component and a Fibrous Crystalline Calcium Carbonate (Aragonite) Component, by Pressure Carbonation.

In this step, the same process conditions were followed as in Example 1. The resulting sample was labeled as batch # MN-2-ARA, The process conditions for the cogeneration reaction are given in Table 14. The pigment properties of the resultant novel nano-composite (SAS & FCA) material are given in Table 15:

TABLE 14

Process conditions of Batch # MN-2-ARA

| Batch # | Start Temperature (° C.) | Final Temperature (° C.) | Δ T (° C.) | Start Pressure (bar) | $CO_2$ Flow Rate (L/min) |
|---|---|---|---|---|---|
| MN-2-ARA | 60 | 70 | 10 | 4.8 | 3.6 |

TABLE 15

Properties of Nano-Composite Batch # MN-2-ARA

| Batch # | BET ($m^2/g$) | pH | Water Absorption (%) | Oil Absorption (%) | Mohr Salt Test |
|---|---|---|---|---|---|
| MN-2-ARA | 119 | 6.7 | 277 | 230 | Green |

The graph of the XRD pattern of a nano-composite SAS & FCA material is provided in FIG. 3. The SEM photograph of such nano-composite SAS & FCA is given in FIG. 2.

Example 3—Novel Nano-Composite (SAS & FCA) Production

Step 1: Preparation of Synthetic Calcium Silicate Hydrate—Tobermorite

A multiphase calcium silicate hydrate of was formed by hydrothermal reaction of lime and silica as generally described in Example 1. The differences were that the silica source in this Example 3 was course ground quartz (Sil-Co-Sil 106 from US Silica). The reaction temperature was reduced to 220° C., and the reaction time was increased to 4 hours. Finally, the $CaO/SiO_2$ molar ratio was increased to 1.30 while the solids composition of the slurry was decreased to 43 grams per liter. This calcium silica hydrate (CSH) was made in a 30 gallon reactor with similar temperature probes and an agitator similar to the reactors described above. The sample was labeled as batch # T30-8-078. The process conditions for preparation of sample as batch # T30-8-078 are given in Table 16. The pigment properties are for sample batch # T30-8-078 given in Table 17:

TABLE 16

Process conditions of Tobermorite Formation (T30-8-078)

| Batch # | Raw Material | Molar Ratio ($CaO/SiO_2$) | Concentration (g/L) | Temperature (° C.) | Reaction Time (hours) |
|---|---|---|---|---|---|
| T30-8-078 | Ground Quartz | 1.30 | 43 | 220 | 4 |

TABLE 17

Properties of Tobermorite (T30-8-078)

| Batch # | BET ($m^2/g$) | pH | Water Absorption (%) | Oil Absorption (%) |
|---|---|---|---|---|
| T30-8-078 | 239 | 10.8 | 559 | 600 |

Figure 16:
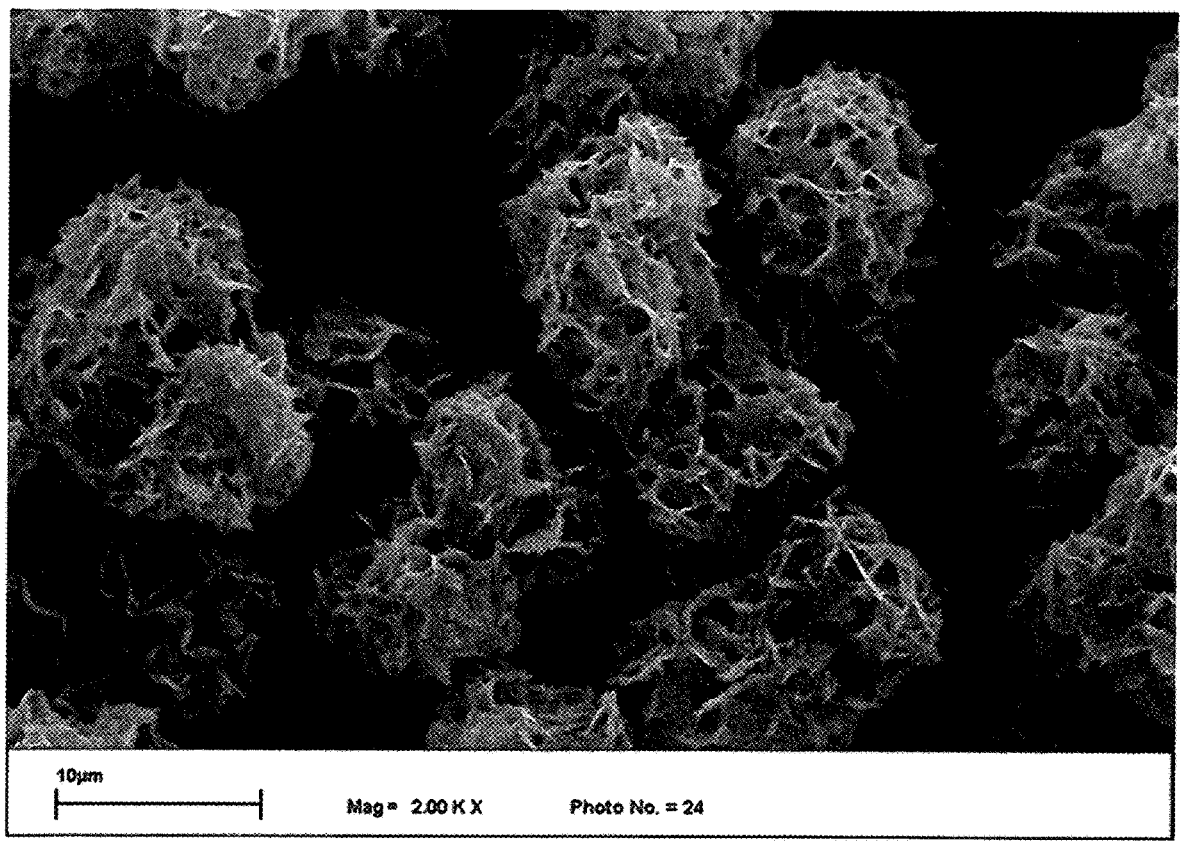
FIG. 16 is a photograph taken using a scanning electron microscope (SEM) at 2000 times magnification of another fibrous calcium silicate hydrate, namely tobermorite.

The SEM photograph of this calcium silicate hydrate is shown in FIG. 16. The graph of the XRD pattern of this calcium silicate hydrate is provided in FIG. 17.

Step 2: Cogeneration of Nano-Composite (SAS & FCA) Having a Structured Amorphous Silica Component and a Fibrous Crystalline Carbonate Component, by Pressure Carbonation.

In this example, seed material was added to the slurry. Otherwise, the process conditions were generally the same as set forth in Example 1. The sample ID was batch # T30-8-078-ARA. The process conditions for cogeneration of sample batch # T30-8-078-ARA are given in Table 18. The pigment properties for sample batch # T30-8-078-ARA are given in Table 19:

TABLE 18

Process conditions for preparation of T30-8-078-ARA

| Batch # | Start Temperature (° C.) | Final Temperature (° C.) | Δ T (° C.) | Start Pressure (bar) | $CO_2$ Flow Rate (L/min) |
|---|---|---|---|---|---|
| T30-8-078-ARA | 60 | 70 | 10 | 4.8 | 112 |

TABLE 19

Properties of Nano-Composite (T30-8-078-ARA)

| Batch # | BET ($m^2/g$) | pH | Water Absorption (%) | Oil Absorption (%) | Mohr Salt Test |
|---|---|---|---|---|---|
| T30-8-078-ARA | 112 | 6.8 | 191 | 207 | Green |

Figure 30:
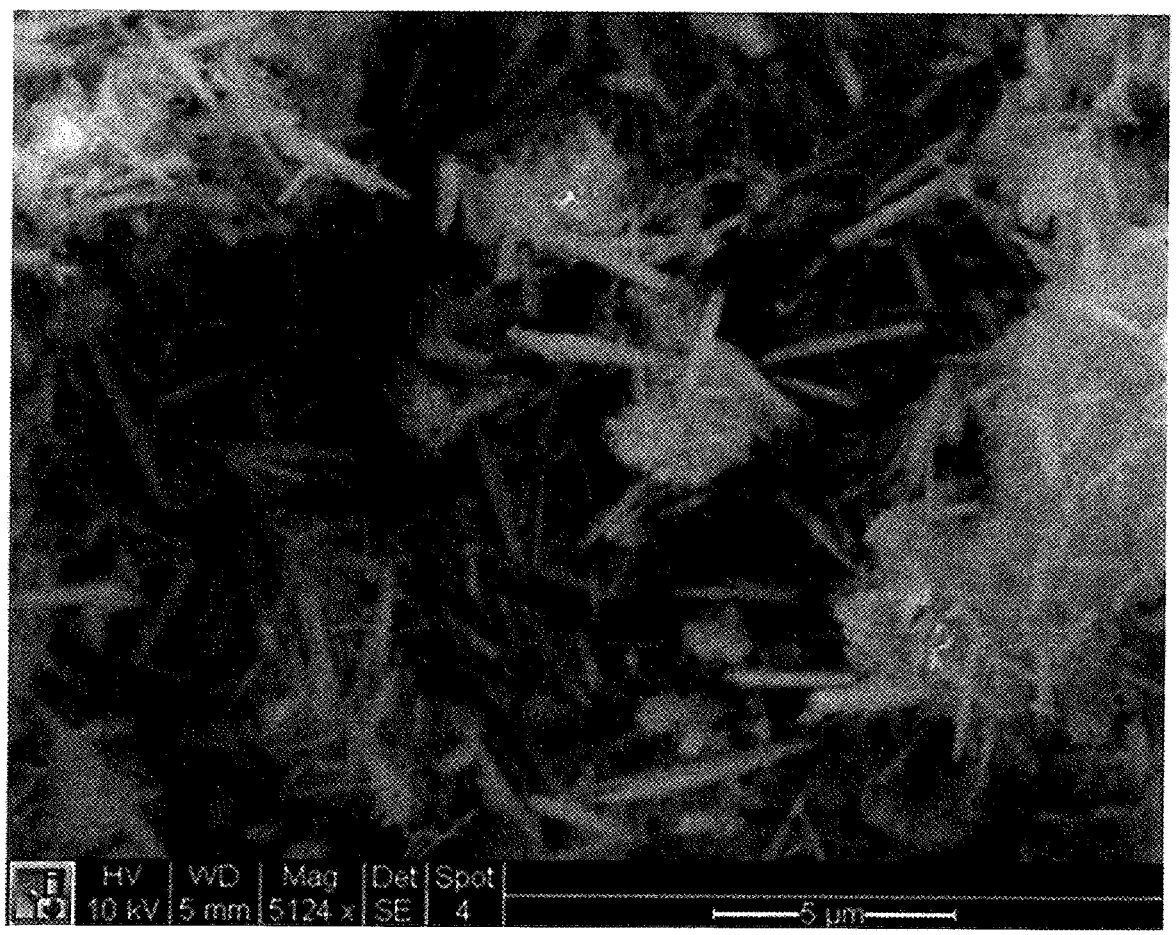
FIG. 30 shows a photograph taken using a scanning electron microscope (SEM) at 5124 times magnification of a sample of a novel, unique nano-composite material containing structured amorphous silica ("SAS") and a fibrous calcium carbonate in a selected phase, namely aragonite ("FCA"), together designated using the abbreviation "SAS & FCA", as may be manufactured according to the instructions set forth herein.
Figure 31:
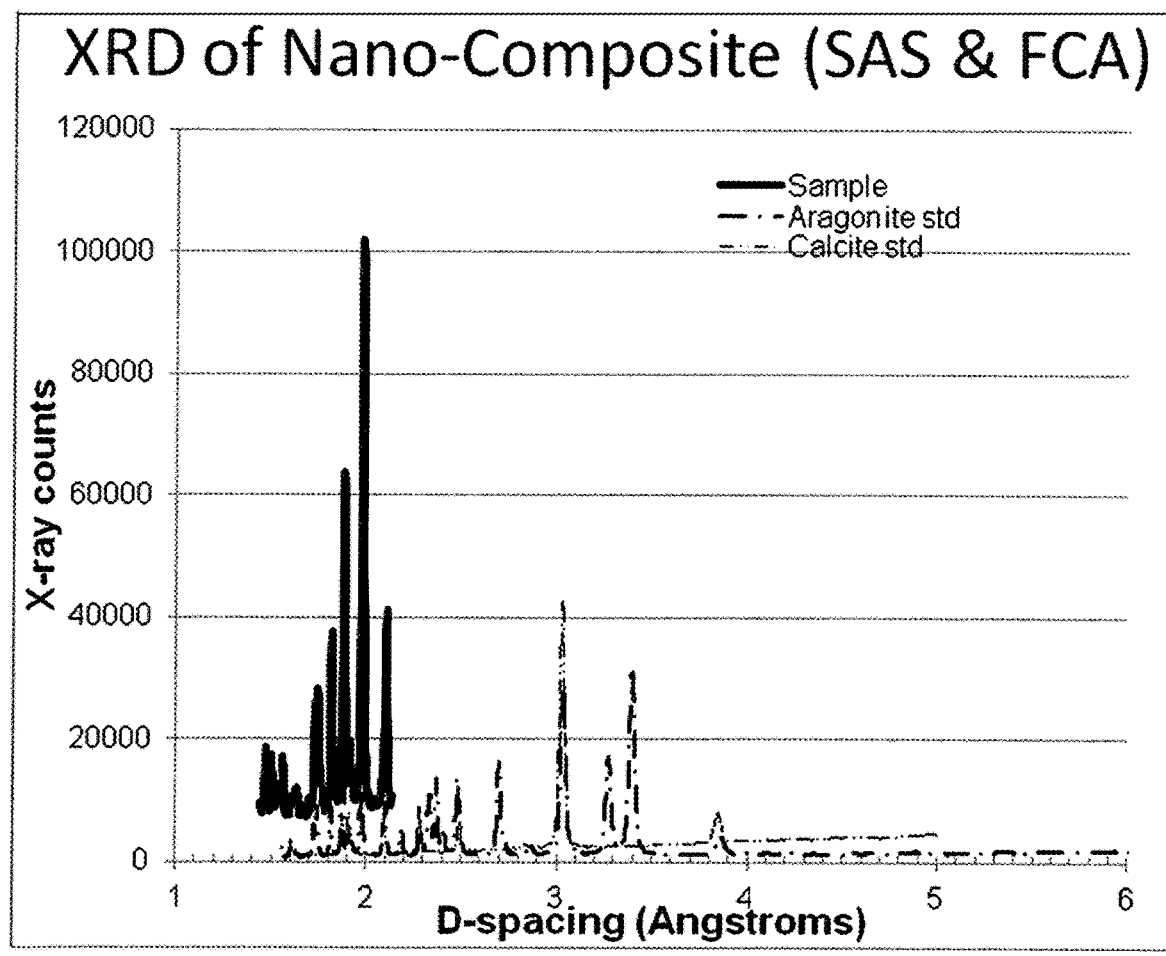
FIG. 31 shows a graph of an X-ray diffraction (XRD) scan of a sample of a novel, unique nano-composite material (SAS & FCA) as shown and described in FIG. 30, along with two other standard control materials, namely aragonite and calcite; note that this graph indicates that the nano-composite material (SAS & FCA) includes peaks at the same locations the major XRD peaks of aragonite.

The SEM photograph of this nano-composite (SAS & FCA) is shown in FIG. 30. The graph of the XRD pattern of this nano-composite is shown in FIG. 31.

Example 4—Novel Nano-Composite (SAS & FCA) Production

Step 1: Preparation of Synthetic Calcium Silicate Hydrate—Foshagite

This novel, multiphase calcium silicate hydrate of was formed by the same hydrothermal reaction of lime and silica as described in Example 3. The reaction temperature was increased to 250° C., while the reaction time was reduced to 2 hours. The sample was labeled T30-8-082. The process conditions for preparation of material designated as batch T30-8-082 are given in Table 20. The pigment properties for materials identified as batch T30-8-082 are given in Table 21.

TABLE 20

Process conditions of Foshagite Formation (T30-8-082)

| Batch # | Raw Material | Molar Ratio (CaO/SiO$_2$) | Concentration (g/L) | Temperature (° C.) | Reaction Time (hours) |
|---|---|---|---|---|---|
| T30-8-082 | Ground Quartz | 1.30 | 43 | 250 | 2 |

TABLE 21

Properties of Foshagite (T30-8-082)

| Batch # | BET (m$^2$/g) | pH | Water Absorption (%) | Oil Absorption (%) |
|---|---|---|---|---|
| T30-8-082 | 37 | 11.7 | 234 | 231 |

Figure 32:
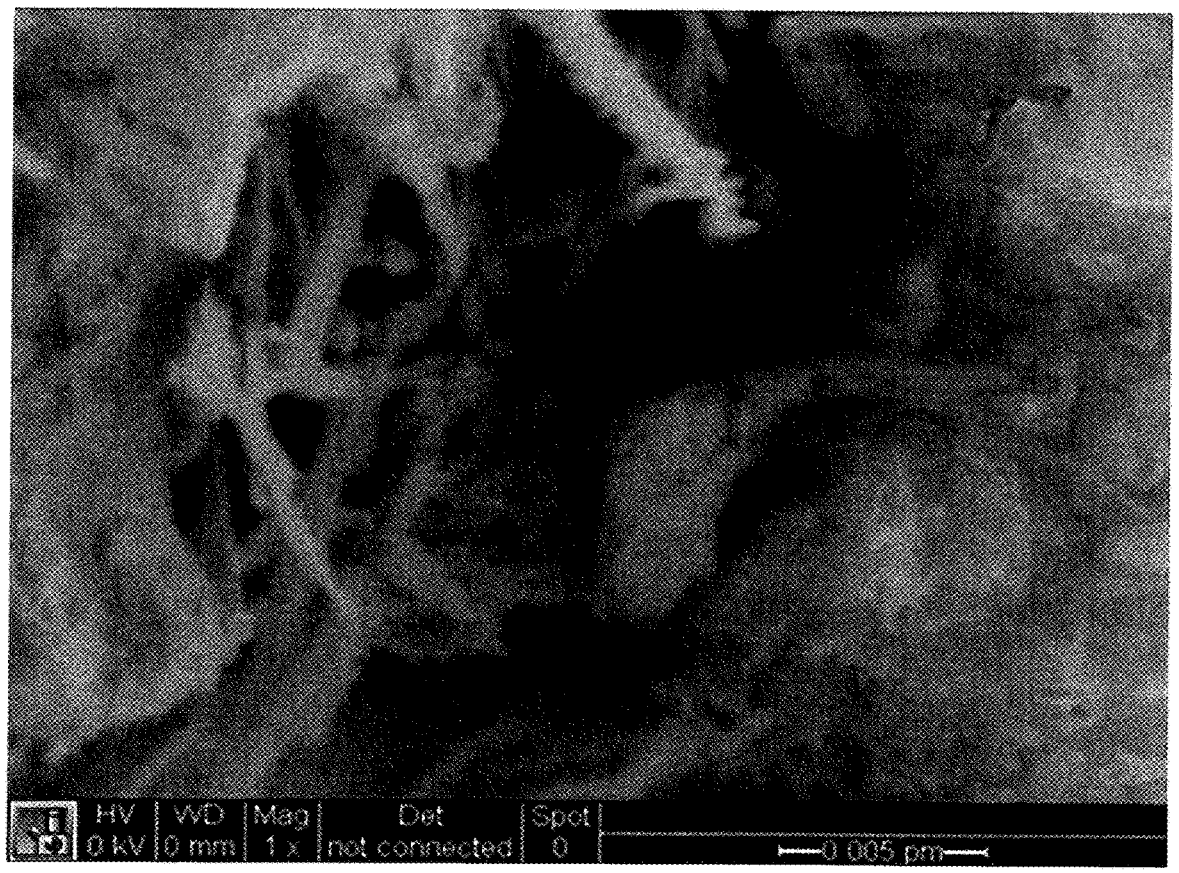
FIG. 32 shows a photograph taken with a scanning electron microscope (SEM) at approximately 15000 times magnification of a synthetic nano-fibrous calcium silicate hydrate in the foshagite phase, which may be useful as a raw material in the manufacture of nano-composite materials as further set forth herein below; note, however, the scale indicated at the bottom is not correct and the correct scale length (rather than 0.005 pm) should actually indicate two (2) microns.
Figure 33:
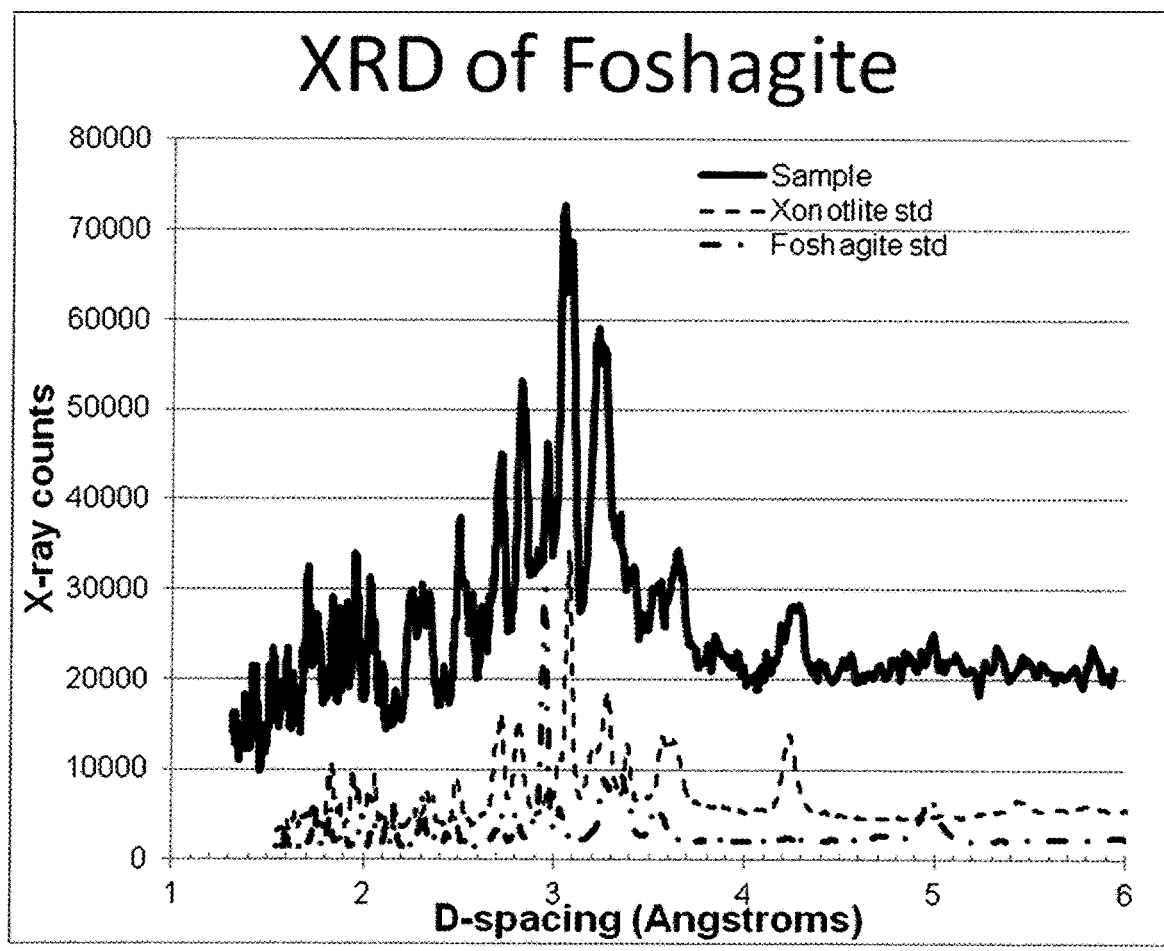
FIG. 33 shows a graph of an X-ray diffraction (XRD) scan of a sample of the material just illustrated in FIG. 32, along with other control materials, namely xonotlite and foshagite; note that this data indicates that the sample material includes major XRD peaks at the same locations as both xonotlite and foshagite.

The SEM photograph of this calcium silicate hydrate (foshagite) is shown in FIG. 32, The graph of the XRD pattern of this calcium silicate hydrate (foshagite) is shown in FIG. 33.

Step 2: Cogeneration of Nano-Composite (SAS & FCA) Having a Structured Amorphous Silica Component and a Fibrous Crystalline Calcium Carbonate Component, by Pressure Carbonation.

In this example seed material was added to the slurry. Other than that the process conditions were generally the same as set forth in Example 1. The sample ID was batch # T30-8-082-ARA. The process conditions for cogeneration are given in Table 22. The pigment properties of this nano-composite SAS & FCA material are given in Table 23.

TABLE 22

Process Conditions of T30-8-082-ARA

| Batch # | Start Temperature (° C.) | Final Temperature (° C.) | Δ T (° C.) | Start Pressure (bar) | CO$_2$ Flow Rate (L/min) |
|---|---|---|---|---|---|
| T30-8-082-ARA | 60 | 70 | 10 | 4.8 | 112 |

TABLE 23

Properties of Nano-Composite (T30-8-082-ARA)

| Batch # | BET (m$^2$/g) | pH | Water Absorption (%) | Oil Absorption (%) | Mohr Salt Test |
|---|---|---|---|---|---|
| T30-8-082-ARA | 171 | 6.9 | 211 | 220 | Green |

Figure 34:
FIG. 34 shows a photograph taken using a scanning electron microscope (SEM) at 19591 times magnification of a sample of a nano-structured composite material that includes nano-fibrous structured amorphous silica ("SAS") and nano-fibrous precipitated calcium carbonate in the aragonite phase ("FCA"), which novel nano-composite material (SAS & FCA) was made according to process(es) set forth herein.
Figure 35:
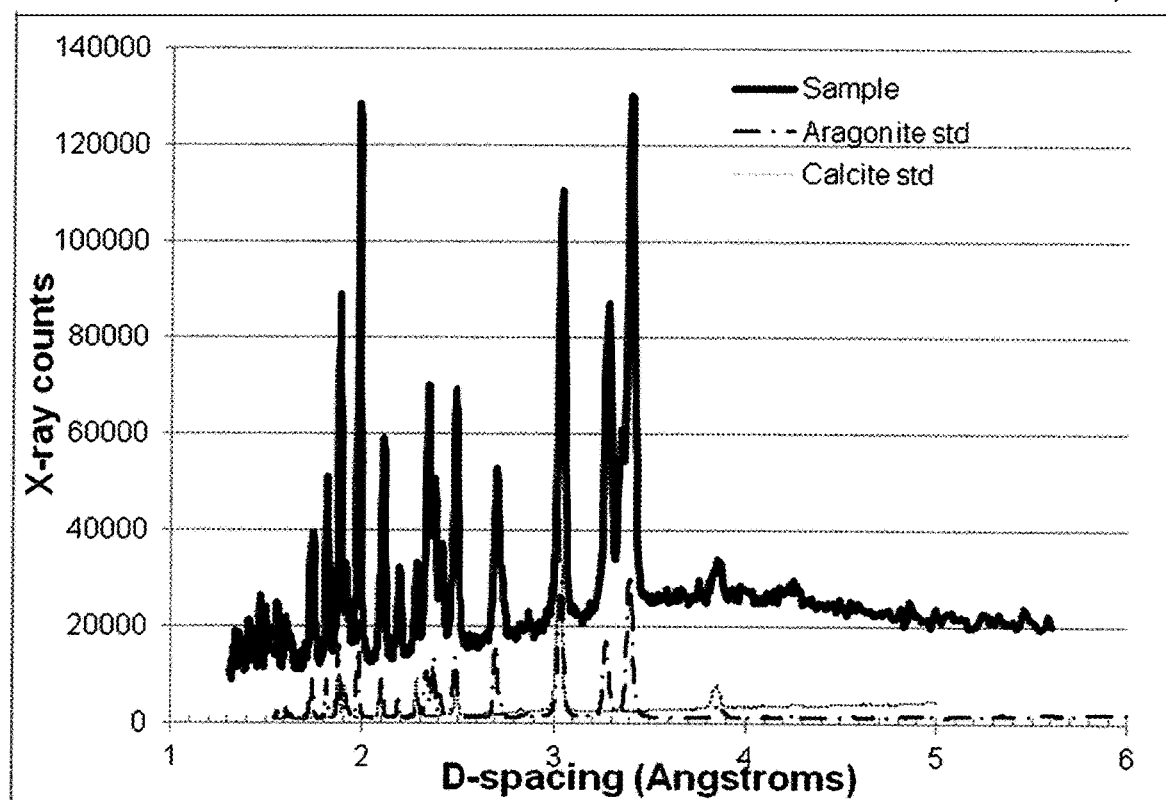
FIG. 35 shows a graph of the X-ray diffraction (XRD) scan of the nano-structured composite material (SAS & FCA) just shown and described in FIG. 34, along with two standard control materials, namely aragonite and calcite; note that the data indicates that the sample includes major XRD peaks at the same locations as aragonite.

The SEM photograph of this nano-composite (SAS & FCA) is provided in FIG. 34. The graph of the XRD pattern of this nano-composite (SAS & FCA) is provided in FIG. 35.

In summary, an exemplary embodiment of a nano-composite (SAS & FCA) may be manufactured in a straightforward manner. A synthetic calcium silicate hydrate is provided. The selected synthetic crystalline calcium silicate hydrate includes a base structure. Suitable synthetic calcium silicate hydrate may include one or more of (a) xonotlite, (b) foshagite, (c) tobermorite, (d) riversidite, or other synthetic calcium silicate hydrates. Currently, it is believed that the most cost effective results may be achieved by use of xonotlite; however, more work may reveal that products from other substrate starting synthetic calcium silicate hydrates may be provide advantageous properties as described herein. In various embodiments, the selected synthetic calcium silicate hydrate is mixed with water, sodium hydroxide, and calcium hydroxide, to provide a slurry. The slurry is provided to a reactor. In an embodiment, selected synthetic calcium silicate hydrate(s) may be provided in the slurry in the range of from about 36 grams per liter to about 120 grams per liter. In an embodiment, the selected synthetic calcium silicate hydrate(s) may be provided in the slurry in the range of from about 48 grams per liter to about 96 grams per liter. 3 In an embodiment, the selected synthetic calcium silicate hydrate(s) may be provided in the slurry in the range of from about 12 grams per liter to about 600 grams per liter. In an embodiment, the ratio of CaO to SiO$_2$ in the slurry may be in the range of from about 0.75 to about 1.3. In various embodiments, the reactor is pressurized, and carbonation of the selected synthetic crystalline calcium silicate hydrate proceeds by addition of carbon dioxide or carbonic acid to the reactor while agitating the contents of the reactor. In an embodiment, the pressure of the reactor may be in the range of from about 0.69 bar to about 20.68 bar. In an embodiment, the pressure of the reactor may be in the range of from about 2.07 bar to about 6.89 bar. In an embodiment, the pressure of the reactor may be in the range of from about 3.45 bar to about 6.21 bar. In an embodiment, the pressure of the reactor may be maintained at about 4.83 bar. In an embodiment, the carbon dioxide may be provided to the reactor as a gas. In various embodiments, the carbon dioxide may be present in the gas at from about 5% carbon dioxide, to about 100% carbon dioxide. In an embodiment, the carbon dioxide may be present in the gas about from about 10% to about 20%.

During reaction, calcium is extracted from the selected synthetic calcium silicate hydrate that provides the base structure. Thus, the selected synthetic crystalline calcium silicate hydrate composition is transformed to silicon dioxide, thereby forming a fibrous amorphous silica component. In various embodiments, the fibrous amorphous silica component is provided in three-dimensional haystack configuration (may also be described as globular or pillow shaped) that presents a fibrous structure having interstitial spaces between amorphous silica fibers with inner layers and outer layers with irregular interlacing amorphous silica fibers or filaments that are fixed in relation to each other. Such reaction proceeds under reaction conditions known to be conducive to the formation of precipitated calcium carbonate in the form of crystalline aragonite. In an embodiment, the crystalline aragonite are attached to the fibrous amorphous silica component. Thus, a nano-composite product is produced, wherein the nano-composite product includes both fibrous structured amorphous silica and precipitated calcium carbonate in the form of fibrous crystalline aragonite. In various embodiments, the nano-composite product may have a major axis of length L in the range from about 10 microns to about 40 microns, and a surface area of from about 40 meters squared per gram to about 200 meters squared per gram. The reactor may be depressurized, preferably after reactants have been consumed to the extent feasible for the formation of the nano-composite material. Contents of the reactor may then been cooled. In most applications, it may be necessary or convenient to dry the nano-composite product produced in said reactor.

In various embodiments of a method for production of a nano-composite of the type set forth herein, the step of providing slurry may further include providing seed material. In an embodiment, such seed material may comprise aragonite. In various embodiments, such seed material may comprise a previously manufactured portion of the nano-composite product itself. In an embodiment, the seed material may include one or more selected synthetic calcium silicate hydrates. In various embodiments, the selected synthetic calcium silicate hydrates for use as seed material may include one or more of (a) xonotlite, (b) foshagite, (c) tobermorite, and (d) riversidite. In an embodiment, the seed material may include calcium hydroxide ($Ca(OH)_2$) in the range of from about 2% to about 10% by weight. In an embodiment, the seed material may include magnesium hydroxide ($Mg(OH)_2$) in the range of from about 2% to about 10% by weight. In an embodiment, the seed material may include calcium hydroxide ($Ca(OH)_2$) in the range of from about 2% to about 10% by weight, and magnesium hydroxide ($Mg(OH)_2$) in the range of from about 2% to about 10% by weight, and wherein the ratio of magnesium hydroxide to calcium hydroxide is in the range of from about 1:1 to about 2:1. In an embodiment, the seed material may include amorphous silica.

Applications for Nano-Composites (SA & FCA) in Coatings

Process for Making Coats

In an experimental apparatus, after a batch of nano-composite (SAS & FCA) material had been manufactured, validated, and approved by the tests described above, a slurry was then run through a 100 (152 micron) to 200 mesh (75 micron) screen to remove large particles, inert material, and reactor scale. After the oversized material was removed, the slurry was then run through a series of unit operations to remove the excess water. In industrial practice, such processes may include use of a drum filter, and/or press filters, and/or vacuum filtration, and/or spray drying, and/or oven drying, or the like. In an embodiment, a dry, final product may be obtained. Such dry material may be ground up, e.g using a ball mill or the like, so that the dried solid nano-composite material will pass through a screen of selected size, such as a 100 mesh screen.

High Solids Pigment Slurry

After a dry pigment sample was screened, it was then mixed with water to make a high solids slurry with solids ranging from about 40% to about 60%. That was accomplished with the use of a high shear mixer (such as a Cowlez mixer or Silverson Unit). Before the dry pigment was mixed with the water, a dispersing agent was added to the water (e.g., a sodium polyacrylamide). The amount of dispersing agent added per pound of dry pigment may vary widely depending upon the selected dispersant, but for the stated example, may range from about 0.5% to about 4%. The resulting slurry was passed through a 100 mesh screen to remove large agglomerated particles.

Coating Formulation—Pigment Mixing

Several different coating pigments may be combined to make a coating formulation. Such coating pigments may include coating clays, calcined clays, various forms of calcium carbonates, titanium dioxide, and other materials. Different coating pigments may be dispersed individually, either at the manufacturer's plant or the consumer's plant. The order of mixing the various coating pigments is generally not too important, but care should be taken to insure that agglomeration with different pigments does not occur. With the different coating mixtures, the dispersed pigments described above were blended based on a parts method, by weight. Exemplary coating formulations are given in specific examples set forth below.

After the various coating pigments were added to together, various binding agents were added to the blend. Some synthetic binding agents may include, but are not limited to, styrene-butadiene latex ("SB latex"), styrene-acrylate latex, polyvinyl acetate, polyvinyl alcohol, vinyl acrylic latex, and vinyl acetate-ethylene latex. Also, natural binding agents may be selected from various materials such as corn and/or potato starches that have been modified, e.g., by enzyme conversion, or acid thinned, or cation protonated, or oxidized, or hydroxyethylated, or thermally modified, and/or turned into a biopolymer. Also, various soy proteins, modified by adding carboxyl groups, may be utilized.

After the final material components were added, the coating formulation was screened through a selected screen, and in this embodiment, through a 100 mesh screen.

Thus, an exemplary coating composition for coating paper, paperboard products, or label stock may be provided by utilizing the nano-composite material described herein above. In various embodiments, exemplary coating compositions may be provided using a water slurry including (a) a nano-composite material having a fibrous amorphous silica component, and a crystalline aragonite component. In an embodiment, the fibrous amorphous silica component may be provided in three-dimensional haystack or globular configuration that presents a fibrous structure having interstitial spaces between amorphous silica fibers, with inner layers and outer layers with irregular interlacing amorphous silica fibers or filaments which are fixed in relation to each other. In an embodiment, the crystalline calcium carbonate component includes aragonite needle structures. The aragonite needle structures arise from the fibrous amorphous silica component. Overall, in exemplary embodiments, the nano-composite material may have a major axis of length L in the range from about 10 microns to about 40 microns, and a surface area of from about 40 meters squared per gram to about 200 meters squared per gram. A suitable coating composition may also include clay, such as natural or calcined clays, and one or more binders. In an embodiment, suitable binders may include one or more latex compounds as generally known in the art. In an embodiment, suitable binders may include one or more protein or protein derivative compounds as generally known in the art. Before use, a thoroughly mixed coating composition should be passed through a screen of selected size, to assure uniformity and absence of oversize materials. In an embodiment, a 100 mesh screen may be suitable. In an embodiment for a coating composition, the amorphous silica fibers in the amorphous silica component may have a length of from about 3 microns to about 4 microns. In an embodiment for a coating composition, the amorphous silica fibers in the amorphous silica component may have fibers with a diameter of about 10 nm. In an embodiment for a coating composition, the amorphous silica fibers in the amorphous silica component may have an aspect ratio of from about 50:1 to about 100:1. In an embodiment for a coating composition, the aragonite needle structures may include aragonite crystals having a length of from about 1 micron to about 10 microns. In an embodiment such aragonite crystals may have a length of from about 3 microns to about 5 microns. In an embodiment, such aragonite needle structures may include aragonite crystals having a diameter of from about 100 nm to about 200 nm. In an embodiment, the aragonite crystals may have an aspect ratio of from about 50:1 to about 100:1. In various embodiments of a coating composition, such nano-composite products may have a water absorption characteristic in the range of from about 100% to about 300%. In various embodiments of a coating composition, such nano-composite products may have a water absorption characteristic of at least 150%. In various embodiments of a coating composition, such nano-composite products may have an oil absorption characteristic in the range of from about 150% to about 300%. In various embodiments of a coating composition, such nano-composite products may have an oil absorption characteristic in the range of from about 200% to about 250%. In various embodiments of a coating composition, such nano-composite products may have a surface area in the range of from about 50 meters squared per gram to about 150 meters squared per gram.

In various embodiments, a suitable coating composition may further include ground calcium carbonate. In various embodiments of a coating composition, such nano-composite products may further include at least some titanium dioxide. In various embodiments of exemplary coating compositions as set forth herein, an increase in the amount of said nano-composite material in the coating composition may allow decrease in the quantity of said titanium dioxide necessary to be used in said coating composition, in order to achieve desired properties such as brightness or opacity. For example, in a selected coating composition, wherein as a base case a specific target brightness may be achieved with selected amount of titanium dioxide in the absence of nano-composite material, it may be noted that such specific target brightness may also be achieved by replacement of up to 75% of the selected amount of titanium dioxide by addition of an effective amount of the nano-composite material in the coating composition. Similarly, in a selected coating composition, wherein as a base case a specific target brightness may be achieved with selected amount of titanium dioxide in the absence of said nano-composite material, it may be noted that such specific target brightness may also be achieved by replacement of 50% of the selected amount of titanium dioxide by addition of an effective amount of the nano-composite material. Similarly, in a selected coating composition, wherein as a base case a specific target brightness may be achieved with selected amount of titanium dioxide in the absence of said nano-composite material, it may be noted that such specific target brightness may also be achieved by replacement of 25% of the selected amount of titanium dioxide by addition of an effective amount of the nano-composite material. More generally, it can be said that in many cases where a coating composition further includes any one or more of (a) titanium dioxide, (b) calcined clay, (c) natural clay, and (d) ground calcium carbonate, and providing an effective amount of the nano-composite material in the coating composition may allow a decrease in the quantity of a selected one or more of (a) titanium dioxide, (b) calcined clay, (c) natural clay, and (d) ground calcium carbonate, in the coating composition, as necessary to meet selected performance or cost objectives.

In must further be noted that the nano-composite (SAS & FCA) material described herein may have, in many cases, beneficial attributes to coating formulations, generally. In an embodiment the nano-composite material comprises a viscosity modifier. In an embodiment, the nano-composite material comprises an immobilization time reduction agent in a coating composition. In an embodiment, the nano-composite material comprises a surface strength improvement agent in a coating composition, as measured by IGT pick test results. In an embodiment, the nano-composite material comprises a blister resistance improvement agent in a coating composition, as measured by IGT blister test results. In an embodiment, the nano-composite material comprises an appearance improvement agent. In an embodiment, the nano-composite material comprises a surface smoothness improvement agent in a coating composition, as measured by Parker Print Smoothness testing. In an embodiment, the said nano-composite material comprises a whiteness ("L" value) improvement agent in a coating composition. In an embodiment, the nano-composite material comprises a green shade ("a" value) improvement agent in a coating composition. In an embodiment the nano-composite material comprises a blue-white shade improvement agent in a coating composition. In an embodiment, the nano-composite material comprises a surface finish agent, in a coating composition, whereby a low gloss matte finish may be provided in a coated sheet. In an embodiment, the nano-composite material comprises a caliper enhancing constituent in a coating composition, wherein a coated sheet of increased caliper is provided.

In various embodiments, an exemplary coating composition may be provided by using the combination of a novel nano-material (SAS & FCA) and a selected synthetic calcium silicate hydrate. In an embodiment, an exemplary selected synthetic calcium silicate hydrate includes aragonite.

Coating Application

After the coating formulations were made, a coating was then applied to a substrate/base in one of several methods. These methods included air knife, rod, blade, and other coating methods. In the lab, a lab rod coater (RK Control Coater) was used. After the coating is applied based on the end-user's requirements, the coated sample was dried, generally using a heated drum (Regal-Arkay ST-22). After the coating was dried, the resulting coated sample was examined for defects or gaps in the coating.

Testing of Coated Material

When a sample coating passed initial examination as just noted above, it was then tested for the following properties:
(1) Brightness;
(2) L—Value;
(3) a—Value;
(4) b—Value;
(5) Gloss;
(6) Opacity (if applicable);
(7) Scattering Power;
(8) Absorption Power;
(9) Smoothness/Roughness;
(10) Appearance (APT, DAV 1, DAV 2, DMM);
(11) IGT Pick;
(12) IGT Blister; and
(13) Caliper.

Coating of Unbleached Board

A coating operation was conducted at a laboratory in Tacoma, Wash. The pigment slurries were dispersed using a Silverson disperser then screened through a 100 mesh screen. Coating binders were added to the pigment slurry, first a soybean based protein followed by a latex, and the coating formulation was blended with a Silverson low shear mixer. The coatings were applied to the paperboard using a RK rod coater and dried in a drum dryer having a Teflon coated, non-stick surface (Regal Arkey ST-22). Coatings were applied over a range of coat weights and then soft nip calendared. The test data for each coating condition, including the lab control, were plotted as a function of coat weight and normalized to a target coat weight for comparison.

Example 5: Unbleached Board Coating, Top Coat Only

For Example 5, an unbleached Kraft paperboard having a production base coating was as a substrate on which a top coating was applied in the laboratory. The $TiO_2$ range for the top coat control was in the 15 parts to 20 parts range per 100 parts of total dry pigment (by weight), which included calcined clay and #1 coating clay, with soybean based protein and SB Latex as binder. In this case study, 25%, 50%, and 75% of the TiO$_2$ was replaced with a nano-composite (SAS & FCA) material in the coating formulation. The coating formulation is given below in Table 24.

TABLE 24

Coating Formulation for Top Coat

| Material/Order of Addition | Dry Parts (By Weight) | | | |
|---|---|---|---|---|
| | Control | 25% Nano-Composite | 50% Nano-Composite | 75% Nano-Composite |
| #1 High Brightness Coating Clay | 64 | 64 | 64 | 64 |
| TiO$_2$ | 20 | 15 | 10 | 5 |
| Calcined Clay | 16 | 16 | 16 | 16 |
| Nano-Composite SAS & FCA | 0 | 5 | 10 | 15 |
| Total Pigment | 100 | 100 | 100 | 100 |
| Soybean Based Protein | 5 | 5 | 5 | 5 |
| SB Latex | 15 | 15 | 15 | 15 |
| Total Binder | 20 | 20 | 20 | 20 |
| Total Pigment + Binder | 120 | 120 | 120 | 120 |

Figure 36:
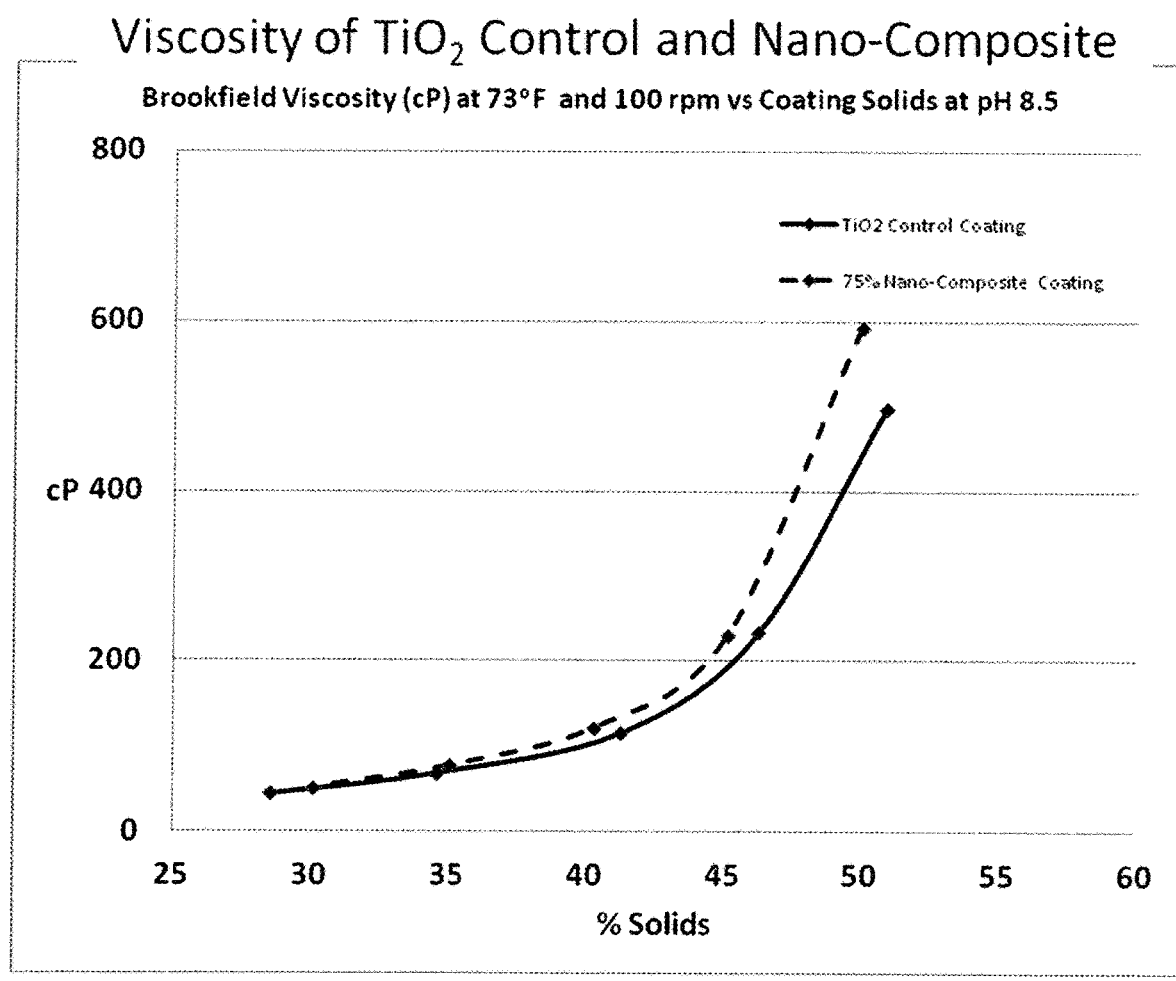
FIG. 36 is a graph illustrating an example where substitution of a novel nano-composite material (SAS & FCA) as described herein for a major portion (e.g., 75%) of the conventionally utilized titanium dioxide ($TiO_2$) has the effect of increasing a viscosity of the coating formulation.

The high surface area, high aspect ratio, and low bulk density of prior art materials similar to the tested nano-composite (SAS & FCA) generally results in a high binder demand, high viscosity, higher immobilization time, and low pick strength. However, it was surprising to find just the opposite results with respect to the tested nano-composite (SAS & FCA) material. One of the unique characteristics of the nano-composite (SAS & FCA) material described herein was that it performed equal or better than the TiO$_2$ containing control formulation. FIG. 36 is a plot of Brookfield viscosity over a solids range of 30% to 50% for both the TiO$_2$ control and the use of the nano-composite (SAS & FCA) based coating, and shows that in the 40% to 45% solids range, where an air knife coater would most likely operate, we see that the viscosities are nearly identical. Thus, it is anticipated that such a coating composition including the novel nano-composite (SAS & FCA) may be utilized as a drop-in substitution in some coating applications.

Figure 37:
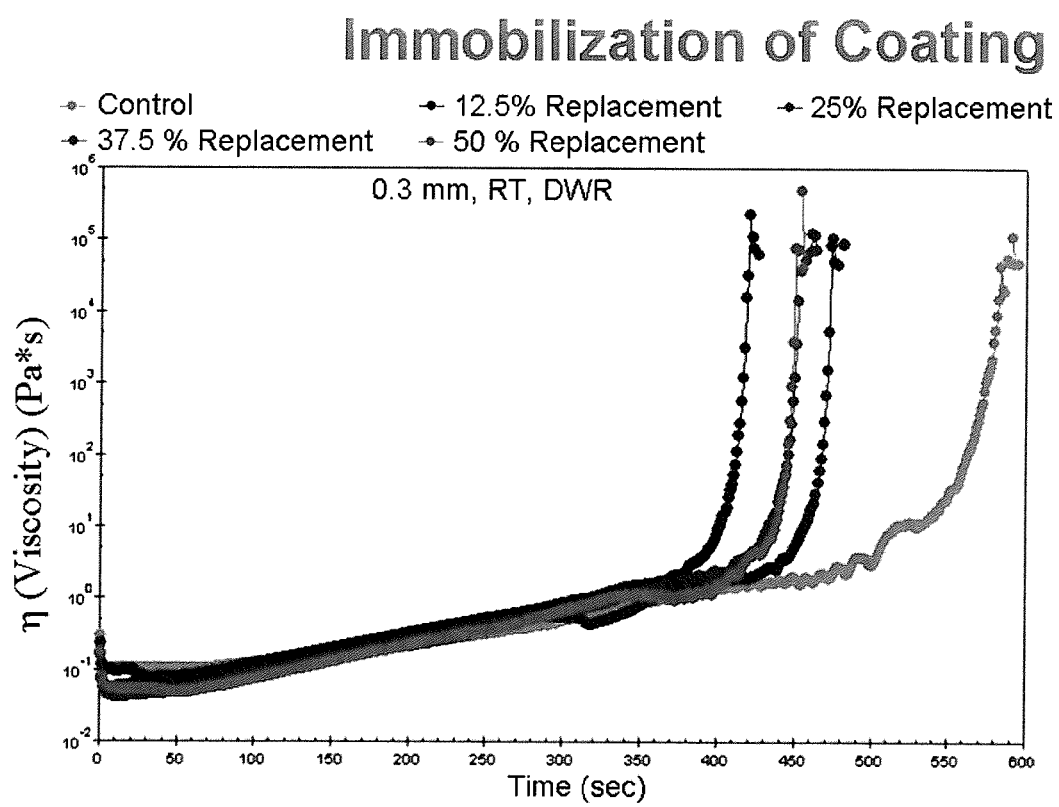
FIG. 37 is a graph illustrating various examples where the use of a novel nano-composite material (SAS & FCA) is described in substitution for various portions (e.g., 12.5%, 25%, 37.5%, and 50%) of conventionally utilized titanium dioxide (TiO$_2$) in coating formulations, showing the effect on immobilization of the coating's pigments; note that as tested and illustrated, the shorter the time elapsed until peak viscosity, the better the immobilization of pigments in the coating, in accord with a dynamic water retention (DWR) test as is known to those of skill in the art in the paper industry.

Coating immobilization study results are shown in FIG. 37. The tests were performed using a Dynamic Water Retention (DWR) device. FIG. 37 shows how long it takes for the coating to immobilize. There is a distinguishable difference between the control coating with TiO$_2$ and the nano-composite (SAS & FCA) based coatings. The data shows that the nano-composite (SAS & FCA) based coatings have a much faster immobilization rate as compared to the control TiO$_2$ coatings.

The coated sheets were soft-nip calendared to a target Parker Print Smoothness of 3.0 (PPS 10S). The calendared sheets were then tested as per the protocol described above. The test results are given in Table 25. Then the test data was plotted as a function of coat weight and normalized to a target coat weight of 17 to 19 grams per square meter for comparison.

Figure 38:
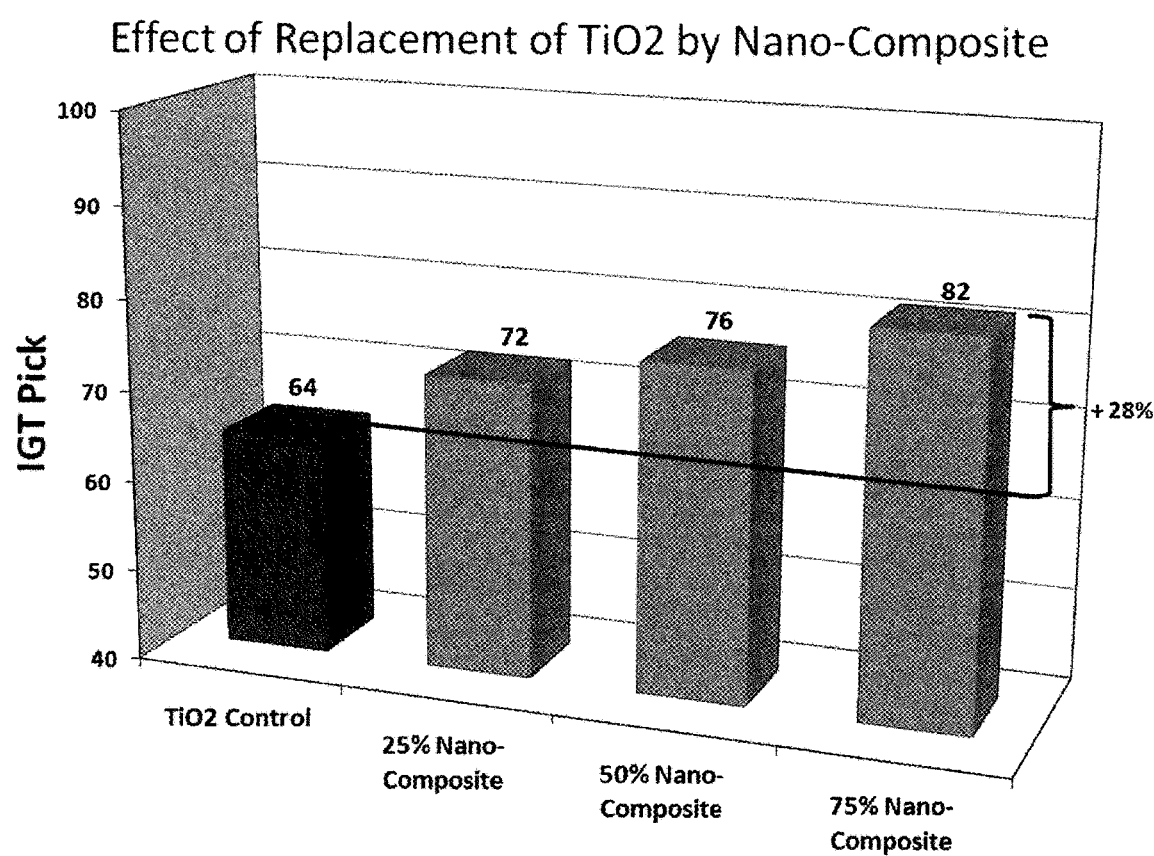
FIG. 38 is a graphical representation of the effect on IGT pick test results (see ISO 3783 or TAPPI Standard 514, or a web site explanation shown at http://www.appliedpapertech.com/igt.html), when conventionally utilized titanium dioxide (TiO$_2$) is replaced (at 25%, 50%, and 75% replacement levels) by a novel nano-composite material (SAS & FCA) as described herein, in unbleached top coat formulations used on a calendared unbleached board paper product.
Figure 39:
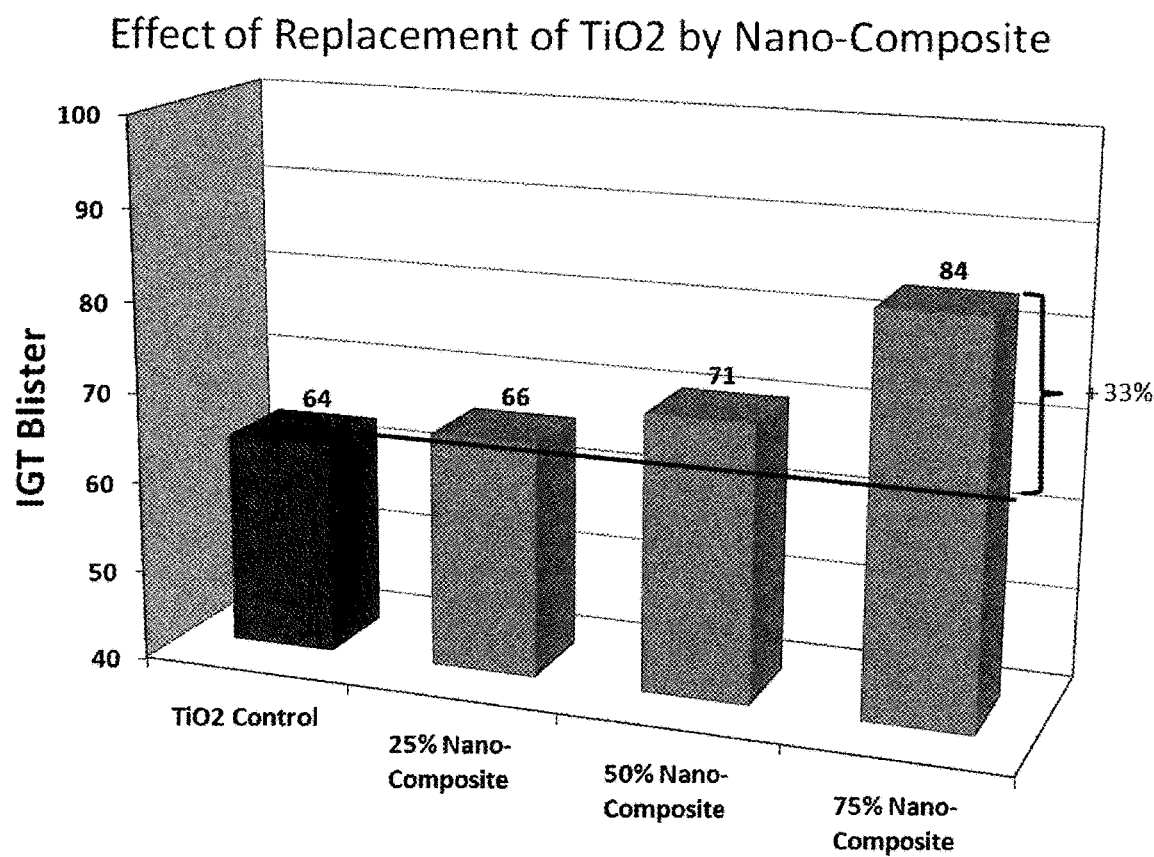
FIG. 39 is a graphical representation of the effect on IGT blister test results, when conventionally utilized titanium dioxide (TiO$_2$) is replaced (at 25%, 50%, and 75% replacement levels) by a novel nano-composite material (SAS & FCA) as described herein, in an unbleached top coat formulation used on a calendared unbleached board paper product.

The IGT Pick strength and IGT Blister, shown in FIGS. 38 and 39, respectively, show the coating strength for the nano-composite (SAS & FCA) is significantly better (28% and 33% respectively) than the TiO$_2$ control. It is believed silanol bonding sites may play a role in this strength improvement, which could potentially translate into a lower binder demand.

Figure 40:
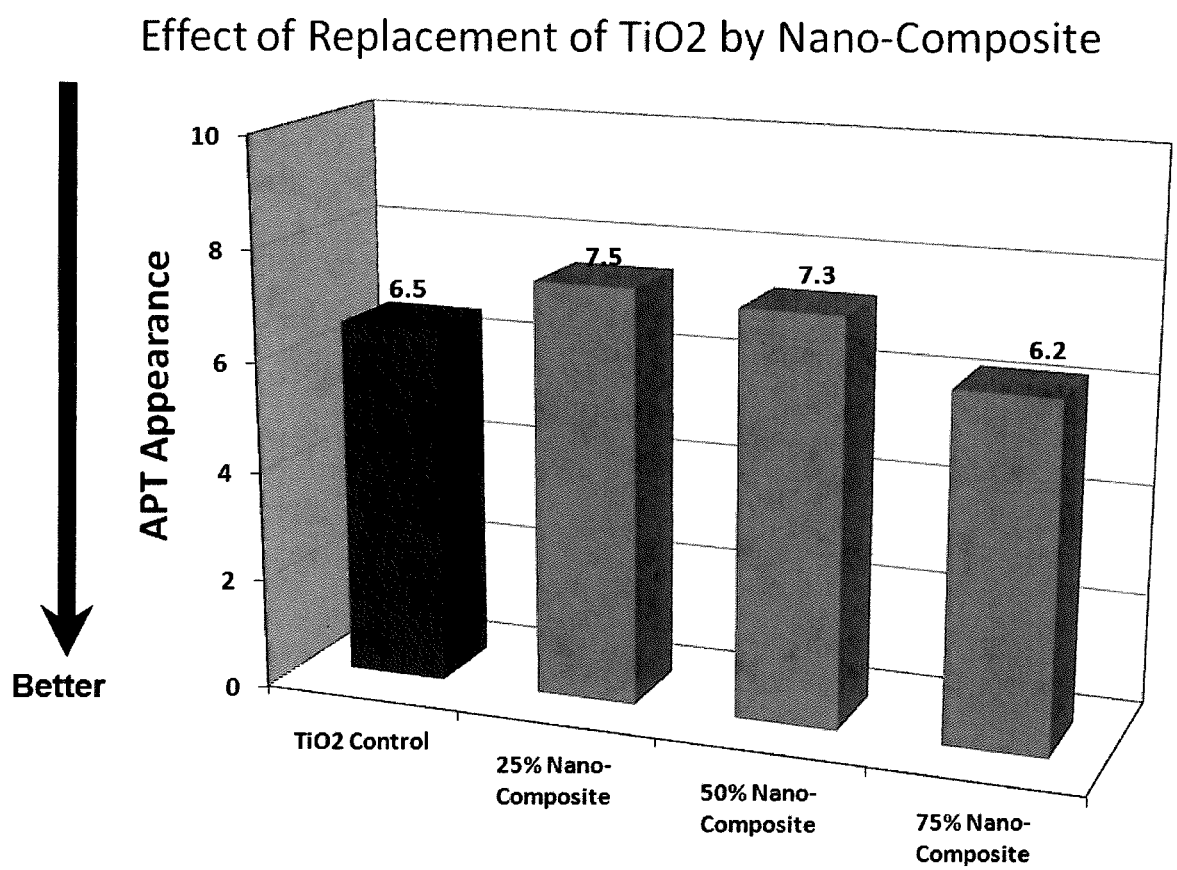
FIG. 40 is a graphical representation of the effect on the APT appearance test results, when conventionally utilized titanium dioxide (TiO$_2$) is replaced (at 25%, 50%, and 75% replacement levels) by a novel nano-composite material (SAS & FCA) as described herein, in unbleached top coat formulations used on a calendared unbleached board paper product; note that a smaller APT appearance test result number indicates a more uniform appearance, which is desirable on calendared unbleached board.

The APT Appearance test, shown in FIG. 40, shows that the nano-composite (SAS & FCA) based coating coverage is comparable to the TiO$_2$ control.

Figure 41:
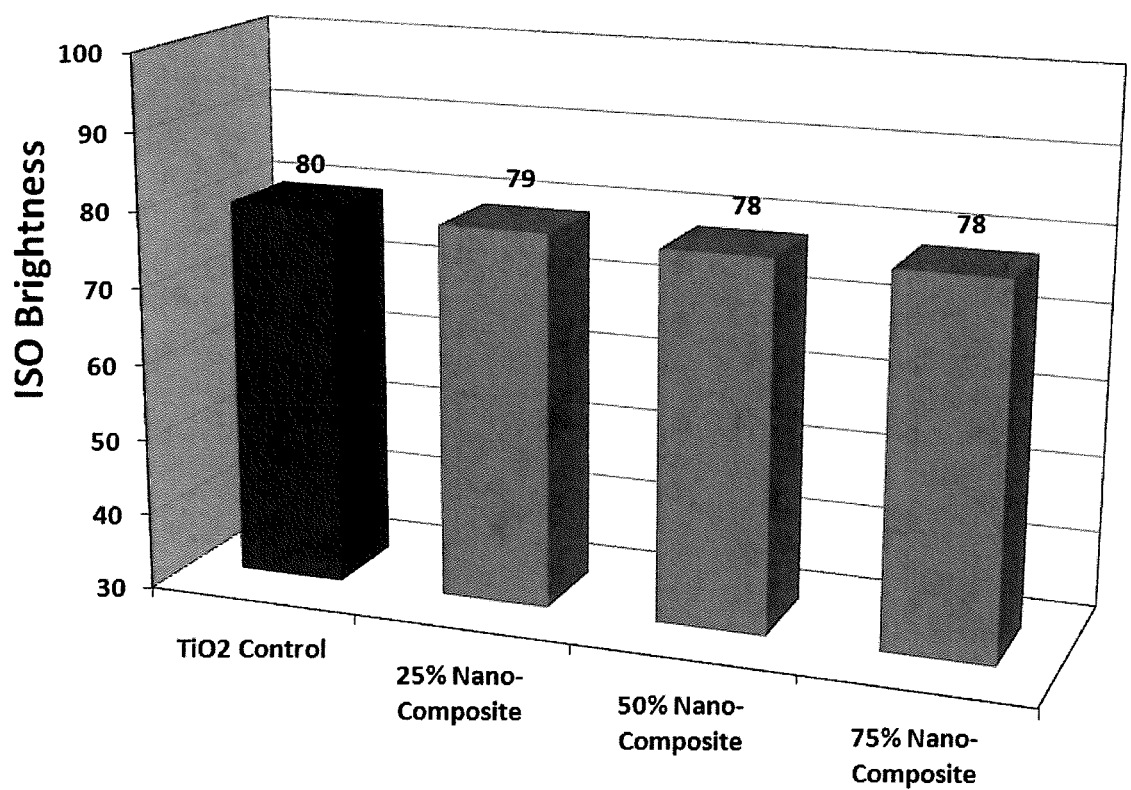
FIG. 41 is a graphical representation of the effect on ISO Brightness test results, when conventionally utilized titanium dioxide (TiO$_2$) is replaced (at 25%, 50%, and 75% replacement levels) by a novel nano-composite material (SAS & FCA) as described herein, in unbleached top coat formulations used on a calendared unbleached board paper product.

The ISO Brightness of the nano-composite (SAS & FCA) based coating was several points lower than the TiO$_2$ control, as indicated in FIG. 41. However, such characteristics do offer an advantage for reducing dye costs where dye-back methods are sometimes used to improve appearance.

Figure 42:
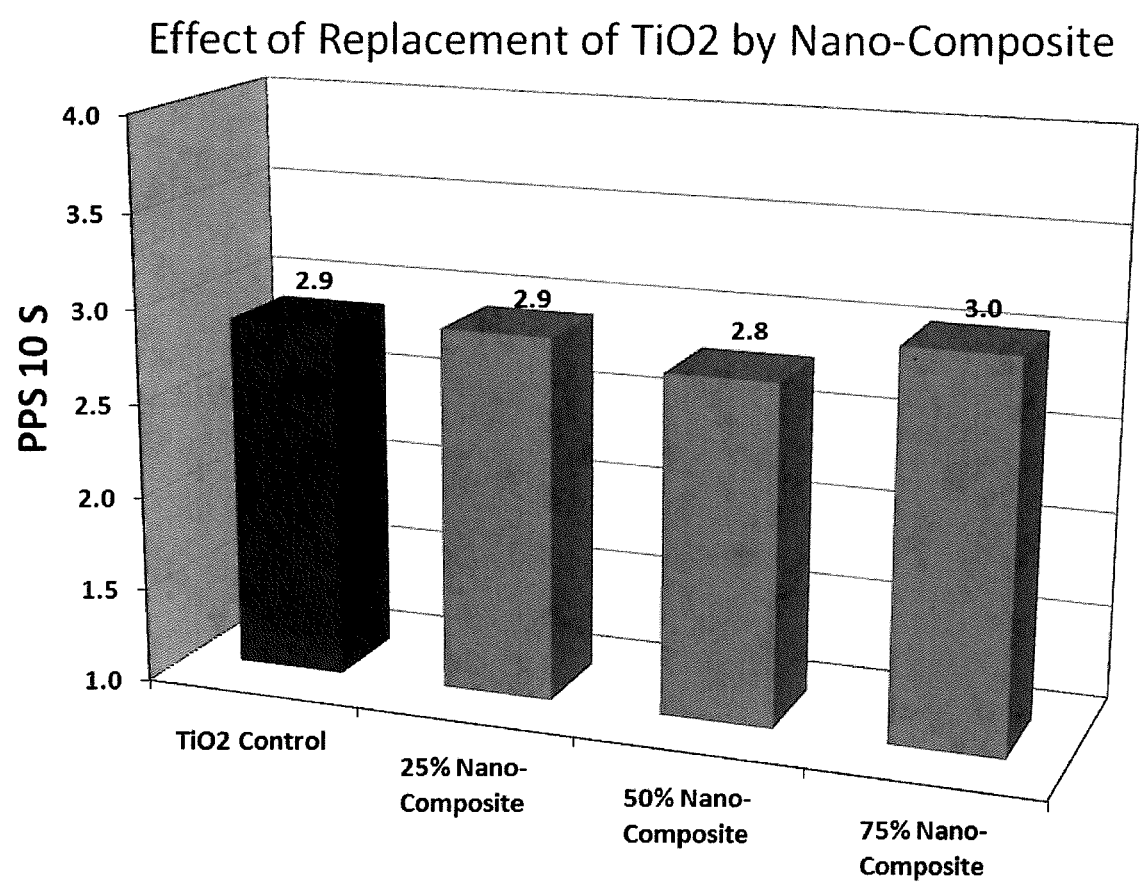
FIG. 42 is a graphical representation of the effect on Parker Print Roughness test results (at 10S), when conventionally utilized titanium dioxide (TiO$_2$) is replaced (at 25%, 50%, and 75% replacement levels) by a novel nano-composite material (SAS & FCA) as described herein, in unbleached top coat formulations used on a calendared unbleached board paper product.

Parker Print Smoothness (10S) showed comparable results (FIG. 42).

Figure 43:
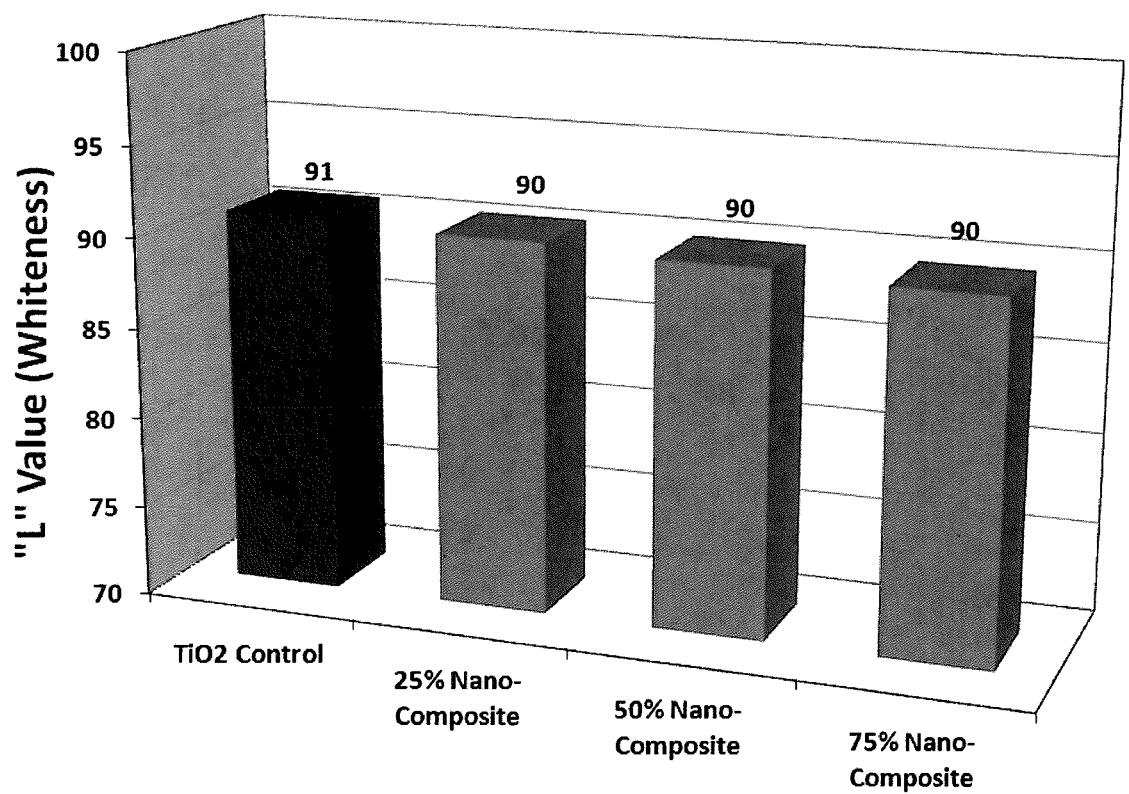
FIG. 43 is a graphical representation of the effect on Hunter "L" or Whiteness test results, when conventionally utilized titanium dioxide (TiO$_2$) is replaced (at 25%, 50%, and 75% replacement levels) by a novel nano-composite material (SAS & FCA) as described herein, in unbleached top coat formulations used on a calendared unbleached board paper product.

The "L" value (whiteness) showed a slight drop with the addition of the nano-composite (see FIG. 43).

Figure 44:
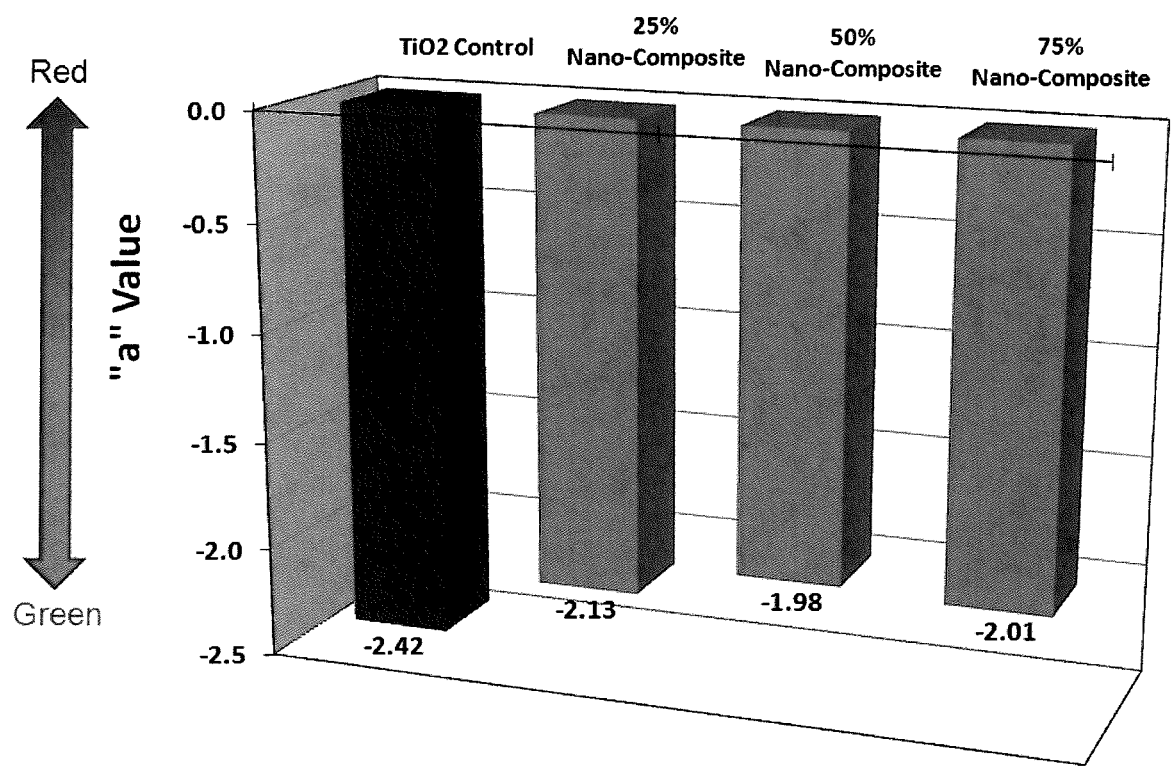
FIG. 44 is a graphical representation of the effect on Hunter "a" or "red-green" test results, when conventionally utilized titanium dioxide (TiO$_2$) is replaced (at 25%, 50%, and 75% replacement levels) by a novel nano-composite material (SAS & FCA) as described herein, in unbleached top coat formulations used on a calendared unbleached board paper product; note that a positive value indicates a reddish color, while a negative value indicates a more desirable greenish color.

The "a" value (red-green color balance) showed a slight shift of the coating color to the red (see FIG. 44).

Figure 45:
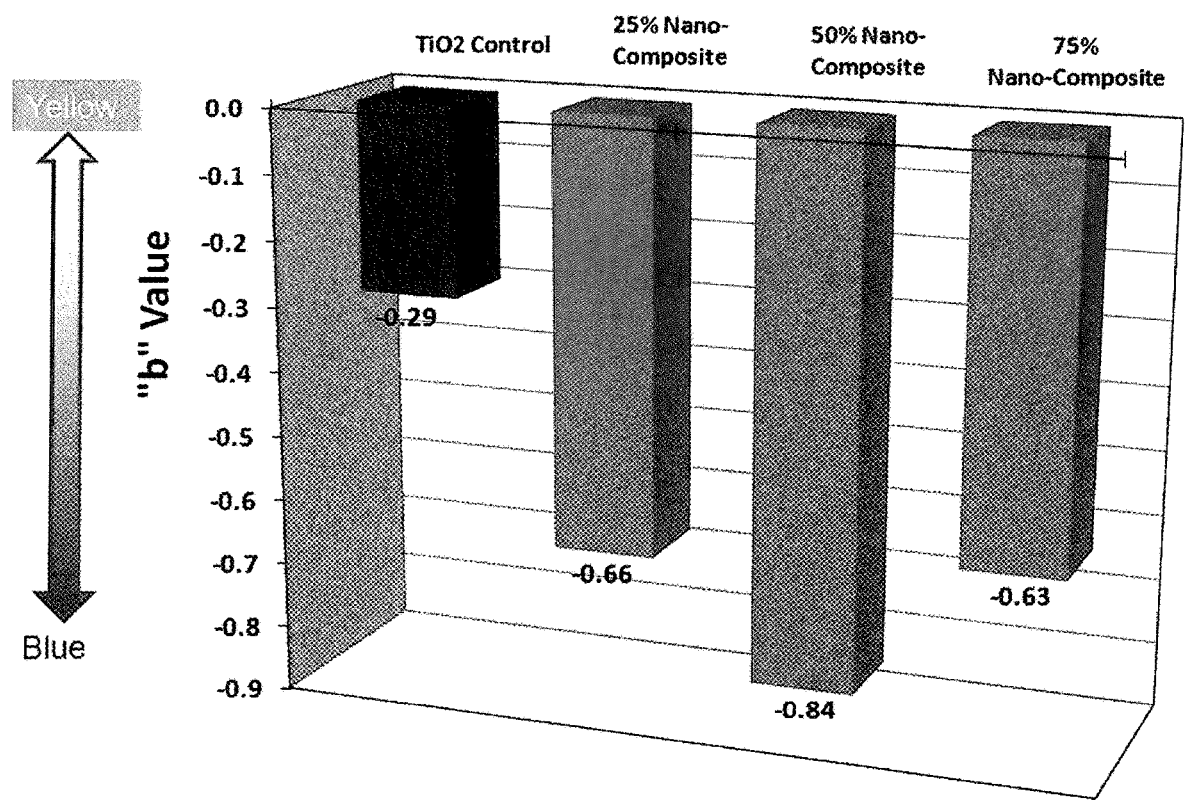
FIG. 45 is a graphical representation of the effect on Hunter "b" or "yellow-blue" test results, when conventionally utilized titanium dioxide (TiO$_2$) is replaced (at 25%, 50%, and 75% replacement levels) by a novel nano-composite material (SAS & FCA) as described herein, in unbleached top coat formulations used on a calendared unbleached board paper product; note that a positive value indicates a yellowish color, while a negative value indicates a more desirable blue-white color.

The "b" value (yellow-blue color balance) showed a significant shift to a blue-white shade (see FIG. 45).

TABLE 25

Coating Performance - For Top Coat

| | Control | 25% Nano-Composite | 50% Nano-Composite | 75% Nano-Composite |
|---|---|---|---|---|
| ISO Brightness | 79.71 | 78.90 | 78.20 | 78.11 |
| % Difference from Control | | −1.0% | −1.9% | −2.0% |
| MD Gloss | 27.6 | 23.3 | 21.5 | 20.7 |
| % Difference from Control | | −15.5% | −21.9% | −25.0% |
| CD Gloss | 26.9 | 23.1 | 21.1 | 20.1 |
| % Difference from Control | | −14.3% | −21.5% | −25.5% |
| L Value | 90.87 | 90.50 | 90.10 | 89.71 |
| % Difference from Control | | −0.4% | −0.8% | −1.3% |
| a Value | −2.42 | −2.13 | −1.98 | −2.01 |
| % Difference from Control | | −12.1% | −18.0% | −17.0% |
| b Value | −0.29 | −0.66 | −0.84 | −0.63 |
| % Difference from Control | | −37.3% | 188.4% | 115.3% |
| IGT Pick | 64.2 | 72.4 | 76.1 | 81.6 |
| % Difference from Control | | 12.9% | 18.5% | 27.2% |
| IGT Blister | 63.7 | 66.1 | 70.7 | 83.9 |
| % Difference from Control | | 3.8% | 10.9% | 31.7% |
| AGT Appearance | 6.51 | 7.51 | 7.32 | 6.23 |
| % Difference from Control | | −15.4% | −12.5% | 4.2% |
| PPS Roughness | 2.9 | 2.9 | 2.8 | 3.0 |
| % Difference from Control | | −1.4% | 3.1% | −5.0% |
| Caliper | 14.4 | 14.6 | 14.6 | 14.6 |
| % Difference from Control | | 1.1% | 1.1% | 1.4% |
| Bulk | 1.31 | 1.31 | 1.30 | 1.32 |
| % Difference from Control | | −0.4% | −1.0% | 0.7% |

Figure 46:
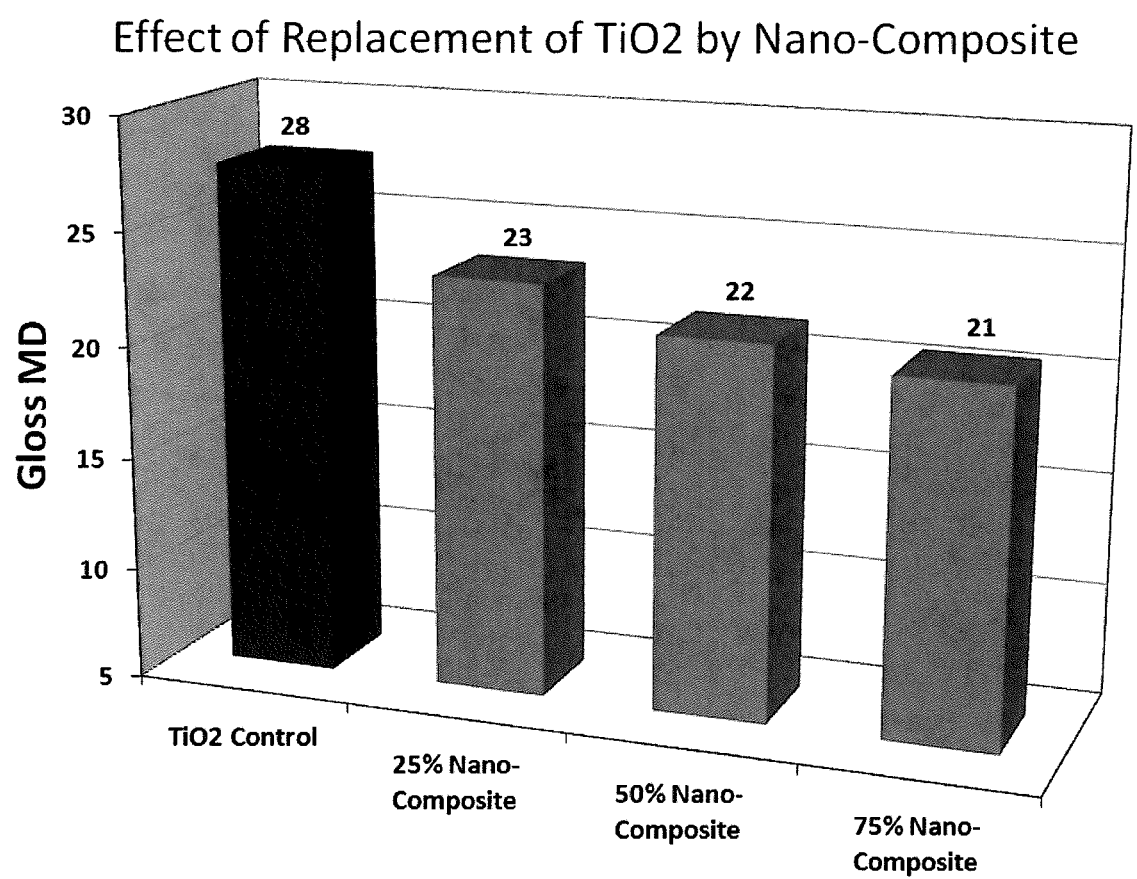
FIG. 46 is a graphical representation of the effect on gloss test results, in the machine direction ("MD") when conventionally utilized titanium dioxide (TiO$_2$) is replaced (at 25%, 50%, and 75% replacement levels) by a novel nano-composite material (SAS & FCA) as described herein, in unbleached top coat formulations used on a calendared unbleached board paper product.
Figure 47:
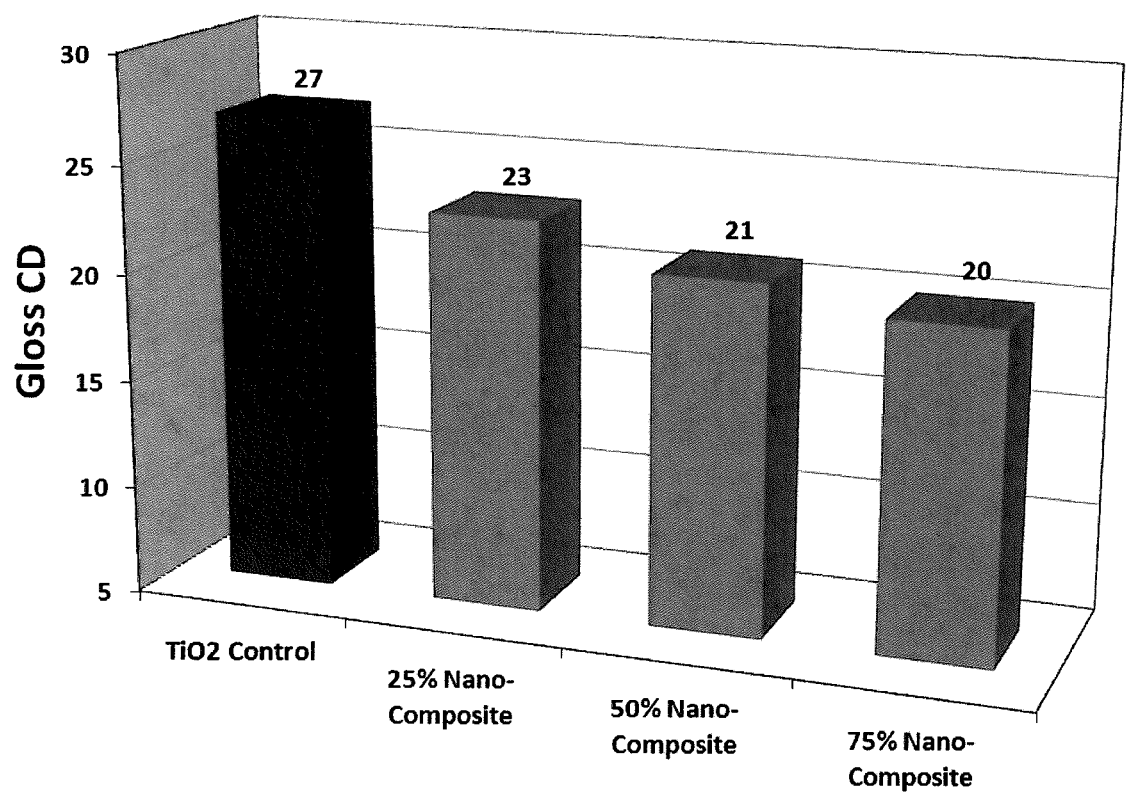
FIG. 47 is a graphical representation of the effect on gloss test results in the cross direction ("CD") when conventionally utilized titanium dioxide (TiO$_2$) is replaced (at 25%, 50%, and 75% replacement levels) by a novel nano-composite material (SAS & FCA) as described herein, in unbleached top coat formulations used on a calendared unbleached board paper product.

The gloss of the sheets coated with the nano-composite (SAS & FCA) based coating showed a shift towards a matte finish in both the machine direction (MD) and cross direction (CD), as seen in FIGS. 46 and 47, respectively.

Figure 48:
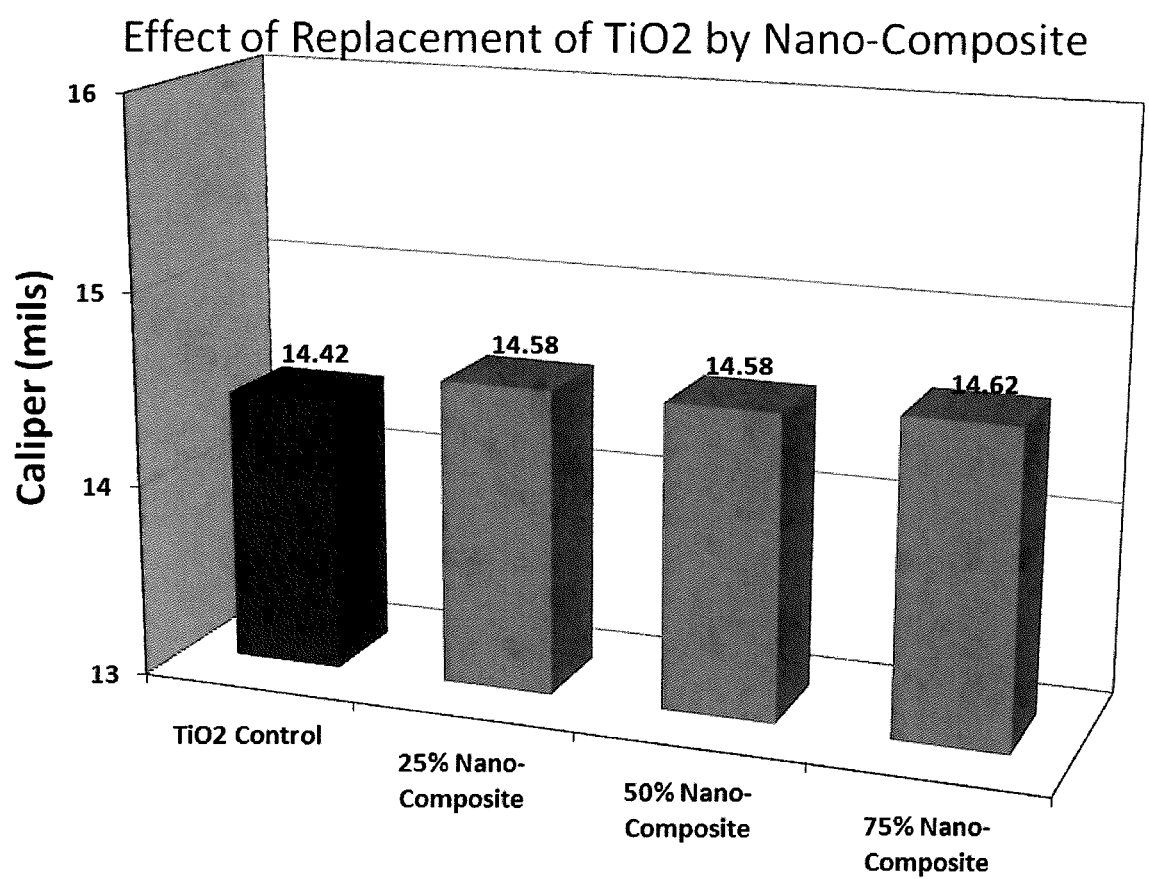
FIG. 48 is a graphical representation of the effect on the caliper of a sample paper product, when conventionally utilized titanium dioxide (TiO$_2$) is replaced (at 25%, 50%, and 75% replacement levels) by a novel nano-composite material (SAS & FCA) as described herein, in unbleached top coat formulations used on a calendared unbleached board paper product.

The addition of the nano-composite (SAS & FCA) in the coating formulation did increase the caliper, as shown in FIG. 48. Coated paperboard samples were sent to Nancy Plowman Associates for print testing to understand the potential print performance of the various nano-composite (SAS & FCA) based coatings as compared to the TiO$_2$ control. For the print tests performed, the print results, Table 26, indicated the nano-composite (SAS & FCA) based coating was comparable to the TiO$_2$ control.

TABLE 26

Print Testing Results

| Sample | TiO$_2$ Control | 75% Nano-Composite (SAS & FCA) |
|---|---|---|
| P&I Slope (g/cm/sec) | 23.7-25.9 | 18.6-19.5 |
| Pass to Fail | 6 | 6 |
| % Transfer | 94 | 94 |
| % Wet Pick | 0 | 5 |
| Mottle Rating | 5 | 5 |

The criteria for the above noted tests are given below:

Slope: The higher the slope the faster the coated surface can remove the thin oils from an ink.

Pass to Fail: Four passes or less indicates possible picking on an offset press.

% Transfer: A higher percentage means better fountain solution absorption. 60%+ is excellent.

% Wet Pick: A wet pick of <25% is excellent.

Mottle Rating: This test by itself does not predict mottle on press. It only shows absorption uniformity and a value of 1=excellent and 5=poor.

Example 6—Unbleached Kraft Paper Board—Base Coating and Top Coating

Example 6 used an unbleached Kraft paperboard, which was base coated with a 75/25 blend of aragonite S-PCC and nano-composite (SAS & FCA). Together, these two components completely replaced the #2 clay that had been utilized in the base coating control formulation. The base coat weight target was 14 to 16 grams per square meter. The top coating was a 65/35 blend of aragonite S-PCC and nano-composite (SAS & FCA) at a top coat weight target of 17 to 20 grams per square meter. Both base coatings used the same blend of soybean based protein and SB latex. Both top coatings used the same blend of soybean based protein and SB latex. Finally, the coated sheets were soft-nip calendared to a target Parker Print Smoothness (PPS 10S) of 3.0.

TABLE 27

Coating Formulations for Unbleached Kraft Paperboard

| | Base Coating: Dry Parts (weight) | | Top Coating: Dry Parts (weight) | |
|---|---|---|---|---|
| Coating/Order of Addition | Control | 100% Replacement | Control | 100% Replacement |
| #2 Coating Clay | 100 | 0 | NA | NA |
| Aragonite S-PCC | 0 | 75 | 0 | 63 |
| Nano-Composite (SAS & FCA) | 0 | 25 | 0 | 37 |
| #1 High Brightness Coating Clay | NA | NA | 64 | 0 |
| TiO2 | NA | NA | 20 | 0 |
| Calcined Clay | NA | NA | 16 | 0 |
| Total Pigment | 100 | 100 | 100 | 100 |
| Soybean Based Protein | 3 | 3 | 5 | 5 |
| SB Latex | 14 | 14 | 15 | 15 |
| Total Binder | 17 | 17 | 20 | 20 |
| Total Pigment + Binder | 117 | 117 | 120 | 120 |

TABLE 28

Coating Performance Results Unbleached Kraft Paperboard

| | Control | 100% Replacement |
|---|---|---|
| ISO Brightness | 79.71 | 82.96 |
| % Difference from Control | | 4.1% |
| L Value | 90.87 | 88.56 |
| % Difference from Control | | −2.5% |
| a Value | −2.42 | −0.16 |
| % Difference from Control | | −93.4% |
| b Value | −0.29 | −0.59 |
| % Difference from Control | | 101.6% |
| IGT Pick | 64.2 | 111.0 |
| % Difference from Control | | 73.0% |
| IGT Blister | 63.7 | 92.0 |
| % Difference from Control | | 44.4% |
| AGT Appearance | 6.51 | 8.16 |
| % Difference from Control | | 25.4% |

Figure 49:
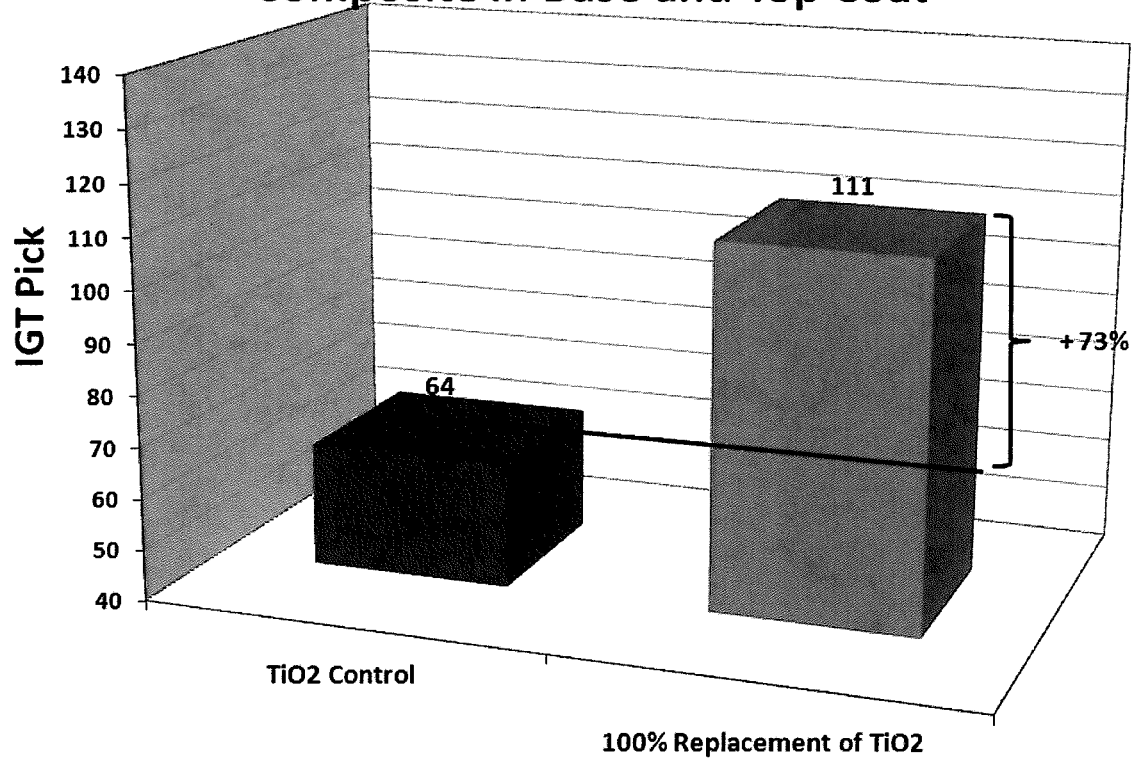
FIG. 49 is a graphical representation of the effect on IGT Pick test results when all of the conventionally utilized titanium dioxide (TiO$_2$) and coating clays are replaced (i.e., 100% replacement level) by a blend of (a) novel nano-composite material (SAS & FCA) as described herein and (b) an aragonite phase form of Super Precipitated Calcium Carbonate ("S-PCC" as further described herein below, and also see Table 27), in unbleached base and top coat formulations used on a calendared unbleached board paper product.
Figure 50:
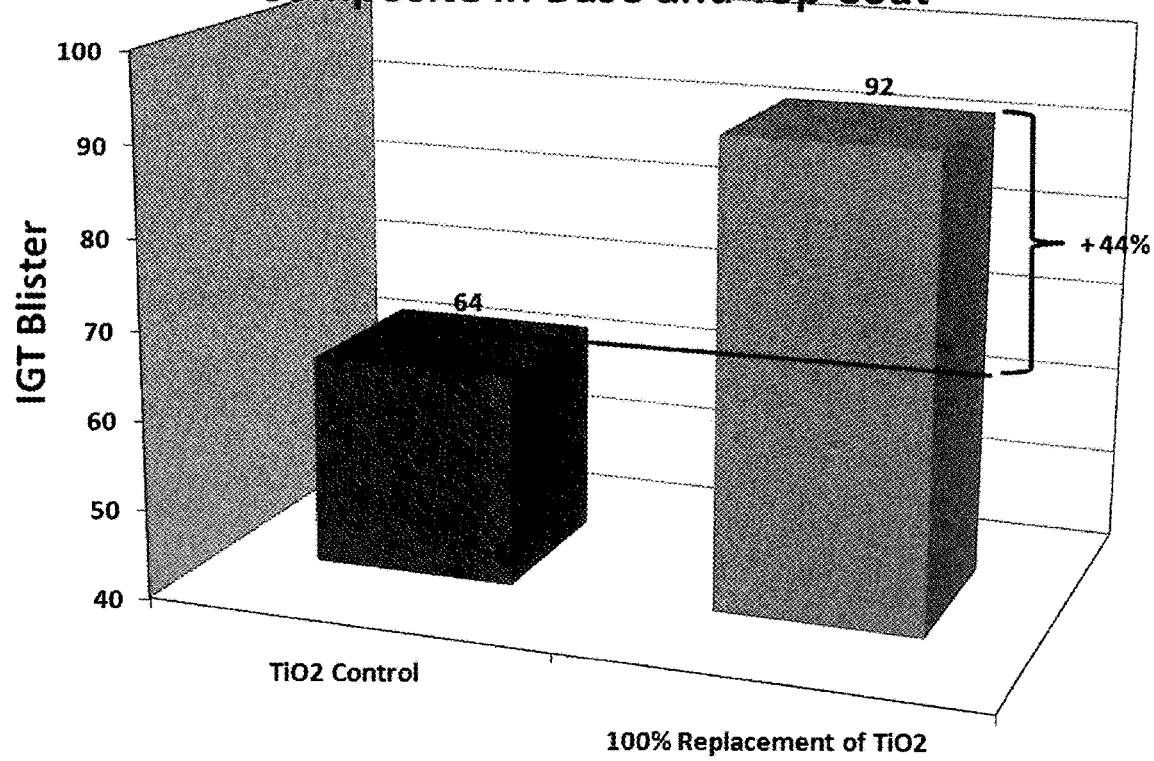
FIG. 50 is a graphical representation of the effect on IGT Blister Test results, when all of the conventionally utilized titanium dioxide (TiO$_2$) and coating clays are replaced (i.e., 100% replacement level) by a blend of (a) novel nano-composite material (SAS & FCA) as described herein and (b) by aragonite Super Precipitated Calcium Carbonate ("S-PCC"), in unbleached base and top coat formulations used on a calendared unbleached board paper product; also see Table 27.

Findings:

IGT Pick strength and IGT Blister resistance, as indicated in FIGS. 49 and 50, respectively, showed a significant improvement (73% and 44% respectively) for the coating composition utilizing (1) aragonite super precipitated calcium carbonate (S-PCC) and (2) nano-composite (SAS & FCA) based coating, over the control coating. The nano-composite (SAS & FCA) structures, as indicated in the photomicrograph illustrated in FIGS. 2 and 6, may retain a hollow macrosphere structure sized and shaped similar to the size and shape of a synthetic calcium silicate hydrate used as a raw material. For example, compare FIGS. 2 and 6 (nano-composite (SAS & FCA) with the structures seen in selected substrate calcium silicate hydrates that may be utilized as substrates for the production of nano-composite (SAS & FCA), as indicated in FIG. 12, 14, 16, or 18. In any event, the surface strength improvement offers an opportunity to reduce binder demand, when the novel coating formulations including nano-composite (SAS & FCA) materials are utilized.

Figure 51:
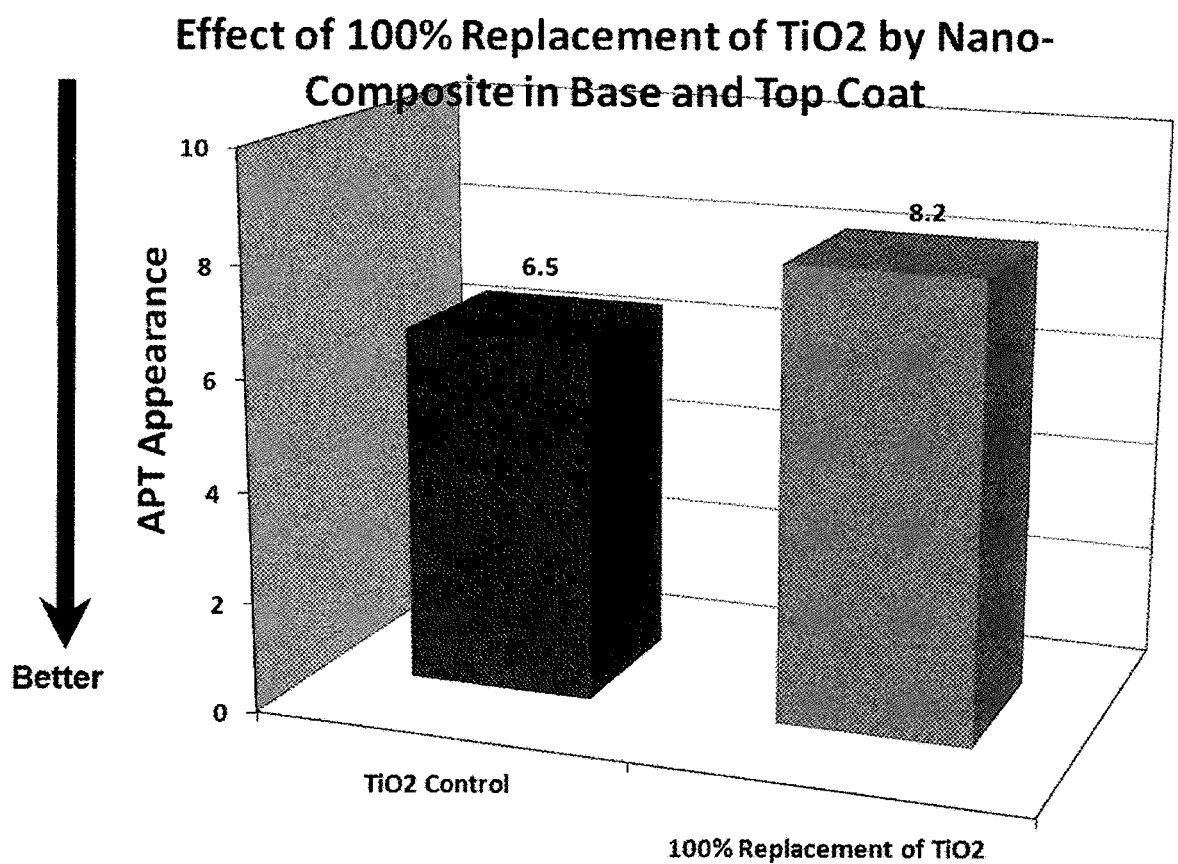
FIG. 51 is a graphical representation of the effect on APT Appearance test results, when all of the conventionally utilized titanium dioxide (TiO$_2$) and coating clays are replaced (i.e., 100% replacement level) by a blend of (a) novel nano-composite material (SAS & FCA) as described herein and (b) by aragonite Super Precipitated Calcium Carbonate ("S-PCC"), in unbleached base and top coat formulations used on a calendared unbleached board paper product; see Table 27.
Figure 52:
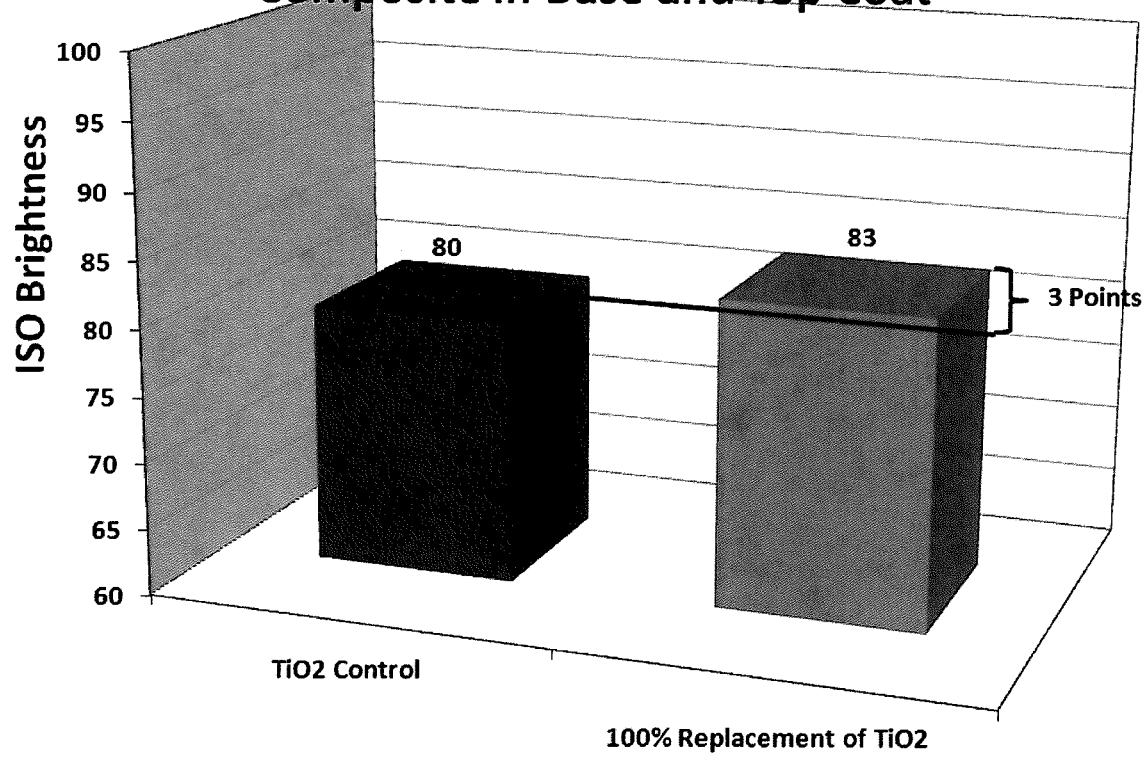
FIG. 52 is a graphical representation of the effect on ISO Brightness test results, when all of the conventionally utilized titanium dioxide (TiO$_2$) and coating clays are replaced (i.e., 100% replacement level) by a blend of (a) novel nano-composite material (SAS & FCA) as described herein and (b) aragonite Super Precipitated Calcium Carbonate ("S-PCC"), in unbleached base and top coat formulations used on a calendared unbleached board paper product; also see Table 27.

The APT Appearance was slightly better for the control, as noted in FIG. 51. However, the ISO Brightness showed a distinct improvement, when 100% of the TiO$_2$ was replaced by the nano-composite (SAS & FCA), as indicated in FIG. 52.

Figure 53:
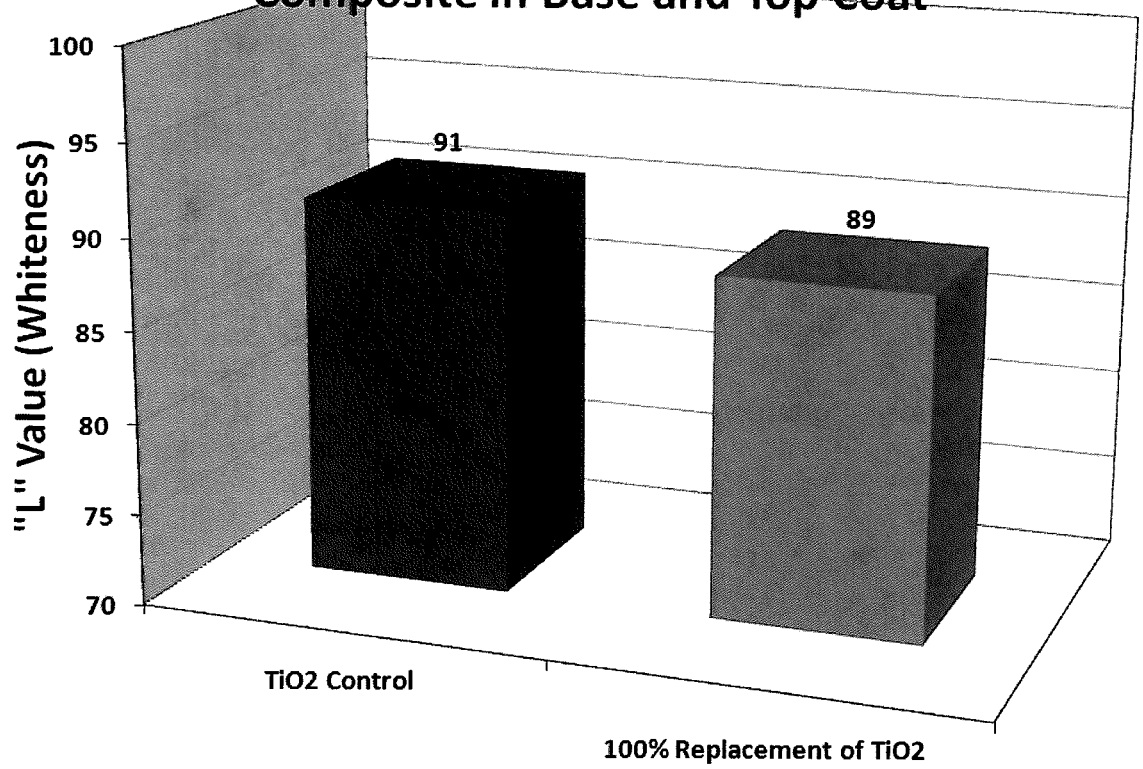
FIG. 53 is a graphical representation of the effect on Hunter "L" Value Whiteness test results, when all of the conventionally utilized titanium dioxide (TiO$_2$) and coating clays are replaced (i.e., 100% replacement level) by a blend of (a) novel nano-composite material (SAS & FCA) as described herein, and (b) aragonite Super Precipitated Calcium Carbonate ("S-PCC"), in unbleached base and top coat formulations used on a calendared unbleached board paper product; see Table 27.

The "L" value (whiteness) showed a slight drop when 100% of the TiO$_2$ was replaced with nano-composite (SAS & FCA); see FIG. 53.

Figure 54:
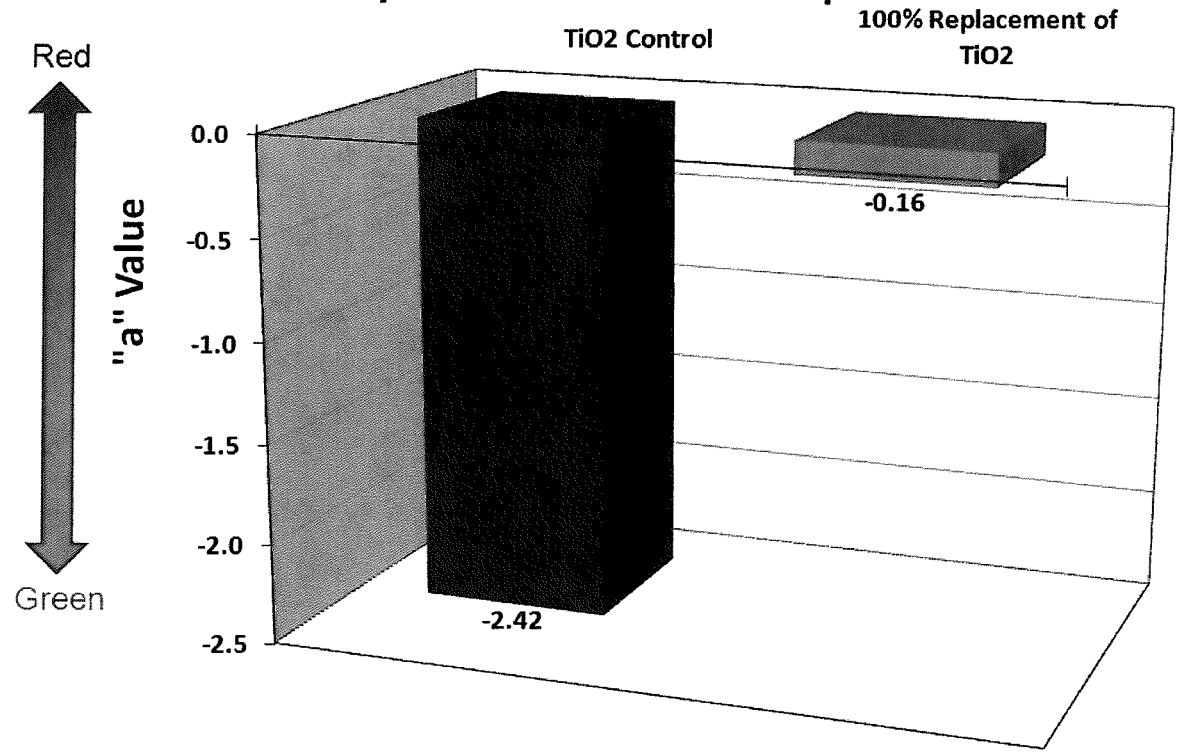
FIG. 54 is a graphical representation of the effect on Hunter "a" Value or "red-green" test results, when all of the conventionally utilized titanium dioxide (TiO$_2$) and coating clays are replaced (i.e., 100% replacement level) by a blend of (a) novel nano-composite material (SAS & FCA) as described herein, and (b) by pressure carbonated aragonite (Super Precipitated Calcium Carbonate, or "S-PCC"), in unbleached base and top coat formulations used on a calendared unbleached board paper product; note that a positive value indicates a reddish color, while a negative value indicates a more desirable greenish color; also see Table 27.

The "a" value (red-green color balance) showed a shift of the coating color to the red when 100% of the TiO$_2$ was replaced with nano-composite (SAS & FCA); see FIG. 54.

Figure 55:
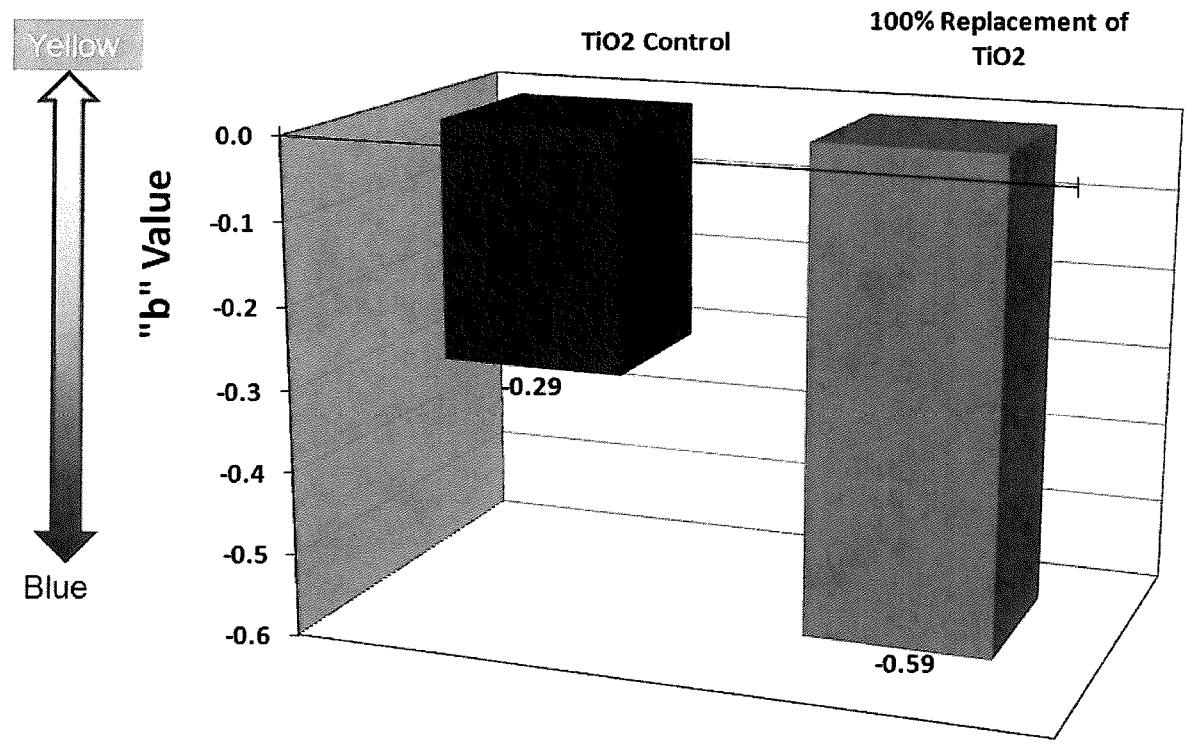
FIG. 55 is a graphical representation of the effect on Hunter "b" or "yellow-blue" test results, when all of the conventionally utilized titanium dioxide (TiO$_2$) and coating clays are replaced (i.e., 100% replacement level) by a blend of (a) novel nano-composite material (SAS & FCA) as described herein and (b) aragonite S-PCC, in unbleached base and top coat formulations used on a calendared unbleached board paper product; note that a positive value indicates a yellowish color, while a negative value indicates a more desirable blue-white color; also see Table 27.

The "b" value (yellow-blue color balance) showed a significant shift to a blue-white shade when 100% of the TiO$_2$ was replaced with nano-composite (SAS & FCA); see FIG. 55.

Coating of Label Stock

Example 7—Label Stock Paper Coating—High Basis Weight Single Coat

In this example, a bleached, uncoated, wood-free sheet with a basis weight of 70 grams per square meter was used. As shown in Table 29, the control coating was made up of 64 dry parts (by weight) of #1 high brightness clay (supplied by Theile), 8 parts (by weight) calcined clay (also supplied by Theile), and 24 parts (by weight) Ground Calcium Carbonate (supplied by OMYA). The remaining 4 parts (by weight) of the coating was made up of $TiO_2$ (supplied by DuPont). Novel coating formulations that were tested were identified as "condition 1", or as "condition 2", or as "condition 3". In various embodiments, coating formulations included pigments that contained mostly the novel nano-composite structured amorphous silica (SAS) and nano fibrous crystalline aragonite calcium carbonate (FCA). In various embodiments, some of the coating compositions also included calcium silicate hydrate (foshagite CSH from GR Nano Materials, Tacoma, Wash., USA) (3 parts) and Aragonite S-PCC (from GR Nano Materials, Tacoma, Wash., USA) (3 parts); all parts are by weight. Binder in the form of 15.5 parts of SBIR Latex was added with constant stirring to a coating formulation mixture in some embodiments. In various embodiments, the coating formulation slurry was thoroughly mixed in a Silverson unit for 5 minutes. The thoroughly mixed coating formulations were screened through a screen of selected size, normally through a 100 mesh screen, to provide a finished coating composition ready for use. Thus 100% of the TiO2 (only 4 parts) was replaced by GR Nano Materials pigments with 6 parts (by weight) of GR Nano Materials products, which alternately was by (1) a mixture of calcium silicate hydrate (foshagite CSH) and nano-composite (SAS & FCA), or (2) by a mixture of calcium silicate hydrate (foshagite CSH) and aragonite S-PCC, or (3) by calcium silicate hydrate (foshagite CSH) alone.

Table 29 shows the blend procedure and composition utilized for the coating formulations utilized in the embodiments set out in this example. The actual coating and drying of the samples was carried out the same as described above. As per the testing profile, the coated sheets were tested for TAPPI Opacity, ISO Opacity as well as scattering coefficient and absorption coefficient (see Table 30).

TABLE 29

Coating Formulations - for High Basis Weight Label Stock

| | Dry Parts (by weight) | | | |
|---|---|---|---|---|
| Material/Order of Addition | Control | Condition 1 | Condition 2 | Condition 3 |
| #1 High Brightness Coating Clay | 64.0 | 62.0 | 62.0 | 62.0 |
| Calcined Clay | 8.0 | 8.0 | 8.0 | 8.0 |
| Ground Calcium Carbonate | 24.0 | 24.0 | 24.0 | 24.0 |
| $TiO_2$ | 4.0 | 0.0 | 0.0 | 0.0 |
| Calcium Silicate Hydrate (CSH) Foshagite | 0.0 | 3.0 | 3.0 | 6.0 |
| Nano-Composite (SAS & FCA) | 0.0 | 3.0 | 0.0 | 0.0 |
| Aragonite S-PCC | 0.0 | 0.0 | 3.0 | 0.0 |
| Total Pigment | 100.0 | 100.0 | 100.0 | 100.0 |
| Latex | 15.5 | 15.5 | 15.5 | 15.5 |
| Total Binder | 15.5 | 15.5 | 15.5 | 15.5 |
| Total Pigment + Binder | 115.5 | 115.5 | 115.5 | 115.5 |

TABLE 30

Coating Formulation Performance - High Basis Weight Label Stock

| | Control | Condition 1 | Condition 2 | Condition 3 |
|---|---|---|---|---|
| TAPPI Opacity | 86.8 | 86.5 | 86.7 | 86.6 |
| % Difference from Control | | −0.4% | −0.2% | −0.3% |
| ISO Opacity | 88.8 | 88.3 | 88.4 | 88.2 |
| % Difference from Control | | −0.6% | −0.5% | −0.7% |
| Scattering Coefficient | 704.3 | 696.4 | 701.4 | 687.9 |
| % Difference from Control | | −1.1% | −0.4% | −2.3% |
| Absorption Coefficient | 3.6 | 3.2 | 3.2 | 3.3 |
| % Difference from Control | | −11.2% | −10.8% | −9.5% |

Figure 56:
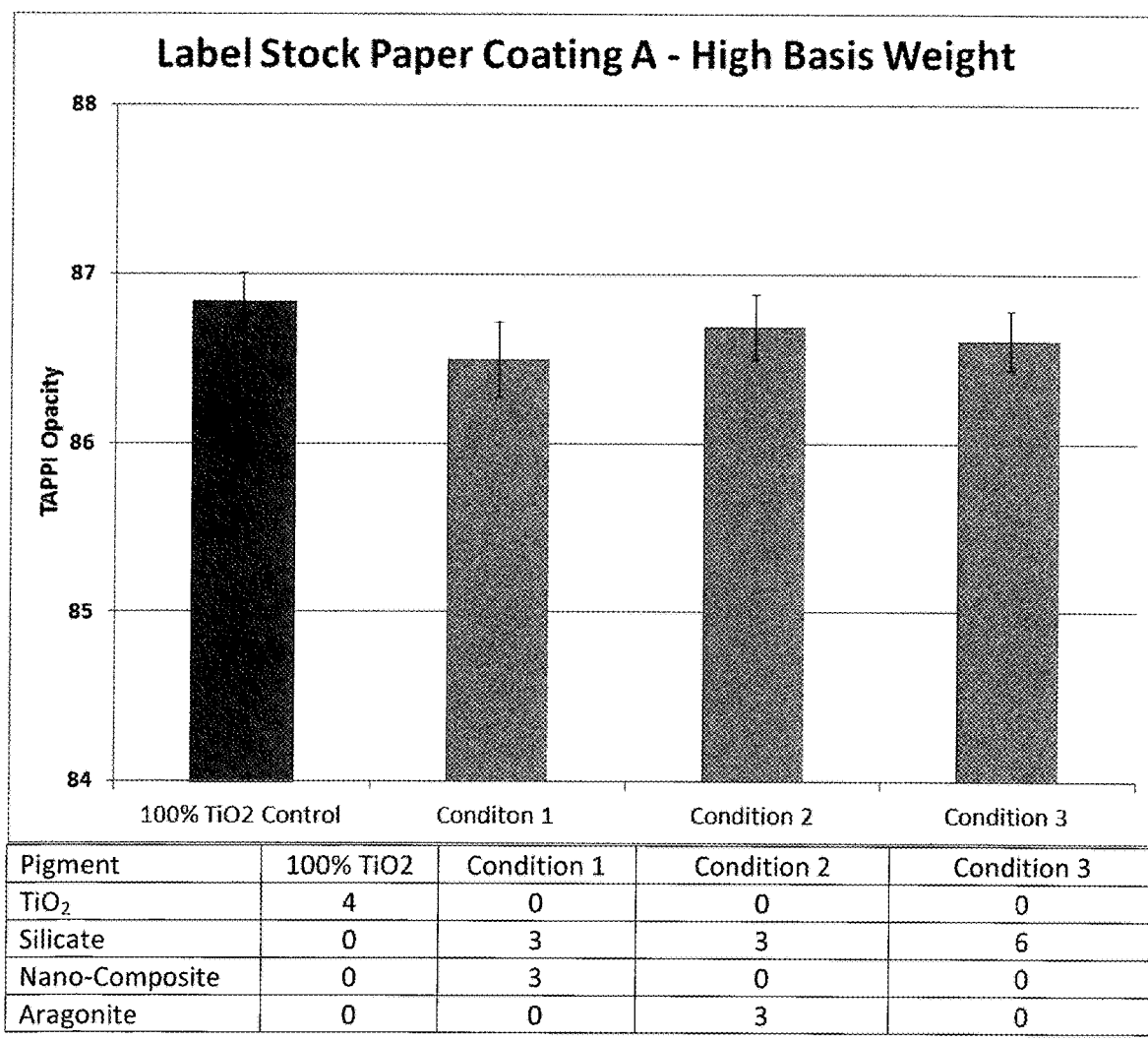
FIG. 56 is a graphical representation of the effect on TAPPI Opacity test results when all of the conventionally utilized titanium dioxide (TiO$_2$) in a coating used on high basis weight label stock is replaced (i.e., 100% replacement level), (a) by a novel nano-composite material (SAS & FCA) as described herein in combination with another calcium silicate hydrate product (condition 1), or (b) by a calcium silicate hydrate and aragonite (condition 2), or (c) by a calcium silicate hydrate alone (condition 3).
Figure 57:
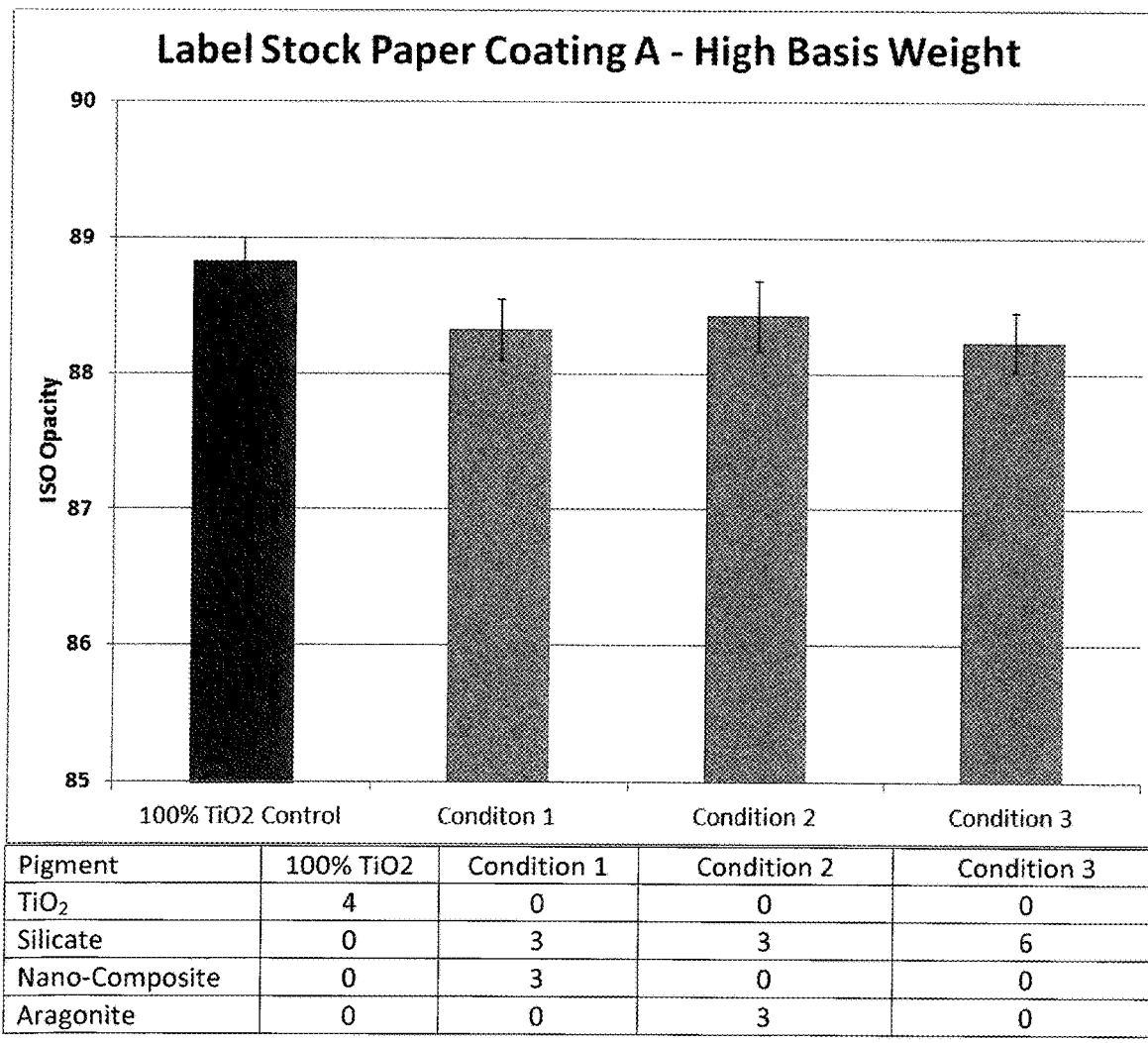
FIG. 57 is a graphical representation of the effect on ISO Opacity test results when all of the conventionally utilized titanium dioxide (TiO$_2$) in a coating used for high basis weight label stock is replaced (i.e., 100% replacement level), (a) by a novel nano-composite material (SAS & FCA) as described herein in combination with another calcium silicate hydrate product (condition 1), or (b) by a calcium silicate hydrate and aragonite (condition 2), or (c) by a calcium silicate hydrate alone (condition 3).

Findings:

One finding was that it appears that 100% of the titanium dioxide ($TiO_2$) in such coating formulations can be replaced, either by a combination of the nano-composite (SAS & FCA) with a calcium silicate hydrate (CSH) (condition 1), or by a calcium silicate hydrate (CSH) alone (condition 3), or by a combination of calcium silicate hydrate and aragonite S-PCC (condition 2). See Tables 29 and 30. Also, FIGS. 56 and 57 show the results of TAPPI Opacity and ISO Opacity, respectively, for the high basis weight label stock coated paper samples.

Example 8—Label Stock, Low Basis Weight, High $TiO_2$ Coating

The coating formulation utilized in Example 8 was generally prepared as set forth in Example 7. However, the label stock paper had a basis weight of 67 grams per square meter of paper. Also, the amounts utilized for the different coating pigments were changed, as shown in Table 31. The making of the coating and the testing of the sheets was generally the same as set forth in Example 7. Table 32 shows the results of opacity testing.

TABLE 31

Coating Formulations - for Low Basis Weight Label Stock

| | Dry Parts (by weight) | | | |
|---|---|---|---|---|
| Material/Order of Addition | Control | Condition 1 | Condition 2 | Condition 3 |
| #1 High Brightness Coating Clay | 50.0 | 44.0 | 44.0 | 44.0 |
| Calcined Clay | 10.0 | 10.0 | 10.0 | 10.0 |
| Ground Calcium Carbonate | 28.0 | 28.0 | 28.0 | 0.0 |
| TiO2 | 12.0 | 0.0 | 6.0 | 6.0 |
| Calcium Silicate Hydrate (CSH) - Foshagite | 0.0 | 9.0 | 6.0 | 12.0 |
| Nano-Composite (SAS & FCA) | 0.0 | 9.0 | 0.0 | 0.0 |
| Aragonite S-PCC | 0.0 | 0.0 | 6.0 | 28.0 |
| Total Pigment | 100.0 | 100.0 | 100.0 | 100.0 |
| Latex | 16.5 | 16.5 | 16.5 | 16.5 |
| Total Binder | 16.5 | 16.5 | 16.5 | 16.5 |
| Total Pigment + Binder | 116.5 | 116.5 | 116.5 | 116.5 |

TABLE 32

Coating Performance - Low Basis Weight Label Stock

|  | Control | Condition 1 | Condition 2 | Condition 3 |
|---|---|---|---|---|
| TAPPI Opacity | 87.9 | 86.6 | 86.9 | 87.8 |
| % Difference from Control |  | −1.5% | −1.1% | −0.1% |
| ISO Opacity | 89.5 | 88.6 | 88.5 | 89.3 |
| % Difference from Control |  | −1.0% | −1.2% | −0.3% |
| Scattering Coefficient | 797.7 | 731.1 | 651.5 | 694.0 |
| % Difference from Control |  | −8.3% | −18.3% | −13.0% |
| Absorption Coefficient | 4.9 | 5.1 | 4.4 | 4.4 |
| % Difference from Control |  | 4.3% | −10.6% | −9.4% |

Figure 58:
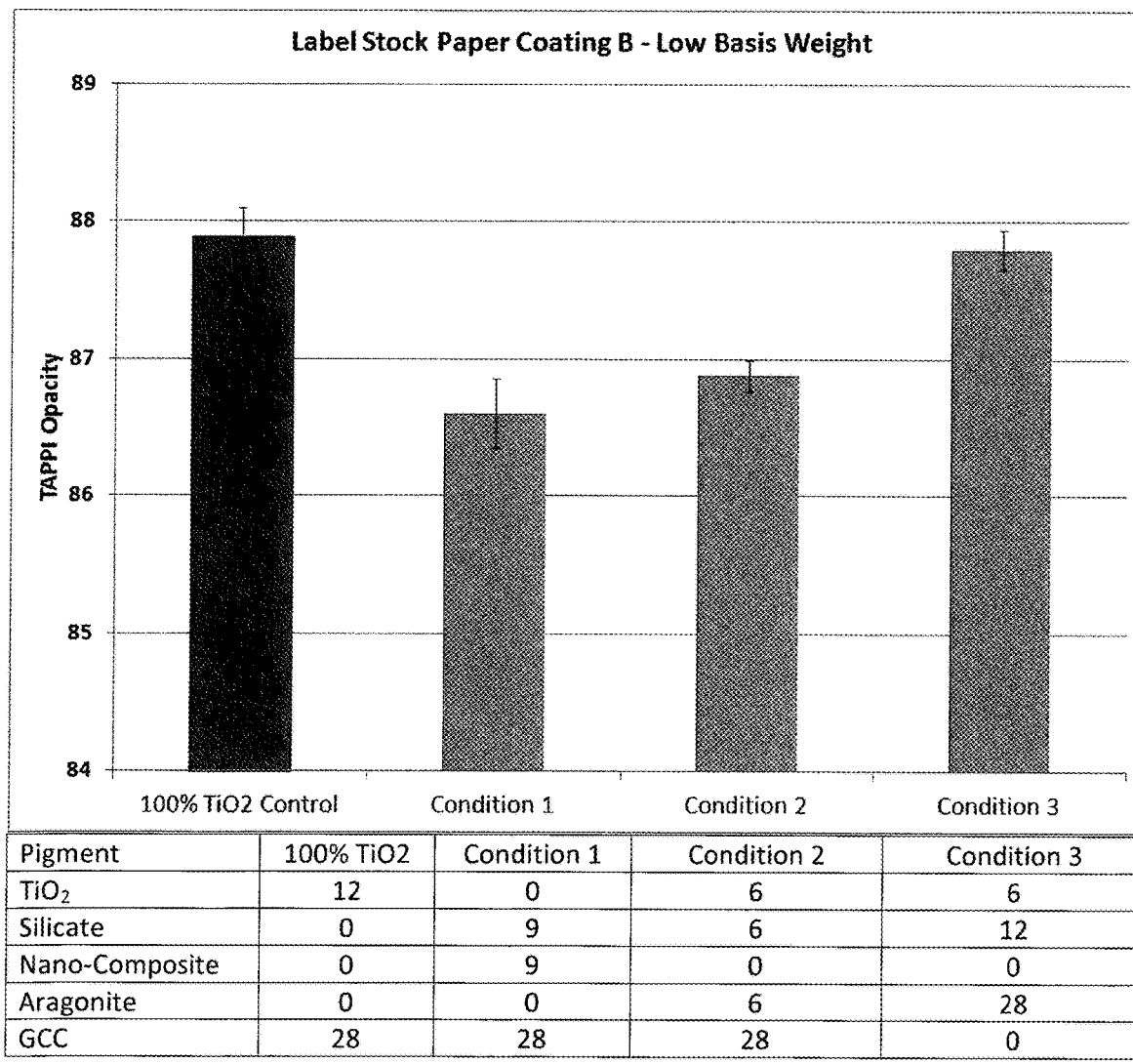
FIG. 58 is a graphical representation of the effect on TAPPI Opacity test results with respect to coating formulations used on low basis weight label stock, when the total amount of conventionally utilized titanium dioxide (TiO$_2$) in a coating used for low basis weight label stock is partially or totally replaced, (a) by the combination of (1) a novel nano-composite (SAS & FCA) as described herein with (2) a calcium silicate hydrate and (3) ground calcium carbonate (GCC)—with no titanium dioxide used—(condition 1), or (b) by using only 50% of the usual titanium dioxide in combination with a calcium silicate hydrate, aragonite, and ground calcium carbonate (condition 2); or (c) by using only 50% of the usual titanium dioxide in combination with a calcium silicate hydrate and aragonite (condition 3).
Figure 59:
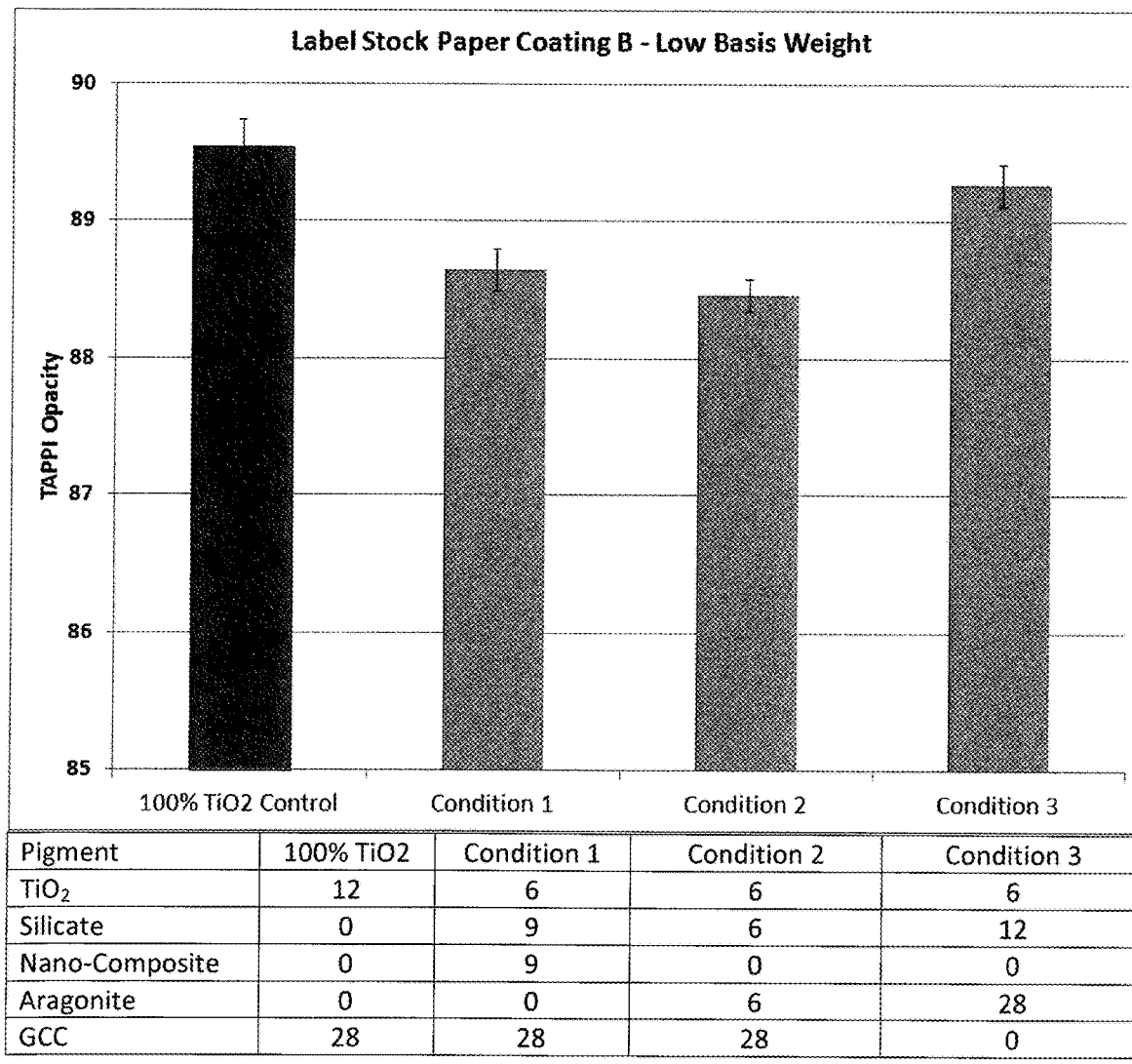
FIG. 59 is a graphical representation of the effect on TAPPI Opacity test results with respect to coating formulations used on low basis weight label stock, when some of the conventionally utilized titanium dioxide (TiO$_2$) in a coating used for low basis weight label stock is replaced (a) by using only 50% of the usual titanium dioxide in combination with a calcium silicate hydrate, a novel nano-composite (SAS & FCA) as described herein, and ground calcium carbonate (condition 1), or (b) by using only 50% of the usual titanium dioxide in combination with a calcium silicate hydrate, aragonite, and ground calcium carbonate (condition 2), or (c) by using only 50% of the usual titanium dioxide in combination with a calcium silicate hydrate and aragonite (condition 3).

Findings:

As seen in FIG. 59 (see also Tables 31 and 32), one finding was that in an embodiment, 50% of the titanium dioxide ($TiO_2$) may be replaced by the combination of 12.0 parts (by weight) of a foshagite calcium silicate hydrate (CSH) and aragonite (S-PCC). FIGS. 58 and 59 show the results of TAPPI Opacity and ISO Opacity, respectively. While the use of the combination of nano-composite (SAS & FCA) with a foshagite calcium silicate hydrate (CSH) did not yield the desired opacity, the data shows that by replacing the GCC with aragonite S-PCC (see condition 3), it may be possible to replace 50% of the $TiO_2$.

In summary, it can be appreciated that an exemplary coated board, paperboard, or label stock paper may be produced by utilizing novel coating formulations as described above. In an embodiment, a coated, calendared, paperboard may be provided having (a) one or more layers of pulp (which may in an embodiment be kraft pulp, and may, in an embodiment, be unbleached kraft pulp), and (b) a base coating composition. The base coating composition may include a nano-composite material having a fibrous amorphous silica component and a crystalline calcium carbonate component. In an embodiment, the fibrous amorphous silica component may be provided in three-dimensional haystack or globular configuration that presents a fibrous structure having interstitial spaces between amorphous silica fibers with inner layers and outer layers with irregular interlacing amorphous silica fibers or filaments which are fixed in relation to each other. The crystalline calcium carbonate component, may be provided in the form of a crystalline calcium carbonate in the aragonite phase, having needle structures. The aragonite needle structures may arise from the fibrous amorphous silica component. The nano-composite material may have a major axis of length L in the range from about 10 microns to about 40 microns, and a surface area of from about 40 meters squared per gram to about 200 meters squared per gram. The base coating composition may also include clay, either natural or calcined, or both. The base coating composition may include one or more binders as known in the field, such as a selected latex, and/or a selected protein.

In an embodiment, a coated, calendared paperboard as just set forth above may also include a top coating. In an embodiment, the top coating may include a nano-composite material having a fibrous amorphous silica component and a crystalline calcium carbonate component. In an embodiment, the fibrous amorphous silica component may be provided in three-dimensional haystack or globular configuration that presents a fibrous structure having interstitial spaces between amorphous silica fibers with inner layers and outer layers with irregular interlacing amorphous silica fibers or filaments which are fixed in relation to each other. The crystalline calcium carbonate component, may be provided in the form of a crystalline calcium carbonate in the aragonite phase, having needle structures. The aragonite needle structures may arise from the fibrous amorphous silica component. The nano-composite material may have a major axis of length L in the range from about 10 microns to about 40 microns, and a surface area of from about 40 meters squared per gram to about 200 meters squared per gram. The top coating composition may also include clay, either natural or calcined, or both. The base coating composition may include one or more binders as known in the field, such as a selected latex, and/or a selected protein.

In various embodiments, a coated, calendared paperboard as just set forth above may have an IGT Pick of at least 100. In various embodiments, a coated, calendared paperboard as just set forth above may have an IGT Blister of least 92. In various embodiments, a coated, calendared paperboard as just set forth above may have an AGT Appearance of at least 8. In various embodiments, a coated, calendared paperboard as just set forth above may have an ISO Opacity of at least 88.0, In various embodiments, a coated, calendared paperboard as just set forth above may have a Tappi Opacity of at least 86.0. Yet more generally, a paper may be provided have a coating composition as set forth herein. Similarly, a paperboard may be provided have a coating composition as set forth herein. Even more generally, novel compositions of matter are described herein, in the specification, or in the drawing figures, or both. Methods are described for manufacture of such compositions of matter. And, methods for use of such compositions of matter are described.

In the foregoing description, numerous details have been set forth in order to provide a thorough understanding of the disclosed exemplary embodiments for providing novel nano-composite materials. However, certain of the described details may not be required in order to provide useful embodiments, or to practice selected or other disclosed embodiments. Further, the description may include, for descriptive purposes, various relative terms such as approximately, about, surface, adjacent, proximity, near, on, onto, and the like. Such usage should not be construed as limiting. Terms that are relative only to a point of reference are not meant to be interpreted as absolute limitations, but are instead included in the foregoing description to facilitate understanding of the various aspects of the disclosed embodiments. Various items in the apparatus and in the method(s) described herein may have been described as multiple discrete items, in turn, in a manner that is most helpful in understanding such aspects and details. However, the order of description should not be construed as to imply that such items or sequence of operations are necessarily order dependent, or that it is imperative to fully complete one step before starting another. For example, the choice of raw materials utilized may depend on a variety of cost and use factors, and such decisions may be different as regards installation particulars amongst various locales for production, or various end users, or various end use products. Further, certain details of manufacture may not need to be performed in the precise or exact order of presentation herein. And, in different embodiments, one or more items may be performed simultaneously, or eliminated in part or in whole while other items may be added. Also, the reader will note that the phrase "an embodiment" has been used repeatedly. This phrase generally does not refer to the same embodiment; however, it may. Finally, the terms "comprising", "having" and "including" should be considered synonymous, unless the context dictates otherwise.

Various aspects and embodiments described and claimed herein may be modified from those shown without materially departing from the novel teachings and advantages provided by the developments described herein, and may be embodied in other specific forms without departing from the spirit or essential characteristics thereof, Embodiments presented herein are to be considered in all respects as illustrative and not restrictive or limiting. This disclosure is intended to cover methods and compositions described herein, and not only structural equivalents thereof, but also equivalent structures. Modifications and variations are possible in light of the above teachings. Therefore, the protection afforded to the developments described herein should be limited only by the claims set forth herein, and the legal equivalents thereof.

The invention claimed is:

1. A coating composition for coating paper, paperboard, or label stock, said coating composition comprising a water slurry including
    (a) a nano-composite material, said nano-composite material comprising an amorphous silica component, said amorphous silica component provided in three-dimensional haystack or globular configuration that presents a structure having interstitial spaces between amorphous silica structures with inner layers and outer layers with irregular interlacing amorphous silica structures or filaments which are fixed in relation to each other, and a crystalline calcium carbonate component, said crystalline calcium carbonate component comprising nano aragonite needle structures, said nano aragonite needle structures arising from said amorphous silica component, said nano-composite material having a major axis of length L in the range from 10 microns to 40 microns and a surface area of from 40 meters squared per gram to 200 meters squared per gram;
    (b) clay; and
    (c) wherein said coating composition, after mixing, passes through a screen of selected size.

2. The coating composition as set forth in claim 1 wherein said nano aragonite needle structures comprise aragonite crystals having a length of from 1 micron to 10 microns.

3. The coating composition as set forth in claim 2, wherein said nano aragonite crystals have a length of from 3 microns to 5 microns.

4. The coating composition as set forth in claim 1, wherein said nano aragonite needle structures comprise aragonite crystals having a diameter of from 100 nm to 200 nm.

5. The coating composition as set forth in claim 4, wherein said nano aragonite crystals have an aspect ratio of from 50:1 to 100:1.

6. The coating composition as set forth in claim 1, wherein said nano-composite product has a water absorption characteristic in the range of from 100% to 300%.

7. The coating composition as set forth in claim 1, wherein said nano-composite product has a water absorption characteristic of at least 150%.

8. The coating composition as set forth in claim 1, wherein said nano-composite product has an oil absorption characteristic in the range of from 150% to 300%.

9. The coating composition as set forth in claim 1, wherein said nano-composite product has an oil absorption characteristic in the range of from 200% to 250%.

10. The coating composition as set forth in claim 1, wherein said nano-composite product has surface area in the range of from 50 meters squared per gram to 150 meters squared per gram.

11. The coating composition as set forth in claim 1, further comprising synthetic crystalline aragonite.

12. The coating composition as set forth in claim 11, wherein said synthetic crystalline aragonite comprises aragonite formed under pressure.

13. The coating composition as set forth in claim 1, wherein said screen of selected size comprises a 100 mesh screen.

14. The coating composition as set forth in claim 1, wherein said clay comprises calcined clay.

15. The coating composition as set forth in claim 1, wherein said clay comprises natural clay.

16. The coating composition as set forth in claim 1, further comprising ground calcium carbonate.

17. The coating composition as set forth in claim 1, further comprising titanium dioxide.

18. The coating composition as set forth in claim 17, said coating composition having a target brightness, wherein increasing an amount of said nano-composite material in said coating composition allows decrease in the quantity of said titanium dioxide in said coating composition necessary to achieve said target brightness.

19. The coating composition as set forth in claim 18, wherein a specific target brightness is achieved with selected amount of titanium dioxide in the absence of said nano-composite material, and wherein said specific target brightness is alternately achieved by replacement of from 25% to 75% of said selected amount of titanium dioxide by addition of an effective amount of said nano-composite material.

20. The coating composition as set forth in claim 18, wherein a specific target brightness is achieved with selected amount of titanium dioxide in the absence of said nano-composite material, and wherein said specific target brightness is alternately achieved by replacement of 50% said selected amount of titanium dioxide by addition of an effective amount of said nano-composite material.

21. The coating composition as set forth in claim 18, wherein a specific target brightness is achieved with selected amount of titanium dioxide in the absence of said nano-composite material, and wherein said specific target brightness is alternately achieved by replacement of 25% of said selected amount of titanium dioxide by addition of an effective amount of said nano-composite material.

22. The coating composition as set forth in claim 1, wherein said nano-composite material comprises a viscosity modifier.

23. The coating composition as set forth in claim 1, wherein said nano-composite material comprises an immobilization time reduction agent.

24. The coating composition as set forth in claim 1, wherein said nano-composite material comprises a surface strength improvement agent, as measured by IGT pick test results.

25. The coating composition as set forth in claim 1, wherein said nano-composite material comprises a blister resistance improvement agent, as measured by IGT blister test results.

26. The coating composition as set forth in claim 1, wherein said nano-composite material comprises a surface appearance improvement agent.

27. The coating composition as set forth in claim 1, wherein said nano-composite material comprises a surface smoothness improvement agent, as measured by Parker Print Smoothness testing.

28. The coating composition as set forth in claim 1, wherein said nano-composite material comprises a whiteness ("L" value) improvement agent.

29. The coating composition as set forth in claim 1, wherein said nano-composite material comprises a green shade ("a" value) improvement agent.

30. The coating composition as set forth in claim 1, wherein said nano-composite material comprises a blue-white shade improvement agent.

31. The coating composition as set forth in claim 1, wherein said nano-composite material comprises a surface finish agent, whereby a low gloss matte finish is provided in a coated sheet.

32. The coating composition as set forth in claim 1, wherein said nano-composite material comprises a caliper enhancing constituent in said coating composition, wherein a coated sheet of increased caliper is provided.

33. The coating composition as set forth in claim 1, wherein said coating composition comprises both said nano-composite material and a selected synthetic calcium silicate hydrate.

34. The coating composition as set forth in claim 33, wherein said selected synthetic calcium silicate hydrate comprises aragonite.

35. The coating composition as set forth in claim 1, wherein said coating composition further comprises any one or more of (a) titanium dioxide, and (b) ground calcium carbonate, and wherein providing an effective amount of said nano-composite material in said coating composition allows decrease in the quantity of said one or more of (1) titanium dioxide, and (2) ground calcium carbonate, in said coating composition.

36. The coating composition as set forth in claim 1, wherein said clay in said coating composition comprises any one or more of (a) calcined clay and (b) natural clay, and wherein providing an effective amount of said nano-composite material in said coating composition allows decrease in the quantity of said one or more of (1) calcined clay or (2) natural clay, in said coating composition.

37. A coated, calendared, paperboard, comprising:
(a) one or more layers of kraft pulp;
(b) a base coating, said base coating comprising a coating composition including
(1) a nano-composite material, said nano-composite material comprising an amorphous silica component, said amorphous silica component provided in three-dimensional haystack or globular configuration that presents a fibrous structure having interstitial spaces between amorphous silica components with inner layers and outer layers with irregular interlacing amorphous silica components or filaments which are fixed in relation to each other, and a crystalline calcium carbonate component, said crystalline calcium carbonate component comprising nano aragonite needle structures, said nano aragonite needle structures arising from said amorphous silica component, said nano-composite material having a major axis of length L in the range from 10 microns to 40 microns and a surface area of from 40 meters squared per gram to 200 meters squared per gram; and
(2) clay.

38. The coated, calendared paperboard as set forth in claim 37, further comprising a top coating, wherein said top coating comprises:

(1) a nano-composite material, said nano-composite material comprising an amorphous silica component, said amorphous silica component provided in three-dimensional haystack or globular configuration that presents a structure having interstitial spaces between amorphous silica components with inner layers and outer layers with irregular interlacing amorphous silica components or filaments which are fixed in relation to each other, and a crystalline calcium carbonate component, said crystalline calcium carbonate component comprising nano aragonite needle structures, said nano aragonite needle structures arising from said amorphous silica component, said nano-composite material having a major axis of length L in the range from 10 microns to 40 microns and a surface area of from 40 meters squared per gram to 200 meters squared per gram; and
(2) clay.

39. The coated, calendared paperboard as set forth in claim 37, wherein said kraft pulp comprises unbleached kraft pulp.

40. The coated, calendared paperboard as set forth in claim 38, wherein said paperboard has an IGT Pick of at least 100.

41. The coated, calendared paperboard as set forth in claim 38, wherein said paperboard has an IGT Blister of at least 92.

42. The coated, coated, calendared paperboard as set forth in claim 38, wherein said paperboard has an AGT Appearance of at least 8.

43. The coated, calendared paperboard as set forth in claim 38, wherein said paperboard has an ISO Opacity of at least 88.0.

44. The coated, calendared paperboard as set forth in claim 38, wherein said paperboard has a Tappi Opacity of at least 86.0.

45. Paper, comprising paper, paperboard, or label stock, and a coating composition,
said coating composition comprising:
(a) a nano-composite material, said nano-composite material comprising an amorphous silica component, said amorphous silica component provided in three-dimensional haystack or globular configuration that presents a fibrous structure having interstitial spaces between amorphous silica components with inner layers and outer layers with irregular interlacing amorphous silica components or filaments which are fixed in relation to each other, and a crystalline calcium carbonate component, said crystalline calcium carbonate component comprising nano aragonite needle structures, said nano aragonite needle structures arising from said amorphous silica component, said nano-composite material having a major axis of length L in the range from 10 microns to 40 microns and a surface area of from 40 meters squared per gram to 200 meters squared per gram;
(b) clay; and
(c) said coating composition, after mixing, passes through a 100 mesh screen.

* * * * *